(12) United States Patent
Lucas et al.

(10) Patent No.: US 10,992,136 B2
(45) Date of Patent: *Apr. 27, 2021

(54) MODULAR POWER CONVERSION SYSTEM

(71) Applicant: DEKA Products Limited Partnership, Manchester, NH (US)

(72) Inventors: Donald J. Lucas, Windham, NH (US); Christopher L. Barber, Exeter, RI (US); Xiaorong Xia, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 248 days.

This patent is subject to a terminal disclaimer.

(21) Appl. No.: 16/164,311

(22) Filed: Oct. 18, 2018

(65) Prior Publication Data
US 2019/0052083 A1    Feb. 14, 2019

Related U.S. Application Data

(63) Continuation-in-part of application No. 14/211,339, filed on Mar. 14, 2014, now Pat. No. 10,110,010, which is a continuation-in-part of application No. 13/827,140, filed on Mar. 14, 2013, now abandoned, which is a continuation-in-part of application No.
(Continued)

(51) Int. Cl.
| | |
|---|---|
| *H02J 3/18* | (2006.01) |
| *H02J 3/38* | (2006.01) |
| *H02J 3/32* | (2006.01) |
| *H02J 3/46* | (2006.01) |
| *H02P 21/22* | (2016.01) |
| *H02J 3/42* | (2006.01) |
| *H02J 7/35* | (2006.01) |
| *H02J 13/00* | (2006.01) |

(52) U.S. Cl.
CPC ............. *H02J 3/18* (2013.01); *H02J 3/381* (2013.01); *H02J 3/46* (2013.01); *H02J 3/32* (2013.01); *H02J 3/382* (2013.01); *H02J 3/383* (2013.01); *H02J 3/386* (2013.01); *H02J 3/388* (2020.01); *H02J 3/42* (2013.01); *H02J 7/35* (2013.01); *H02J 13/0006* (2013.01); *H02P 21/22* (2016.02)

(58) Field of Classification Search
CPC ...... H02J 3/381; H02J 3/50; H02J 3/46; H02J 3/32; H02J 3/383; H02J 3/48; Y10T 307/305
USPC .......................................................... 307/151
See application file for complete search history.

(56) References Cited

U.S. PATENT DOCUMENTS

| | | | | |
|---|---|---|---|---|
| 6,219,623 | B1 * | 4/2001 | Wills ...................... | H02J 3/383 702/60 |
| 2011/0245990 | A1 * | 10/2011 | Rasmussen ............... | H02J 3/46 700/298 |
| 2014/0307494 | A1 * | 10/2014 | Wu .......................... | H02M 7/48 363/97 |

* cited by examiner

*Primary Examiner* — Daniel J Cavallari
*Assistant Examiner* — Swarna N Chowdhuri
(74) *Attorney, Agent, or Firm* — Kathleen Chapman

(57) ABSTRACT

A method for determining when a connection of a power system to a grid has been disconnected. The method includes the power system supplying a first amount of reactive power to the grid to which the power system is connected, and the power system determining if there is a frequency change within the grid. This includes if the frequency change does not exceed a predetermined threshold, the power system supplying a second amount of reactive power to the grid, and if the frequency exceeds a predetermined threshold, the power system supplying a first amount of reactive power to the grid.

20 Claims, 62 Drawing Sheets

Related U.S. Application Data

13/447,897, filed on Apr. 16, 2012, now Pat. No. 10,112,178.

(60) Provisional application No. 61/476,153, filed on Apr. 15, 2011, provisional application No. 61/898,879, filed on Nov. 1, 2013.

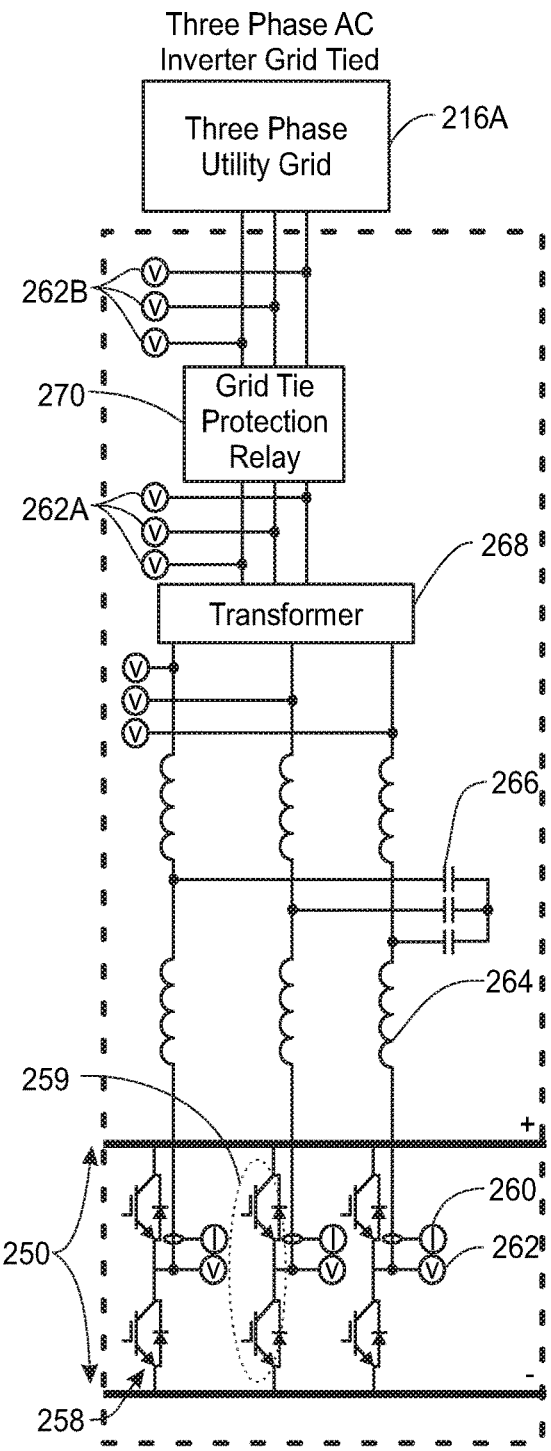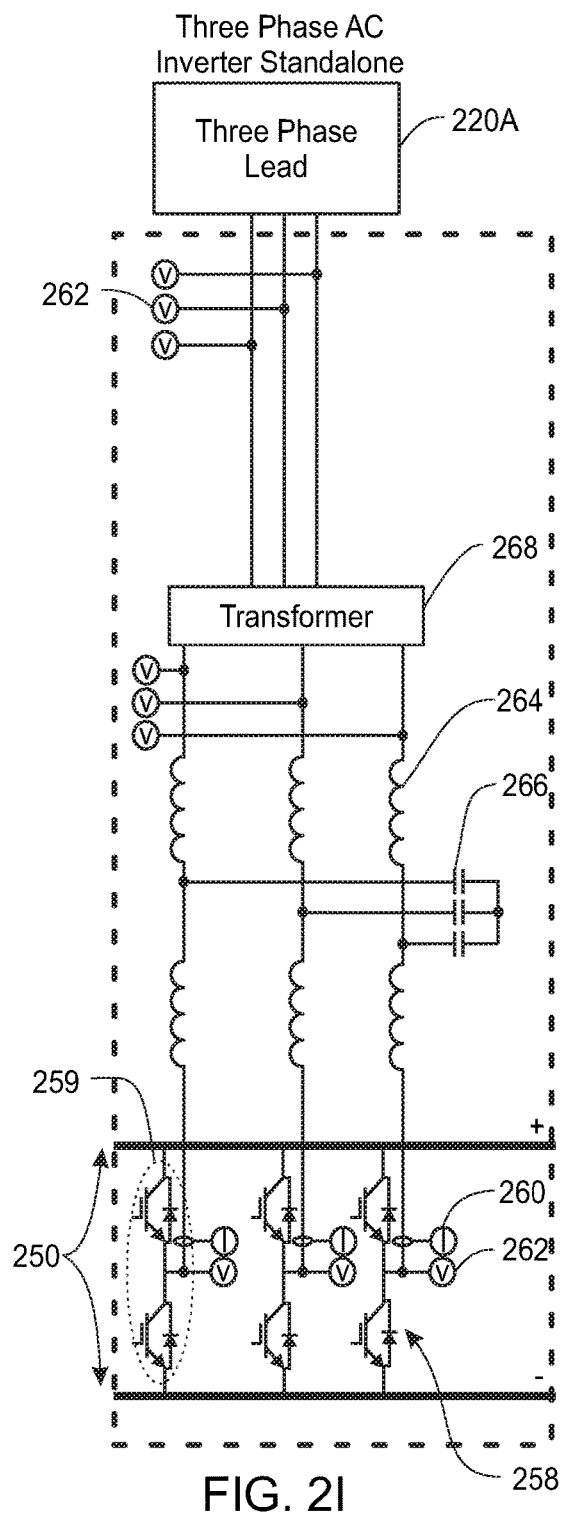
FIG. 2H
FIG. 2I

29 BIT CAN BUS MESSAGE MAP

| | MESSAGE PRIORITY | SYSTEM GROUP | FUNCTIONAL GROUP | MODULE GROUP | MESSAGE GROUP |
|---|---|---|---|---|---|
| BITS USED | 28, 27, 26 | 25, 24, 23 | 22, 21, 20, 19 | 18, 17, 16, 15, 14, 13, 12, 11 | 10, 9, 8, 7, 6, 5, 4, 3, 2, 1, 0 |
| EXAMPLE | 0, 0, 0 | 0, 0, 0 | 0, 0, 0, 0 | 0, 0, 0, 0, 0, 0, 0, 0 | 0, 0, 0, 0, 0, 0, 0, 0, 0, 0, 0 |
| ID | HIGHEST PRIORITY | POWER ELECTRONIC SYSTEM | POWER PRODUCTION | STIRLING ENGINE | ALARM VELOCITY IS Ø |

FIG. 11

29 BIT CAN BUS MESSAGE MAP FUNCTIONAL GROUP (example)

| BITS | FUNCTIONAL GROUP 22, 21, 20, 19 | VALUE |
|---|---|---|
| POWER PRODCUTION | 0, 0, 0, 0 | 0 |
| POWER TRANSMISSION | 0, 0, 1, 0 | 2 |
| POWER CONSUMPTION | 0, 1, 0, 0 | 4 |
| ENERGY STORAGE | 0, 1, 1, 0 | 6 |

FIG. 12

29 BIT CAN BUS MESSAGE MAP MESSAGE CONSTRUCTION (example)

|  | MESSAGE PRIORITY | SYSTEM GROUP | FUNCTIONAL GROUP | MODULE GROUP | MESSAGE GROUP |
|---|---|---|---|---|---|
| BITS USED | 28, 27, 26 | 25, 24, 23 | 22, 21, 20, 19 | 18, 17, 16, 15, 14, 13, 12, 11 | 10, 9, 8, 7, 6, 5, 4, 3, 2, 1, 0 |
| MASK (hex) | 0x1C000000 3 bits 28 - 26 | 0x03800000 3 bits 25 - 23 | 0x00780000 4 bits 22 - 19 | 0x0007F800 8 bits 18 - 11 | 0x000007FF 11 bits 10 - 0 |
| EXP | 26 | 23 | 19 | 11 | 0 |
| MULT | 67108864 | 8388608 | 524288 | 2048 | $2^0 = 1$ |

FIG. 13

29 BIT CAN BUS MESSAGE MAP MESSAGE PRIORITY
(example)

| MESSAGE PRIORITY | 3 BITS | ACTUAL VALUE (hex) | 28, 27, 26 | |
|---|---|---|---|---|
| CRITICAL | 0 | 0x00000000 | PRIORITY 0 (HIGHEST) | Highest priority control and alarm messages |
| PRIORITY 1 | 1 | 0x04000000 | PRIORITY 1 | |
| PRIORITY 2 | 2 | 0x08000000 | PRIORITY 2 | |
| PRIORITY 3 | 3 | 0x0C000000 | PRIORITY 3 | |
| PRIORITY 4 | 4 | 0x10000000 | PRIORITY 4 | |
| PRIORITY 5 | 5 | 0x14000000 | PRIORITY 5 | |
| PRIORITY 6 | 6 | 0x18000000 | PRIORITY 6 | |
| PRIORITY 7 | 7 | 0x1C000000 | PRIORITY 7 (LOWEST) | |

29 BIT CAN BUS MESSAGE MAP SYSTEM GROUP
(example)

| SYSTEM GROUP | 3 BITS | ACTUAL VALUE (hex) | 25, 24 23 |
|---|---|---|---|
| POWER ELECTRONICS SYSTEM | 0 | 0x00000000 | CURRENT POWER ELECTRONICS SYSTEM |
| TBD (2) | 1 | 0x00800000 | TBD (1) |
| TBD (2) | 2 | 0x01000000 | TBD (2) |
| TBD (3) | 3 | 0x01800000 | TBD (3) |
| TBD (4) | 4 | 0x02000000 | TBD (4) |
| TBD (5) | 5 | 0x02800000 | TBD (5) |
| TBD (6) | 6 | 0x03000000 | TBD (6) |
| TBD (7) | 7 | 0x03800000 | TBD (7) |

29 BIT CAN MESSAGE MAP
FUNCTIONAL GROUP
(example)

| FUNCTIONAL GROUP | 4 BITS | ACTUAL VALUE (hex) | 22, 21, 20, 19 |
|---|---|---|---|
| PRODUCTION | 0 | 0x00000000 | |
| TBD (1) | 1 | 0x00080000 | TBD (1) |
| TRANSMISSION | 2 | 0x00100000 | |
| TBD (3) | 3 | 0x00180000 | TBD (3) |
| CONSUMPTION | 4 | 0x00200000 | |
| TBD (5) | 5 | 0x00280000 | TBD (5) |
| STORAGE | 6 | 0x00300000 | TBD (6) |
| TBD (7) | 7 | 0x00380000 | TBD (7) |
| TBD (8) | 8 | 0x00400000 | TBD (8) |
| TBD (9) | 9 | 0x00480000 | TBD (9) |
| TBD (10) | 10 | 0x00500000 | TBD (10) |
| TBD (11) | 11 | 0x00580000 | TBD (11) |
| TBD (12) | 12 | 0x00600000 | TBD (12) |
| TBD (13) | 13 | 0x00680000 | TBD (13) |
| TBD (14) | 14 | 0x00700000 | TBD (14) |
| TBD (15) | 15 | 0x00780000 | TBD (15) |

29 BIT CAN MESSAGE MAP MODULE GROUP
(example)

17126

| MODULE GROUP PRODUCTION | 8 BITS | ACTUAL VALUE (hex) | 18, 17, 16, 15, 14, 13, 12, 11 |
|---|---|---|---|
| GENERATOR DIESEL | 0 | 0x00000000 | 4BITS FOR ATTRIBUTES |
| GENERATOR DIESEL SINGLE-PHASE | 1 | 0x00000800 | |
| GENERATOR DIESEL THREE-PHASE | 2 | 0x00001000 | |
| GENERATOR DIESEL, TBD | 3 | 0x00001800 | |
| GENERATOR GASOLINE | 4 | 0x00002000 | |
| GENERATOR GASOLINE SINGLE-PHASE | 5 | 0x00002800 | |
| GENERATOR GASOLINE THREE-PHASE | 6 | 0x00003000 | |
| GENERATOR GASOLINE, TBD | 7 | 0x00003800 | |
| GENERATOR STIRLING | 8 | 0x00004000 | |
| GENERATOR STIRLING SINGLE-PHASE | 9 | 0x00004800 | |
| GENERATOR STIRLING THREE-PHASE | 10 | 0x00005000 | |
| GENERATOR STIRLING, TBD | 11 | 0x00005800 | |
| GENERATOR WIND | 12 | 0x00006000 | |
| GENERATOR WIND SINGLE-PHASE | 13 | 0x00006800 | |
| GENERATOR WIND THREE-PHASE | 14 | 0x00007000 | |
| GENERATOR WIND, TBD | 15 | 0x00007800 | |

FIG. 17

29 BIT CAN BUS MESSAGE MAP MESSAGE DETAIL
(example)

| Message Detail | Msg Index | Complete Message ID | Format (see format description page) | | |
|---|---|---|---|---|---|
| System Faults | 268 | 0x0800510C | | | 6 |
| Word #1 | bit position | definition | polarity | description | |
| | 0 | FAULT_RESET | active high | a reset has occured | |
| | 1 | FAULT_UV_SW | active high | Bus undervoltage detected in software | |
| | 2 | FAULT_OV_HW | active high | Bus overvoltage detected in hardware | |
| | 3 | FAULT_OV_SW | active high | Bus overvoltage detected in software | |
| | 4 | FAULT_CONTRACTOR_OF F | active high | A Contactor is off | |
| | 5 | FAULT_ESTOP | active high | The E-STOP has been activated | |
| | 6 | FAULT_CONTROLLER_ ABSENT | active high | The system is not being controlled by any external source (e.g. canbus, diagnostic UI, etc) | |
| | 7 | RESERVED | | | |
| | 8 | RESERVED | | | |
| | 9 | FAULT_BATT_UV_SW | | Battery undervoltage detected in software | |
| | 10 | FAULT_BATT_OV_HW | | Battery overvoltage detected in hardware | |
| | 11 | FAULT_BATT_OV_SW | | Battery overvoltage detected in software | |
| | 12..15 | TBD | | | |

29 BIT CAN BUS MESSAGE MAP
MESSAGE DETAIL
(example)

| Message Detail | Msg Index | Complete Message ID | | Format (see format description page) | |
|---|---|---|---|---|---|
| Power Stage Faults | 269 | 0x0800510D | | | 6 |
| Word #1 | bit position | definition | polarity | description | |
| | 0 | FAULT_GDTZ_ABC | active high | Gate drive fault, detected via TZ, phases ABC | |
| | 1 | FAULT_GDTZ_D | active high | Gate drive fault, detected via TZ, phase D | |
| | 2 | FAULT_GTDZ_EFG | active high | Gate drive fault, detected via TZ, phases EFG | |
| | 3 | FAULT_GDTZ_H | active high | Gate drive fault, detected via TZ, phase H | |
| | 4 | FAULT_GDSW_ABC | active high | Gate drive fault, detected via I2C, phases ABC | |
| | 5 | FAULT_GDSW_D | active high | Gate drive fault, detected via I2C, phase D | |
| | 6 | FAULT_GDSW_EFG | active high | Gate drive fault, detected via I2C, phases EFG | |
| | 7 | FAULT_GDSW_H | active high | Gate drive fault, detected via I2C, phase H | |
| | 8 | FAULT_HOT_ABC | active high | Transistor overtemp, phases ABC | |
| | 9 | FAULT_HOT_D | active high | Transistor overtemp, phase D | |
| | 10 | FAULT_HOT_EFG | active high | Transistor overtemp, phases EFG | |
| | 11 | FAULT_HOT_H | active high | Transistor overtemp, phase H | |
| | 12 | FAULT_BRIDGE_DISABLE_ABCD | active high | Bridge module for phases A-D is disabled | |
| | 13 | FAULT_BRIDGE_DISABLE_EFGH | active high | Bridge module for phases E-H is disabled | |

FIG. 18C

29 BIT CAN BUS MESSAGE MAP
MESSAGE DETAIL
(example)

18128

| Message Detail | Msg Index | Complete Message ID | Format (see format description page) | | |
|---|---|---|---|---|---|
| Overvoltage Regulator Faults | 270 | 0x0800510E | | 6 | |
| Word #1 | bit position | | definition | polarity | description |
| | 0..15 | | TBD | | |
| Motor Drive Faults | 271 | 0x0800510F | | 6 | |
| Word #1 | bit position | | definition | polarity | description |
| | 0 | | FAULT_OC_SW_EFG | active high | Software- detected phase overcurrent |
| | 1 | | FAULT_OC_HW_EFG | active high | Hardware-detected phase overcurrent |
| | 2 | | FAULT_MOTOR_POS_SENSOR | active high | Position sensor not working properly |
| | 3 | | FAULT_MOTOR_OVERTEMP | active high | Overtemperature in motor |
| | 4 | | FAULT_MOTOR_ZERO_COMMAND | active high | Cascaded fault event: go to zero command. |
| | 5 | | FAULT_MOTOR_DISABLE | active high | Cascaded fault event: Disable motor drive. |
| | 6..15 | | TBD | | |
| Buck/Boost Faults | 272 | 0x08005110 | | 6 | |
| Word #1 | bit position | | definition | polarity | description |
| | 0 | | FAULT_BUCKBOOST_DISABLE | active high | Cascaded fault event: disable the buck boost converter. |
| | 1..15 | | TBD | | |

FIG. 18D

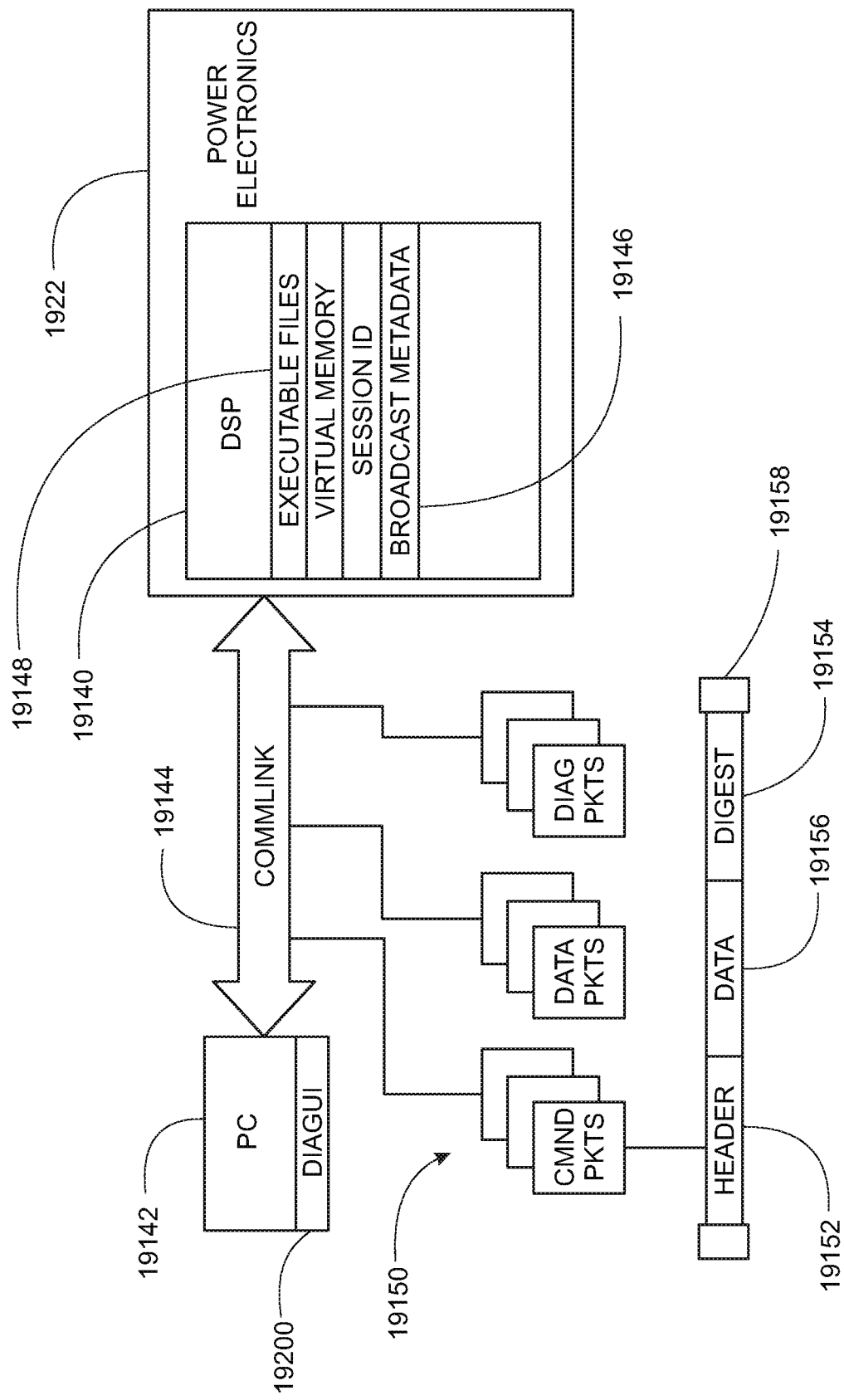

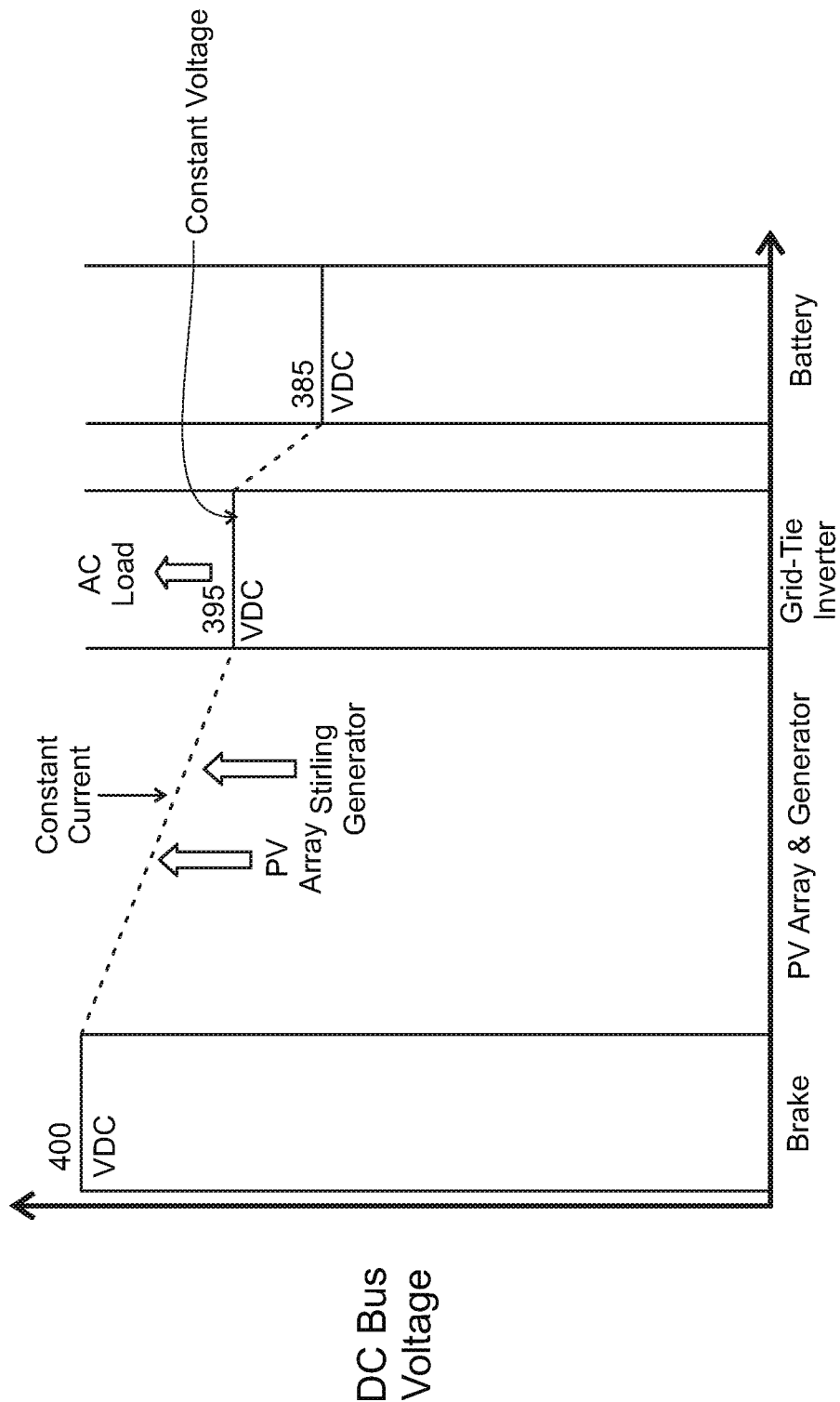

$\omega m \approx LPF(\omega m) + Kc \cos \theta m + Ks \sin \theta m$
$= LPF(\omega m) + A \cos(\theta m - \phi)$ $A = \sqrt{Kc^2 + Ks^2}$ $\Phi = \mathrm{atan2}(Ks, Kc)$ $\Phi = \mathrm{atan2}(Ks, Kc)$

//MODULAR POWER CONVERSION SYSTEM

CROSS REFERENCE TO RELATED APPLICATIONS

This application is a Continuation of U.S. patent application Ser. No. 14/211,339, filed Mar. 14, 2014 and entitled Modular Power Conversion System, now U.S. Pat. No. 10,110,010, issued Oct. 23, 2018, which is a Continuation-In-Part Application of U.S. patent application Ser. No. 13/827,140 filed, Mar. 14, 2013 and entitled Modular Power Conversion System, now U.S. Publication No. US-2014-0091622-A1, published Apr. 3, 2014, which is a Continuation-In-Part of U.S. patent application Ser. No. 13/447,897, filed Apr. 16, 2012 and entitled Modular Power Conversion System, now U.S. Publication No. US-2013-0099565-A1, published Apr. 25, 2013, which claims priority to U.S. Provisional Patent Application Ser. No. 61/476,153, filed Apr. 15, 2011 and entitled Modular Power Conversion System, Method and Apparatus, each of which is hereby incorporated herein by reference in its entirety.

U.S. Pat. No. 10,110,010 also claims the benefit of U.S. Provisional Application Ser. No. 61/898,879 filed Nov. 1, 2013 and entitled Modular Power Conversion System, which is hereby incorporated herein by reference in its entirety.

TECHNICAL FIELD

The present invention relates to a modular power conversion system for distributed power generation, storage and dispersed loads, and in particular to a modular power conversion system and power electronics which facilitates integration of the distributed power generation, storage and dispersed loads to a flexible smart grid, microgrid or microgrid clusters.

BACKGROUND

The electrical grid in the United States, or in any developed nation or continent for that matter, is the power industry's electrical network which essentially organizes four critical operations, (1) electricity generation, (2) power transmission, (3) power distribution and (4) electricity control. The "grid" can also refer in certain instances to a regional electrical network or even a local utility's transmission and distribution grid.

Electricity generation is traditionally accomplished by large generating plants such as nuclear reactors, hydroelectric dams, coal and gas fired boilers. The electric power which is generated is stepped up to a higher voltage—at which it connects to the transmission network. The transmission network will move, i.e. "wheel", the power long distances until it arrives at a local utility distribution network, where at a substation, the power will be stepped down in voltage—from a transmission level voltage to a distribution level voltage. As it exits the substation, it enters the distribution network. Finally, upon arrival at the service location such as a residential home or commercial user, the power is stepped down again from the distribution voltage to the required service voltage(s).

The traditional grid, along with its regional distinctions, are currently subject to the introduction of more efficient and smarter, although often smaller power generation technologies. Regional and local grids are now subject to low level dispersed power generation from regional large and small wind applications, small hydro-electric facilities and even commercial and residential photovoltaic installations for example. As such regional and local power producers come on-line the characteristics of power generation can in some new grids be entirely opposite of those listed above. Generation may occur throughout the grid at low levels in dispersed locations. Such characteristics could be attractive for some locales, and can be implemented in the form of what is termed a "smart grid" using a combination of new design options such as net metering, electric cars as a temporary energy source, and/or distributed generation. The modular power conversion system described below is an example of at least a portion of the developing "smart grid" technology.

SUMMARY

In accordance with one aspect of the present invention, a method for determining when a connection of a power system to a grid has been disconnected is disclosed. The method includes the power system supplying a first amount of reactive power to the grid to which the power system is connected, and the power system determining if there is a frequency change within the grid. This includes if the frequency change does not exceed a predetermined threshold, the power system supplying a second amount of reactive power to the grid, and if the frequency exceeds a predetermined threshold, the power system supplying a first amount of reactive power to the grid.

Some embodiments of this aspect of the invention may include one or more of the following. Wherein the second amount of reactive power is greater than the first amount of reactive power. Wherein if the frequency change does not exceed a predetermined threshold, supplying a second amount of reactive power to the grid further including the power system supplying a third amount of reactive power to the grid; which may further include monitoring the frequency of the grid connected to the power system; which may further include determining if there is a frequency change within the grid; which may further include exceeds a predetermined threshold; wherein the third amount of reactive power is greater than the second amount of reactive power; and may further include wherein determining whether the frequency change exceeds a predetermined threshold further including if the frequency change does not exceed a predetermined threshold, the power system supplying a fourth amount of reactive power to the power system; and further including monitoring the frequency of the grid connected to the power system; determining if there is a frequency change within the grid; and may further include if a frequency change is detected, the power system determining whether the frequency change exceeds a predetermined threshold; and may further include if the frequency change exceeds the predetermined threshold, determining an island condition; and may further include if the frequency change does not exceed a predetermined threshold, the power system supplying a first amount of reactive power to the grid to which the power system is connected; and/or wherein the fourth amount of reactive power is greater than the third amount of reactive power.

In accordance with one aspect of the present invention, a method for determining when a connection of a power system to a grid has been disconnected is disclosed. The method includes locking the power system to a frequency of the grid using a phase locked loop, detecting a deviation from the frequency in the power system, and shutting off the power system.

Some embodiments of this aspect of the invention may include one or more of the following. Wherein detecting a deviation from the frequency further comprising determining whether the deviation exceeds a predetermined threshold. Wherein shutting off the power system comprising opening a relay. Wherein shutting off the power system comprising turning off an inverter. Wherein shutting off the power system comprising shutting off at least one component connected to the grid.

In accordance with one aspect of the present invention, a method for determining when a connection of a power system to a grid has been disconnected is disclosed. The method includes detecting a voltage value from a voltage sensor, applying a transform to the voltage, if the D-axis voltage value exceeds a predefined threshold, detecting a fault, and shutting off the power system.

Some embodiments of this aspect of the invention may include one or more of the following. Wherein shutting off the power system comprising turning off an inverter.

In accordance with one aspect of the present invention, a modular power conversion system is disclosed. The modular power conversion system includes at least one first electric resource, a modular power stage, at least one second electric resource, and wherein the modular power stage comprising at last one module including power electronics for converting power between the at least one first electronic resource and the at least one second electric resource.

Some embodiments of this aspect of the invention may include one or more of the following. Wherein the system further includes a brake module. Wherein the at least one first electric resource includes a wind turbine. Wherein the at least one first electric resource includes a photovoltaic array. Wherein the at least one first electric resource includes a Stirling generator. Wherein the at least one second electric resource includes an end consumer. Wherein the end consumer includes a building. Wherein the at least one second electric resource includes battery energy storage. Wherein the modular power stage facilitates electricity conversion between the at least one first and the at least one second electric resources and allocates the most efficient distribution of electricity based on produce and cost. Where the system further includes a conditioner for conditioning the electricity for power transmission. Wherein the modular power stage is communitively connected to a remote control. Where the system further includes a three phase inverter module to connect a three phase grid. Where the three phase inverter module further includes three half bridges connected to a high and low side of a DC bus. Wherein the system further includes a motor controller for a permanent magnetic synchronous motor which includes an analog/digital converter that converts analog sensor signals from the permanent magnetic synchronous motor to digital signals for use by a digital signal processor including half bridges across a DC bus and an inductor-capacitor-inductor filter that produce three phase AC power at a predetermined voltage and frequency, at least one voltage sensor and at least one current sensor for three-phase demodulation of the three phase signals and converting the three-phase signals to a two-phase orthogonal reference frame, and a position/velocity estimator for receiving speed sensor signals from the motor and compiling a position and velocity estimation of the motor.

In accordance with one aspect of the present invention, a method for controlling a modular power conversion system is disclosed. The method includes drawing power from the least expensive source, as demand increases, drawing power from the second least expensive source, directing power to the highest priority circuits, and if the load of the highest priority circuits is met, then directing power to the second highest priority circuits.

Some embodiments of this aspect of the invention may include one or more of the following. Wherein drawing power from the least expensive source includes drawing power from a photovoltaic array. Wherein directing power to the highest priority circuits includes directing power to a battery.

In accordance with one aspect of the present invention, a motor controller for a permanent magnetic synchronous motor is disclosed. The motor controller includes an analog/digital converter that converts analog sensor signals from the permanent magnetic synchronous motor to digital signals for use by a digital signal processor comprising half bridges across a DC bus and an inductor-capacitor-inductor filter that produce three phase AC power at a predetermined voltage and frequency, at least one voltage sensor and at least one current sensor for three-phase demodulation of the three phase signals and converting the three-phase signals to a two-phase orthogonal reference frame, and a position/velocity estimator for receiving speed sensor signals from the motor and compiling a position and velocity estimation of the motor.

In accordance with one aspect of the present invention, a modular power conversion system is disclosed. The system includes a backplane, a housing and a data connection port and one or more modules that plug into said backplane, wherein the backplane comprises at least one direct current (DC) bus with positive and negative leads, a data connection for each module, connections for electrical power inputs to the module, connections for electrical outputs from the module.

Some embodiments of this aspect of the invention may include one or more of the following. Wherein the modules are comprised of a microprocessor, one or more half-bridge circuits, power conditioning elements such as inductors, capacitors, voltage and current sensors, electrical connections. Wherein the modular power system may connect rotating power generators including but not limited to diesel gensets, Stirling gensets, and wind power, may connect DC power sources including but not limited to solar photovoltaic arrays, fuel cells, may connect to the AC electrical grid with one or more phases, may connect to an AC electrical load with one or more phases, may connect to a rechargeable battery, may connect to an electrical shunt. Wherein one or more of the modules the microprocessors controls the power flow through the module in an attempt to control the DC bus voltage to a given set-point. Wherein voltage set-points of some modules are set to different voltages. Wherein the voltage set-points of different modules are selected so only one module is varying its output at a time in the set of modules in the modular power conversion system. Wherein one or more modules are set to produce power at a range of voltages and the microprocessors do not varying the power flow to control the DC bus voltage. Wherein the voltage set points are selected to prefer renewable energy producers over fossil fuel powered producers.

In accordance with one aspect of the present invention, a method to control the speed during startup and run time of a brushless motor/generator in a Stirling engine where the slow changing sinusoidal speed fluctuations of said motor/generator are filtered out and the underlying speed controlled is disclosed.

In accordance with one aspect of the present invention, a method to start and run a brushless motor/generator in a Stirling engine by scheduling the controller gains based on engine speed thresholds is disclosed.

In accordance with one aspect of the present invention, a method for displaying data values in real time from a microprocessor that broadcasts data to a user interface is disclosed.

In accordance with one aspect of the present invention, A method for annotating software variables in an embedded software system with engineering unit and scaling factors by associating engineering and scaling factors with variable types in a way that may be read from compiled binary file on a user interface to display embedded system variables with engineering units is disclosed.

In accordance with one aspect of the present invention, a method for declaring Boolean status bits in a file at design time where the file read by a $2^{nd}$ file to generate code in a $3^{rd}$ file for an embedded system and which can be read by a user interface device to display binary data from an embedded system in meaningful form to indicate value is disclosed.

Some embodiments of this aspect of the invention may include one or more of the following. Wherein the values are displayed on the user interface to show the status bits in one of 3 conditions which include no fault condition, no fault condition now, but a fault has occurred previously and fault condition.

In accordance with one aspect of the present invention, a modular power conversion system and power electronics scheme enabling any power production device or entity to connect to any load or electrical grid is disclosed. This is at a fundamental level power conversion i.e. electricity conversion, between "electric resources" (An electric resource is an electrical entity which can act as a load, generator or storage). At a more involved level as in the embodiments discussed herein, this is more specifically, electricity conversion for example from low level producer(s) such as a diesel or gas generator, Stirling engine, wind turbine or photovoltaic array, to a consumer such as a commercial or residential building, either directly or via the grid. As described below, the goal is more specifically a hardware and software power electronics design and implementation of a modular power stage, i.e. a modular power conversion system which aggregates different power production entities, transmission systems, consumption and loads as well as energy storage.

In accordance with one aspect of the present invention, a modular power conversion system capable of facilitating and synchronizing a variety of power production, transmission, consumption and storage entities for connection with a smart grid electrical distribution network is disclosed.

In accordance with one aspect of the present invention, a power electronic system including power electronics circuits and software for managing the power production entities and the conversion of produced power to a single or multi-phase current for transmission to an electrical grid or load.

In accordance with one aspect of the present invention, each module or "block" of the modular power conversion system is interchangeable in the system to facilitate electricity conversion between electric resources. For example one module or block could convert energy from a desired producer directly to a commercial building power type including but not limited to for example 220 VAC Single Phase, 240/120 VAC Split Phase, 208/120 3-phase, or 380/220 as is prevalent in Europe and China. The module or block is not limited to any specific conversion or operating parameters but is intended to convert produced energy into any world-wide standard.

In accordance with one aspect of the present invention, modules or blocks relating to power transmission of produced electricity to grids, micro grids, smart grids or energy storage entities are disclosed.

The modular power conversion system and power electronics of the present invention may allocate the most efficient production, transmission and distribution of electricity based on available power production entities and cost to lower a consumers cost as well as lower the necessity for over-generation i.e. spinning reserves at a national and regional scale and lessen the potential for under-generation and power failures. The power electronics are the vehicle for communication between the modules which facilitates the plug-in nature of any compatible module into the modular power conversion system.

In accordance with one aspect of the present invention, a modular power conversion system is disclosed. The system includes a first electric resource, a modular power stage, a second electric resource and wherein the modular power stage includes at last one module including power electronics for converting power between the first and second electric resources.

In accordance with one aspect of the present invention, a method for determining a fault condition in a power system component is disclosed. The method includes detecting current values of a sensor, summing the current values, reaching a threshold sum of current values; and turning off the component.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein:

FIG. 11 is an embodiment of a CAN bus message map;

FIG. 12 is an embodiment of a Functional Group of a CAN bus message map;

FIG. 13 is an embodiment of Message Construction of a CAN bus message map;

FIG. 14 is an embodiment of Message Priority of a CAN bus message map;

FIG. 15 is an embodiment of a System Group of a CAN bus message map;

FIG. 16 is a further embodiment of a Functional Group of a CAN bus message map;

FIG. 17 is an embodiment of a Module Group of a CAN bus message map;

FIG. 18A-18D is an embodiment of Message Detail of a CAN bus message map;

FIG. 19 is a diagrammatic representation of the communications links and transmissions of an embedded power electronics system according to one embodiment;

FIGS. 28A-28E are embodiments of a power source and load prioritizing control scheme;

Like reference symbols in the various drawings indicate like elements.

DETAILED DESCRIPTION OF EXEMPLARY EMBODIMENTS

Figure 1:
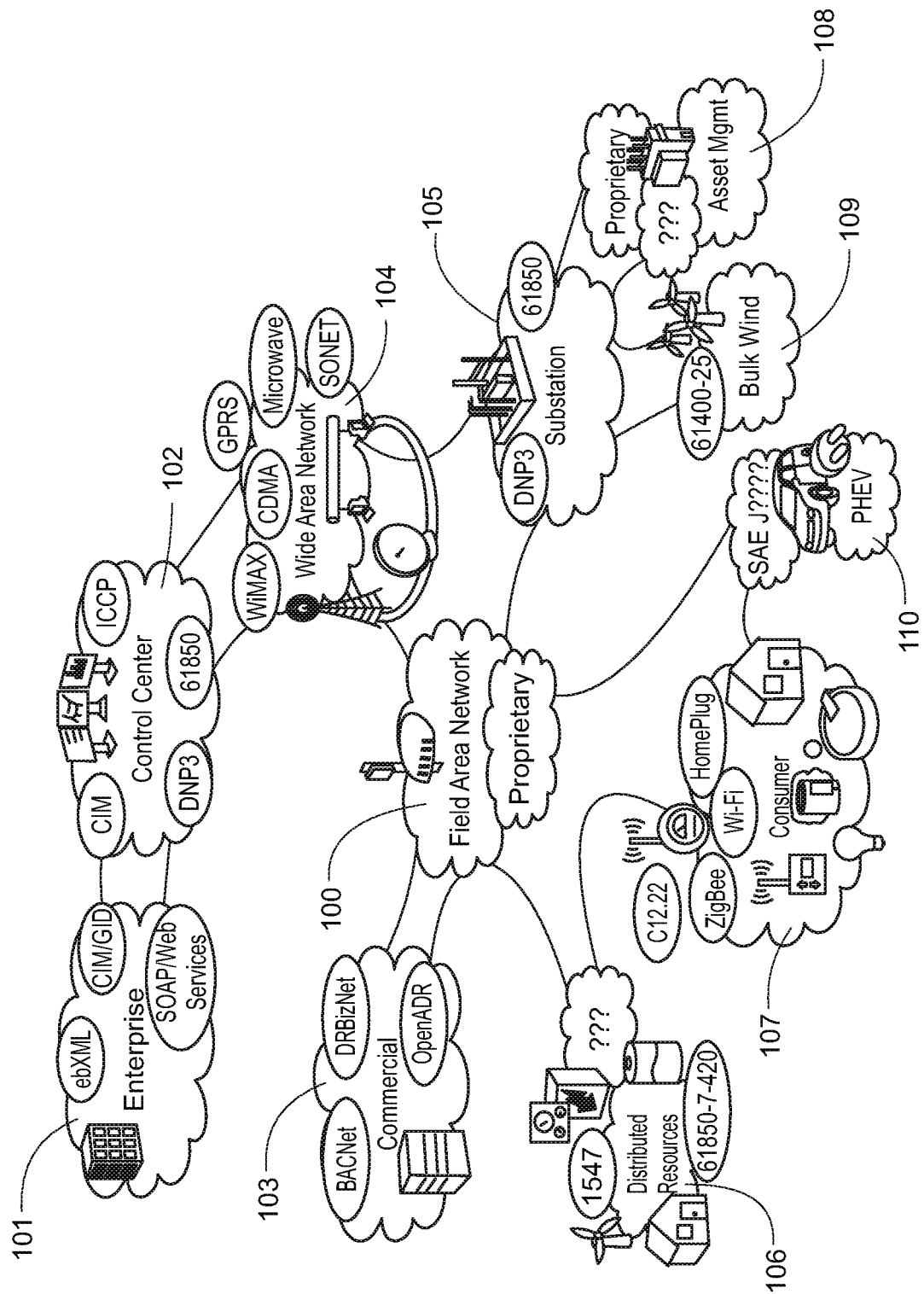
FIG. 1 is a diagrammatic representation of a smart grid communications strategy.

The electrical grid and its various regional and local distinctions are currently subject to the introduction of more efficient and smarter, although often substantially smaller power generation technologies. Regional and local grids are now subject to low level dispersed power generation from regional large and small wind applications, small hydroelectric facilities and even commercial and residential photovoltaic installations for example. As such regional and local power producers come on-line the characteristics of power generation may in some new grids be entirely opposite of traditional power generation by large mega-watt producing hydro-electric, nuclear and gas-turbine power facilities. Generation may occur throughout the grid at low levels in dispersed locations. Such characteristics could be attractive for some locales, and may be implemented in the form of what is termed a "smart grid" shown in FIG. 1 using a combination of new design options such as net metering, electric cars as a temporary energy source or storage and/or distributed generation. FIG. 1 is reproduced from "An Overview of Smart Grid Standards" by Erich W. Gunther of the EnerNex Corporation, published in February 2009.

A highly efficient grid having a field area network 100 would enable the economical and efficient management of all resources on the grid such as large power production from bulk wind 102 or other proprietary power and asset production entities. The field area network 100 would communicate and interact directly with residential and commercial loads and the modular power conversion system described below is an example of at least a portion of the developing "smart grid" technology which would assist in the efficient handling of distributed resources as they are applied to the smart grid.

Figure 2:
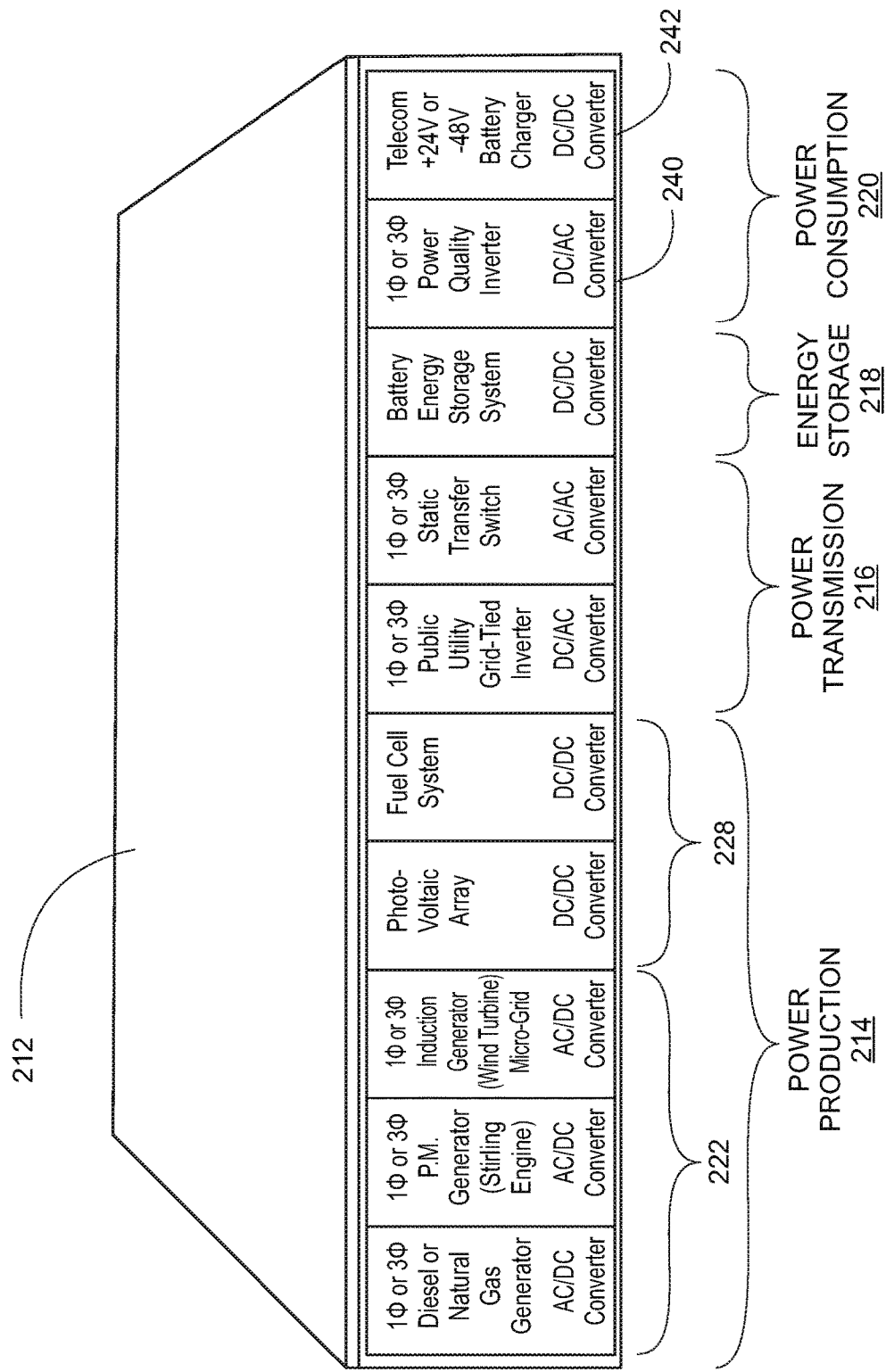
FIG. 2-2M are an embodiment of a modular power conversion system according to one embodiment.

Turning to FIG. 2 is an embodiment of a modular power conversion system 212 which consolidates the power electronics, including hardware and software in an interchangeable modular or "block" format. It is the goal of this format to be able to connect anything, e.g. a generator, wind, thermal, photovoltaic etc., to anything else, e.g. battery storage system, grid, residential or commercial load etc. This is power conversion i.e. electricity conversion and communication between "electric resources" (an electric resource is an electrical entity which can act as a load, generator or storage) and in this initial instance more specifically, electricity conversion for example from low level producer(s) such as a Stirling engine, wind turbine or photovoltaic array, to a consumer such as a commercial or residential building, either directly or via the grid.

Efficient use of electricity production given the available supply, the average demand and the peak demand, requires dynamic aggregation of electric resources. "Aggregation" is used here to refer to the ability to control electricity flow into and out of different electrical resources. Electricity delivered during peak demand is expensive, costing significantly more than off-peak power. A modular power conversion system 212 which allocates the most efficient distribution of electricity based on production and cost may lower a consumer's cost first and foremost and in a broader nature lower the necessity for over-generation i.e. spinning reserves at a national and regional scale and lessen the potential for under-generation and power failures.

As described, the disclosed embodiments relate to a hardware and software design and implementation of a modular power conversion system 212, where each module or "block" is interchangeable in the modular power conversion system to facilitate electricity conversion between electric resources. As described above one module or block could convert energy from a producer 214 directly to a commercial building power type for example 220 VAC Single Phase, 240/120 VAC Split Phase, 208/120 3-phase, or 380/220 as is prevalent in Europe and China. Again, the module or block is not limited to any specific conversion or operating parameters but is intended to convert produced energy into any world-wide standard.

A second block could condition the electricity for power transmission 216 to be added to and distributed by the grid. Additional blocks for other power production 214 such as from photo-voltaic or fuel cells, or for energy storage 218 such as battery energy storage or for power consumption 220 using a power quality inverter and/or telecom system are also contemplated. Grid tie management and management of power distribution in general, for the modular power conversion system 212 is a particularly important aspect whether the grid is a conventional wide area grid network or a smart-grid application. Underlying the hardware of the grid tie system are software applications which scale the power for use.

Figure 2A:
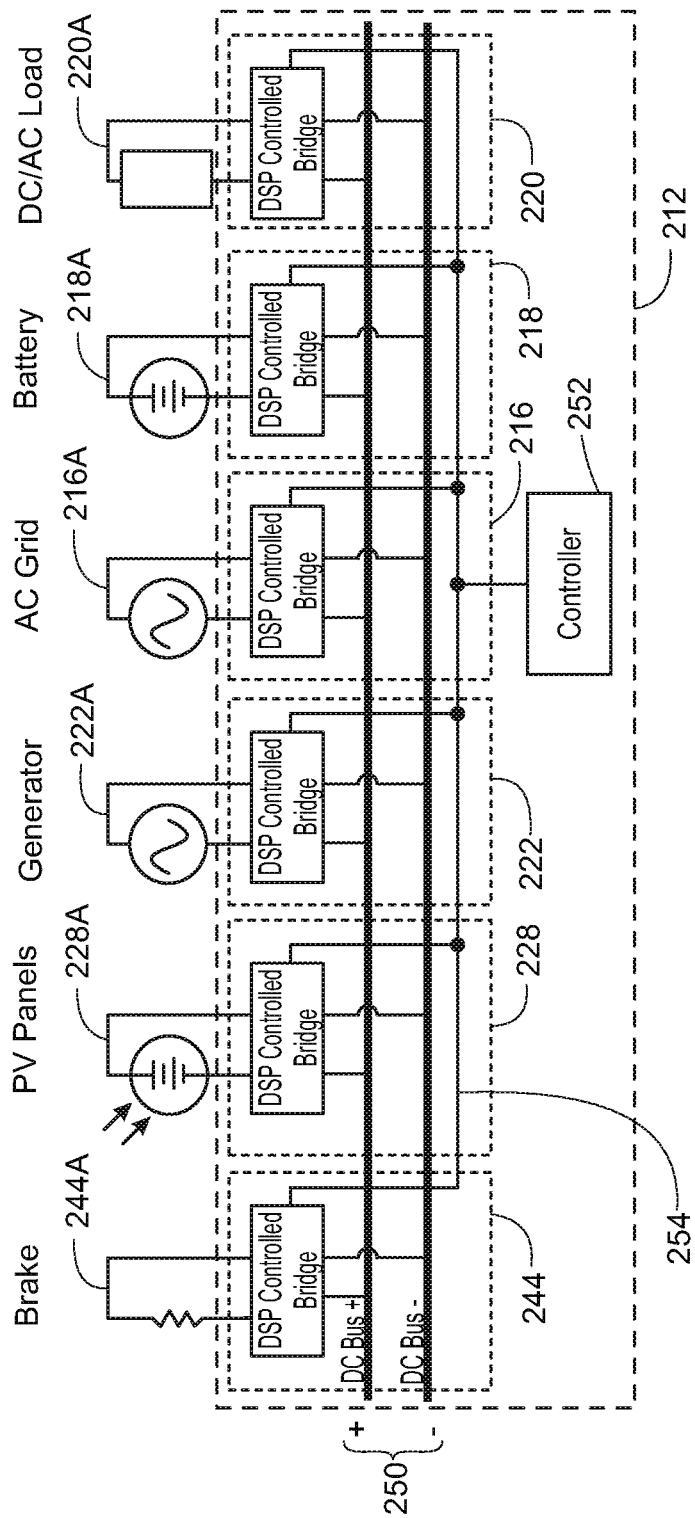

Some embodiments of the modular power conversion system 212 may be as shown in FIG. 2A. Each module is connected to a DC bus 250 that provides the backbone to the system. In some embodiments the modules are boxes that plug into a back plane containing the high and low sides of the DC bus 250 and a data bus 254 that connects each module to a master controller 252. The inputs/outputs of each module (not shown) may be on the front or on the back of the modular power conversion system 212. In some embodiments, each module includes at least a DSP controlled bridge circuit, where the bridge circuit includes at least a half bridge and may comprise a number of inductive and capacitive elements, voltage and current sensing devices, transformers and relays. In this document, the term DSP may be used to describe any microprocessor with sufficient input/output and speed to read voltages, currents, control multiple sets of half-bridge circuits and do the calculations to produce good quality AC power from a DC bus. In some embodiments, the DSP microprocessor is a digital signal processor running at 150 MHz. The master controller 252 for the modular power conversion system 212 may include a data input/output device such as a keyboard and display or a touch sensitive display or communication port to allow users to control the operation of the modular power conversion system 212. The modular power conversion system 212 may also include a wireless or hard wired telecommunication ability to allow remote control and access to the system data by the user or the grid power provider. The grid power provider may use the modular power conversion system 212 to remotely turn on electric power sources such as generators, wind or PV arrays to provide power to the grid. The grid power provider may also access the modular power conversion system 212 to disconnect it from the grid, This remote control of distributed power resources and loads may allow the grid power provider to minimize brown-outs or power disruptions or minimize electrical costs by using the least expensive power at all times.

An alternative embodiment may place all the computing power in the master controller 252. Thus the operation of each module including the bridge circuits would be fully under the control of one or more DSPs in the master controller 252.

Figures 2B, 2C:
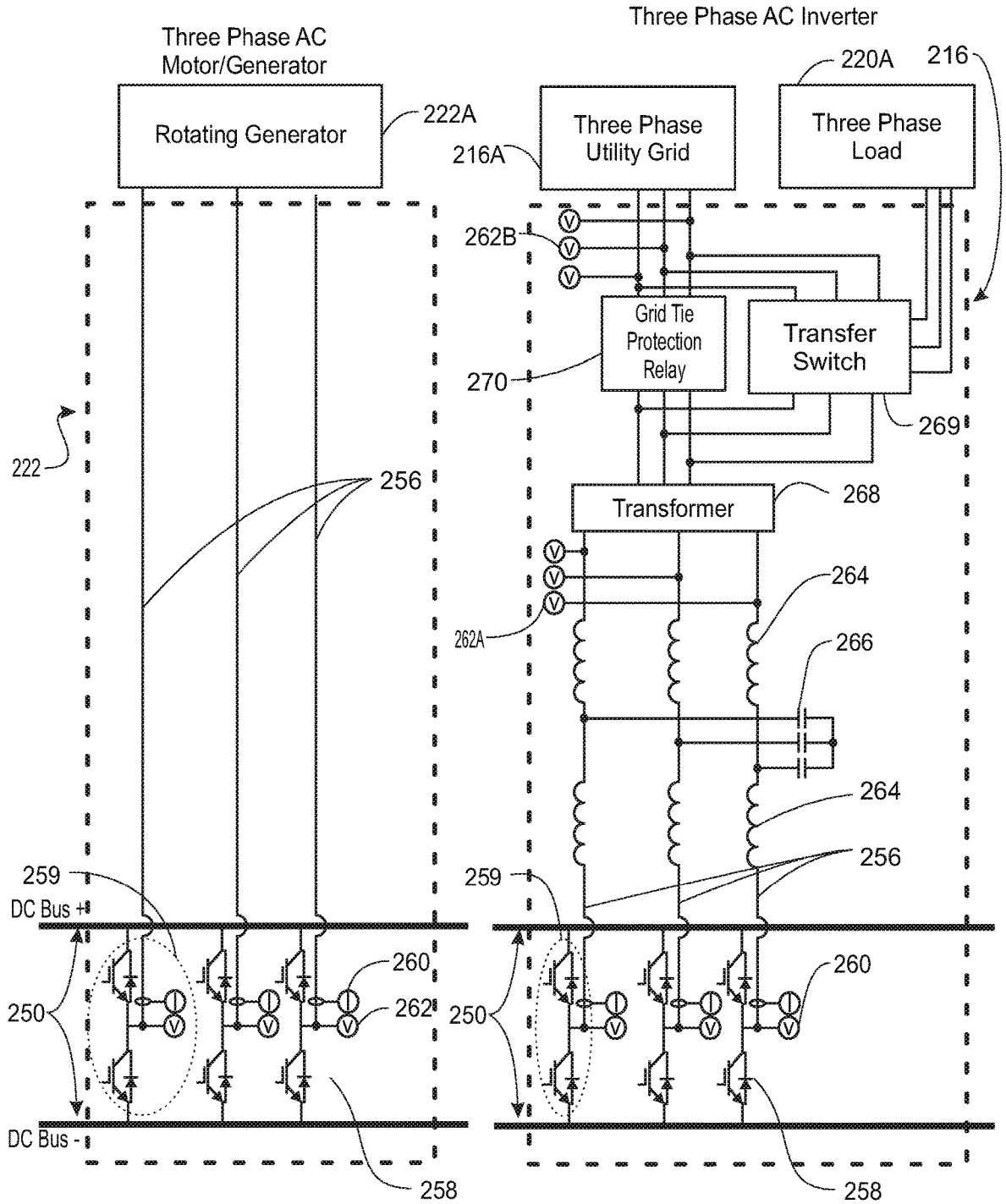

Examples of the hardware topology for the modules in FIG. 2 are shown in FIGS. 2B-2M. An example of the hardware topology for module 222 to control a 3-phase generator 222a is shown in FIG. 2B. The 3 power lines 256 are connected to the midpoint of the 3 half bridges 259 between the high and low side of the DC bus 250. The half bridges 259 in various embodiments may include 2 IGBT's connected across the DC bus. In some embodiments, the half bridges could be constructed of 2 MOSFETs. In various embodiments, The AC power from the generator may be rectified efficiently into DC power through the rapid opening and closing of the IGBTs 258. The opening and closing of the IGBTs 258 are controlled by a DSP (not shown) based on the high speed measurements of the voltages using sensors 262. Some embodiments of the control algorithm of the DSP are described fully below. In some embodiments, the module 222 may also include current sensors 260. In some embodiments, module 222 may connect any one or more of the following list of generators, which may include, but are not limited to: internal combustion engine generators, Stirling generators, external combustion engine generators, wind turbine generators, and/or water turbine generators. In an alternative example of a module to connect a polyphase motor/generator to the DC bus would include a number of half-bridge for each phase of the motor including 5 and 7 phase motors.

In some embodiments, the hardware topology module 216 to connect to a 3-phase utility grid and a 3-phase load may be that which is shown in FIG. 2C. Module 216 includes a three phase inverter, connection hardware to the grid and transfer switch to supply a load either from the grid or inverter. Three half bridges 259 are connected to the high and low side of the DC bus 250. The IGBT's 258 are controlled by a DSP (not shown) based on the high speed measurements of the voltages using sensors 262. The DSP controls the operation of the IGBT's 258 to create 3 time varying voltages in lines 256 that have the desired amplitude, frequency and are out of phase with each other. The control algorithm of the DSP is described fully below. The produced voltage signals are filtered by an inductor-capacitor-inductor (LCL) filter 264,266,264 to produce three (3) smooth sine waves. In some embodiments, the output of the DSP-controlled bridges 259 and LCL filter is 60 Hz, 208 volt, 3-phase AC power. In other embodiments, the output may include one or more of, but not limited to, the following list: 50 Hz, 400 volt, 3-phase AC power, 50 Hz, 200 volt 3-phase AC power, 60 Hz, 200 volt 3-phase AC power, 50 Hz, 380 volt 3-phase AC power. In some embodiments, a transformer 268 may be included to isolate DC bus 250 and the rest of the modular power conversion system 212 from the 3-phase utility grid 216*a* and the 3-phase load 220*a*. The transformer may step the produced voltage up or down as desired. A grid-tie protection relay 270 may be included to meet IEEE 1547 and UL1741 standards to connect to the utility. The grid-tie protection relay 270 may be a SEL-547 that prevents connection to the grid until the voltages measured by sensors 262A match the phase frequency and amplitude of the grid voltages measured by sensors 262B. The grid-tie protection relay 270 may include anti-islanding functionality that disconnects the module from the grid, when the grid fails. A grid tie module may also include the ability to drive a local load off either the generator or the grid. A transfer switch 269 will connect the load to the grid when the grid is functioning properly. If the grid fails, the transfer switch 269 disconnects the load from the grid and connects it to AC power produced by the module 216 and derived from the DC bus 250.

Figure 2D:
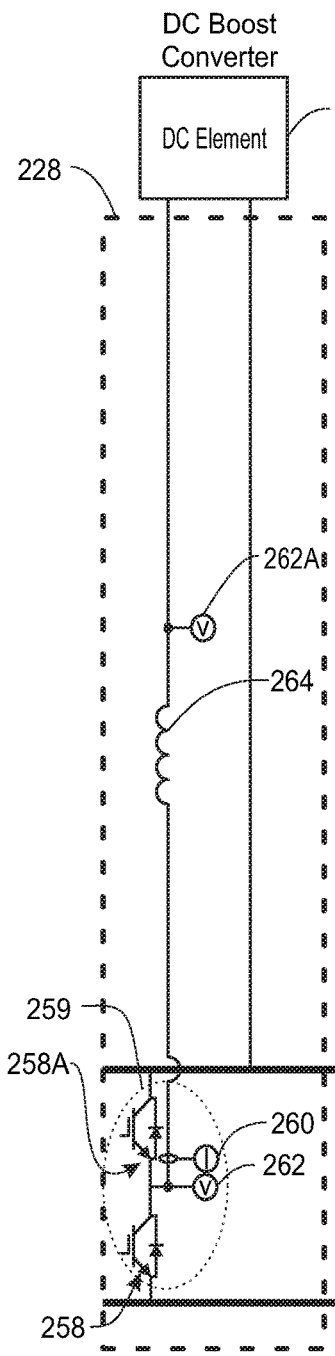

FIG. 2D presents an embodiment of the hardware topology of module 228 that connects a DC power source 228A to the higher voltage DC bus 250 of the modular power conversion system 212. In the embodiments shown, the DC element is connected via an inductor 264 and one half bridge 259 to the high and low sides of the DC bus 250. The IGBT's 258, 258*a* are controlled by a DSP (not shown) based on the high speed measurements by voltage sensor 262 and 262A to boost the voltage of the DC power source 228A to the DC bus 250 voltage. The DSP control algorithm to boost the voltage may be one that is known in the art. The DC power source 228A may be one or more of, but not limited, the following sources: battery, photovoltaic array, and/or fuel cell. The same hardware topology described in FIG. 2D supports bidirectional power flow. Thus, it may also buck the voltage of the DC bus 250 down to a lower voltage to charge a battery or supply lower voltage DC power.

Figure 2E:
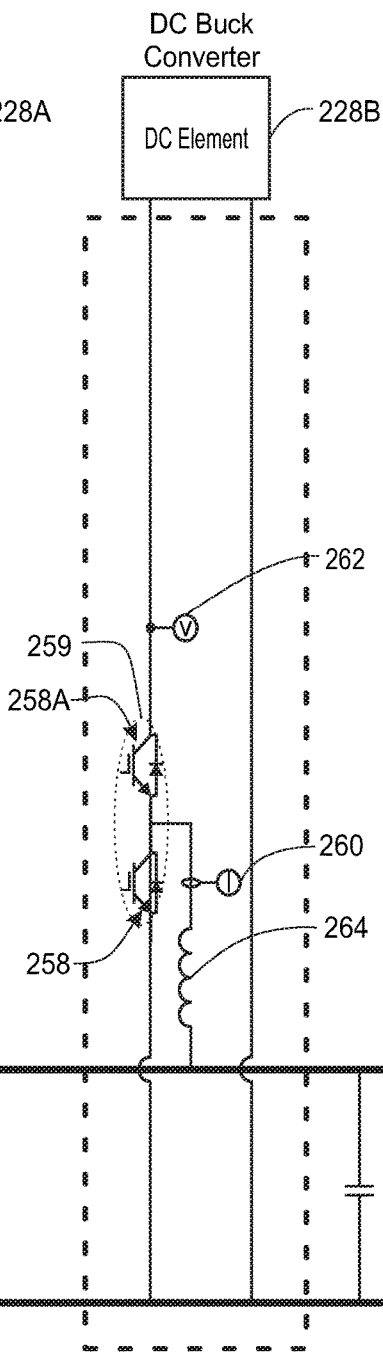
Figure 2F:
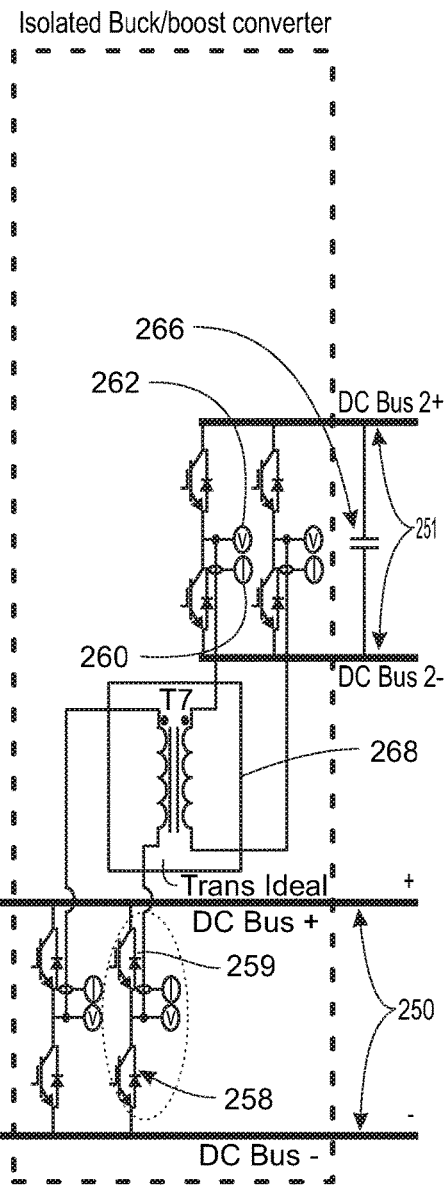
Figure 2G:
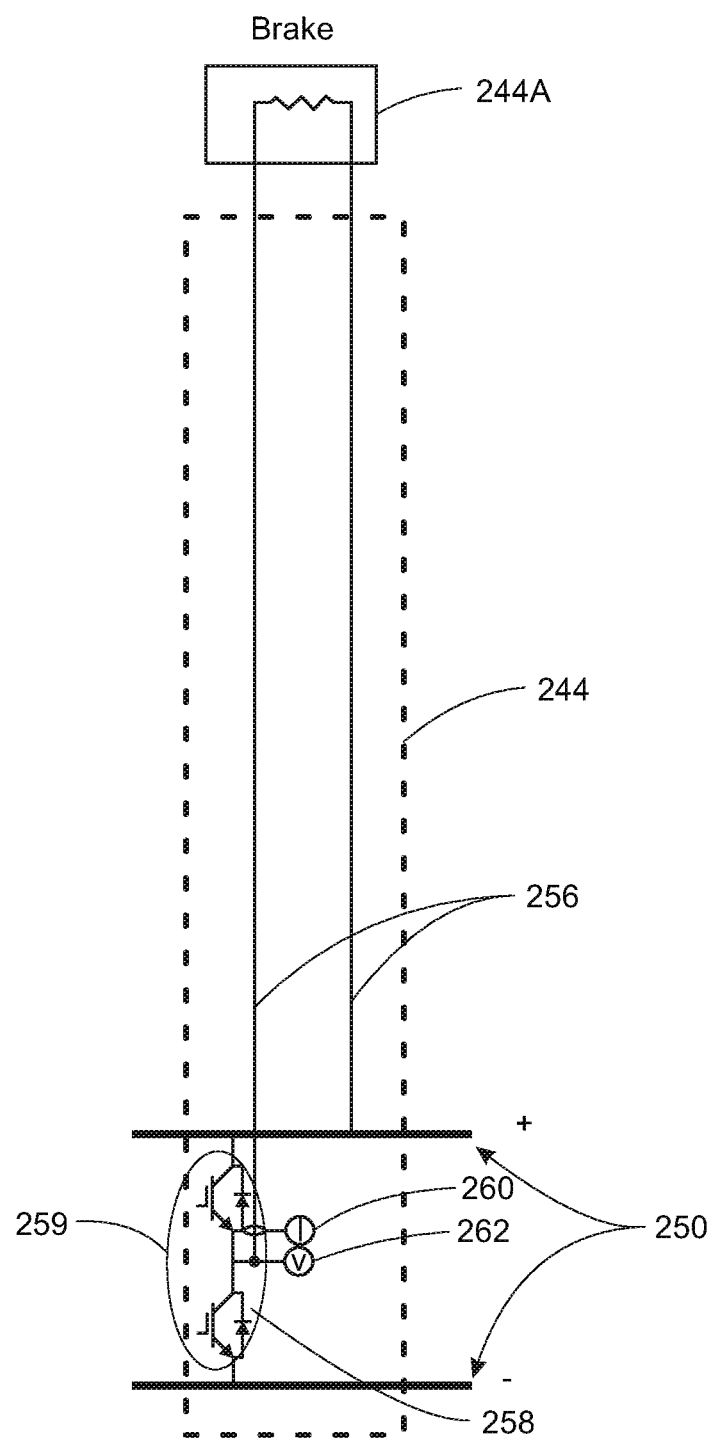

Alternative topologies/embodiments to connect DC elements to the higher voltage DC bus 250 are presented in FIGS. 2E and 2F. In FIG. 2E, the half bridge is connected to the DC Element 228B on one side and the low side of the DC bus 250 on the other. The mid point of the bridge is connected to the high side of the DC bus via an inductor 264. A DSP (not shown) controls the opening and closing of the IGBTs 258, 258*a* based on an algorithm known in the art and the current measured by sensor 260. The topology of FIG. 2E, like that of FIG. 2D can buck down voltage for power flowing from DC element 228B or boost voltage up for power flowing into DC element 228B. One example is when DC element 228B is a battery.

A hardware topology to connect DC bus 250 to an electrically isolated second DC bus 251 is shown in FIG. 2F. The topology of FIG. 2F allows power to flow in both directions and DC bus 251 may be at a higher or lower voltage than DC Bus 250. Two half bridges 259 may be connected across each bus and the midpoints of each pair connected across the one side of a transformer 268. A DSP (not shown) controls the IGBTs 258 to boost the voltage up or buck the voltage down as needed. The DSP controls the opening and closing of the IGBTs 258 based on an algorithm known in the art and the current measured by sensors 260 or voltage measured by sensors 264. The topology shown in FIG. 2F allows an extension to the ideas shown in FIG. 2A. The circuit in FIG. 2F allows multiple DC buses at different voltages to which the modules can attach. It may be less expensive or more efficient to attach one or more modules to a DC bus at a different voltage than the main DC bus 250. It may also be beneficial to provide a DC bus and and/or power supply that is isolated from main DC bus 250. The multiple DC buses may allow the system architecture of the modular power conversion system 212 to be optimized for minimum cost and/or maximum efficiency.

An embodiment of a three phase inverter module to connect a 3-phase grid is presented in FIG. 2H. Three half bridges 259 are connected to the high and low side of the DC bus 250. The IGBT's 258 are controlled by a DSP (not shown) based on the high speed measurements of the voltages using sensors 262. The DSP controls the operation of the IGBT's 258 to create three (3) time varying voltages in lines 256 that have the desired amplitude, frequency and are have a phase relationship with each other. The control algorithm of the DSP is described fully below. The produced voltage signals are filtered by an inductor-capacitor-inductor (LCL) filter 264,266,264 to produce three (3) smooth sine waves. In some embodiments, the output of the DSP-controlled bridges 259 and LCL filter is 60 Hz, 208 volt, 3-phase AC power. In other embodiments, the output may include one or more of the following, including but not limited to 50 Hz, 400 volt, 3-phase AC power, 50 Hz, 200 volt 3-phase AC power, 60 Hz, 200 volt 3-phase AC power, 50 Hz, 380 volt 3-phase AC power. In some embodiments, a transformer 268 may be included to isolate DC bus 250 and the rest of the modular power conversion system 212 from the 3-phase utility grid 216*a* and the 3-phase load 220*a*. The transformer may step up the produced voltage or step it down as desired. A grid-tie protection relay 270 may be included to meet IEEE 1547 and UL1741 standards to connect to the utility. The grid-tie protection relay 270 may be a SEL-547 that prevents connection to the grid until the voltages measured by sensors 262A match the phase frequency and amplitude of the grid voltages measured by sensors 262B. The grid-tie protection relay 270 may include anti-islanding functionality that disconnects the module from the grid, when the grid fails.

An embodiment of a three phase inverter module to connect to a 3-phase load is presented in FIG. 2I. However, in various embodiments, the configuration may vary. Three half bridges 259 are connected to the high and low side of the DC bus 250. The IGBT's 258 are controlled by a DSP (not shown) based on the high speed measurements of the voltages using sensors 262. The DSP controls the operation of the IGBT's 258 to create 3 time varying voltages in lines 256 that have the desired amplitude, frequency and are out of phase with each other. An embodiment of the control algorithm of the DSP is described fully below. The voltage signals produced are filtered by an inductor-capacitor-inductor (LCL) filter 264,266,264 to produce 3 smooth sine waves. In some embodiments, the output of the DSP-controlled bridges 259 and LCL filter is 60 Hz, 208 volt, 3-phase AC power. In other embodiments, the output may include one or more of the following including but not limited to 50 Hz, 400 volt, 3-phase AC power, 50 Hz, 200 volt 3-phase AC power, 60 Hz, 200 volt 3-phase AC power, 50 Hz, 380 volt 3-phase AC power. In some embodiments, a transformer 268 may be included to isolate DC bus 250 and the rest of the modular power conversion system 212 from the load 220a. In some embodiments, a transformer may step up the produced voltage or step it down as desired.

Figures 2J, 2K:
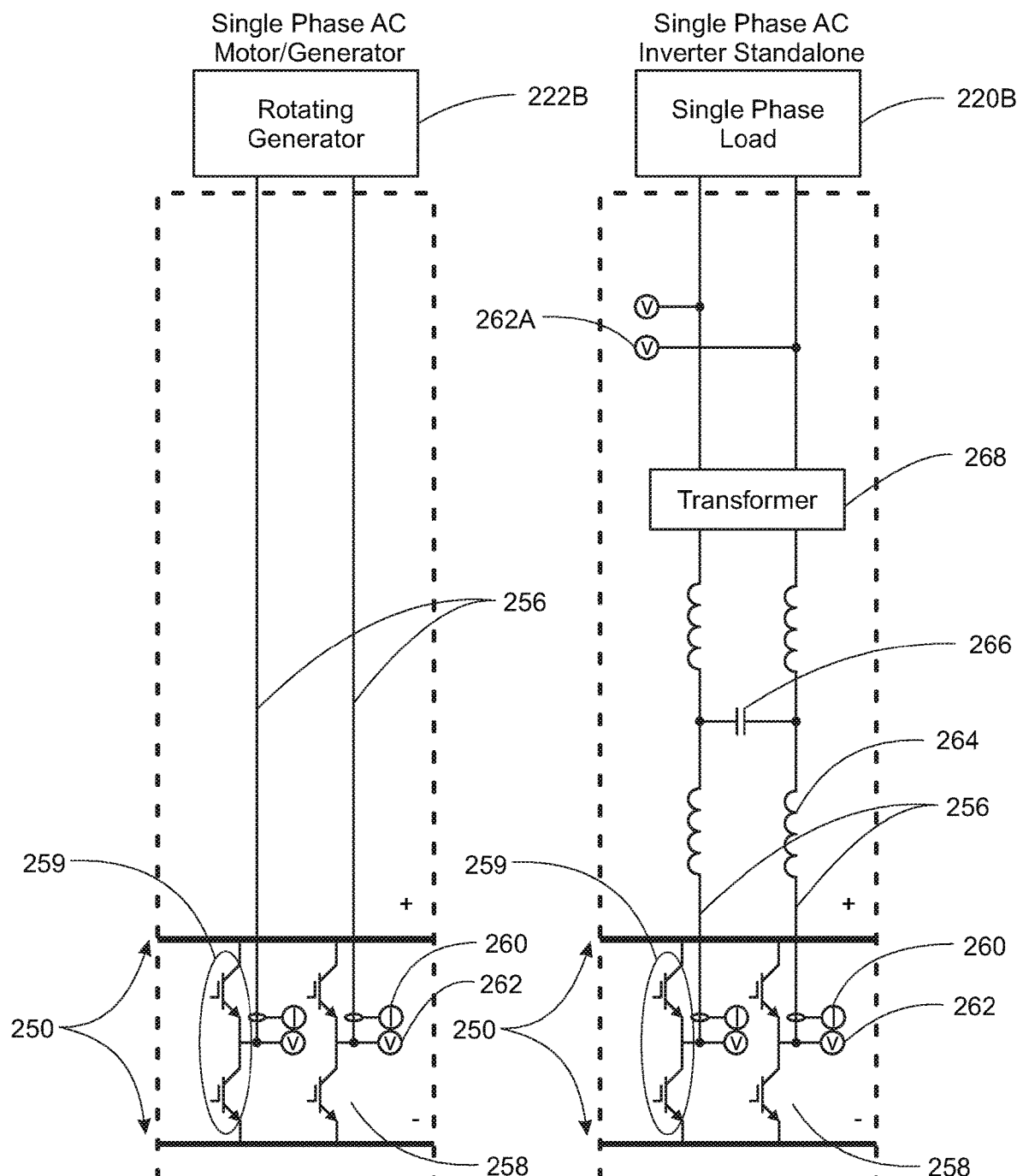

In some embodiments, a module to connect a single phase generator is presented in FIG. 2J. Here the two power lines 256 are connected to the midpoint of two half bridges 259 that are in turn connected across the DC bus 250. In some embodiments, the AC power from the generator is rectified efficiently into DC power through the rapid opening and closing of the IGBTs 258. In some embodiments, the opening and closing of the IGBTs 258 are controlled by a DSP (not shown) based on the high speed measurements of the voltages using sensors 262. In some embodiments, the control algorithm of the DSP is described fully below. In some embodiments, the module 222 may also include current sensors 260. In some embodiments, module 222 may connect one or more of, but not limited to, the following list of generators: internal combustion engine generators, Stirling generators, external combustion generators, wind turbine generators, water turbine generators.

An embodiment of a single phase inverter module to provide AC power to a single phase load is shown in FIG. 2K. Two half bridges 259 are connected across the DC bus 250. The power lines 256 are connected to the midpoint of the two bridges 259. The IGBT's 258 are controlled by a DSP (not shown) based on the high speed measurements of the voltages using sensors 262. The DSP controls the operation of the IGBT's 258 to create a time varying voltage in lines 256 that have the desired amplitude and frequency. The control algorithm of the DSP is described fully below. In some embodiments, the voltage signals produced are filtered by an inductor-capacitor-inductor (LCL) filter 264,266,264 to produce a sine wave. In some embodiments, the output of the DSP-controlled bridges 259 and LCL filter is 60 Hz, 120 volt, 1-phase AC power. In other embodiments, the output may include one or more of, but not limited to, the following: 50 Hz, 220 volt, 1-phase AC power, 50 Hz, 100 volt 1-phase AC power, 60 Hz, 100 volt 1-phase AC power, 50 Hz, 230 volt 1-phase AC power. In some embodiments, a transformer 268 may be included to isolate DC bus 250 and the rest of the modular power conversion system 212 from the load 220b. The transformer may step up the produced voltage or step it down as desired.

Figure 2L:
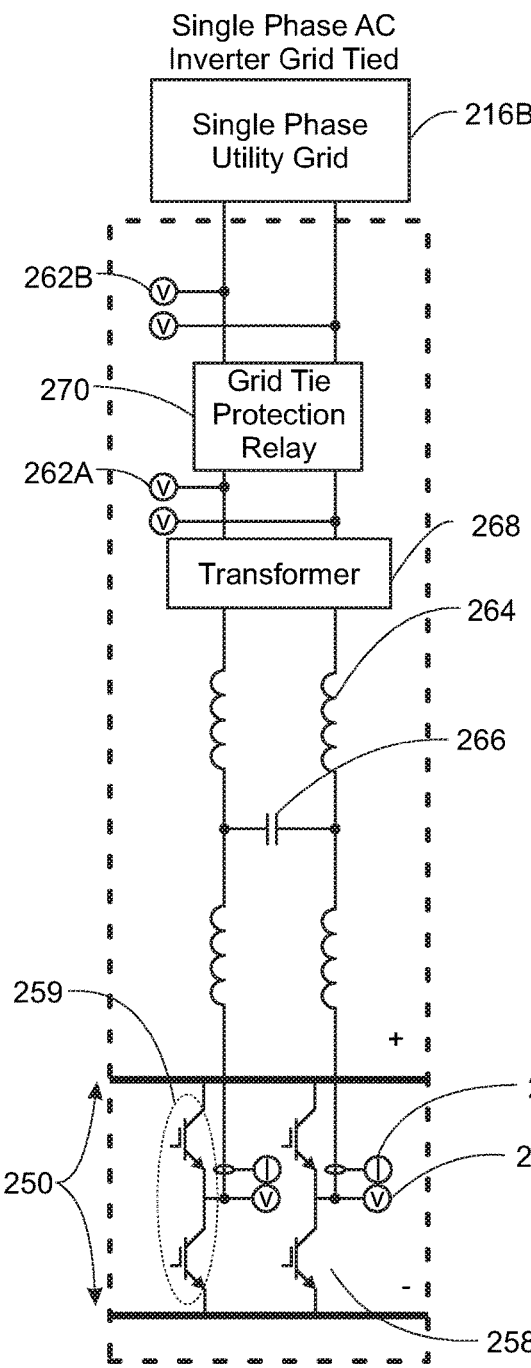

An embodiment of a single phase inverter module to provide AC power to a single phase grid is shown in FIG. 2L. In this embodiments, two half bridges 259 are connected across the DC bus 250. The power lines 256 are connected to the midpoint of the two bridges 259. The IGBT's 258 are controlled by a DSP (not shown) based on the high speed measurements of the voltages using sensors 262. The DSP controls the operation of the IGBT's 258 to create a time varying voltage in lines 256 that have the desired amplitude and frequency. The control algorithm of the DSP is described fully below. The voltage signals produced are filtered by an inductor-capacitor-inductor (LCL) filter 264, 266,264 to produce a sine wave. In some embodiments, the output of the DSP-controlled bridges 259 and LCL filter is 60 Hz, 120 volt, 1-phase AC power. In other embodiments, the output may include one or more of, but is not limited to, the following: 50 Hz, 220 volt, 1-phase AC power, 50 Hz, 100 volt 1-phase AC power, 60 Hz, 100 volt 1-phase AC power, 50 Hz, 230 volt 1-phase AC power. In some embodiments, a transformer 268 may be included to isolate DC bus 250 and the rest of the modular power conversion system 212 from the load 216b. In some embodiments, the transformer may step up the produced voltage or step it down as desired.

In some embodiments, a grid-tie protection relay 270 may be included to meet IEEE 1547 and UL1741 standards to connect to the utility. The grid-tie protection relay 270 may be a SEL appropriate for single phase that prevents connection to the grid until the voltages measured by sensors 262A match the phase frequency and amplitude of the grid voltages measured by sensors 262B. In some embodiments, the grid-tie protection relay 270 may include anti-islanding functionality that disconnects the module from the grid, when the grid fails.

Figure 2M:
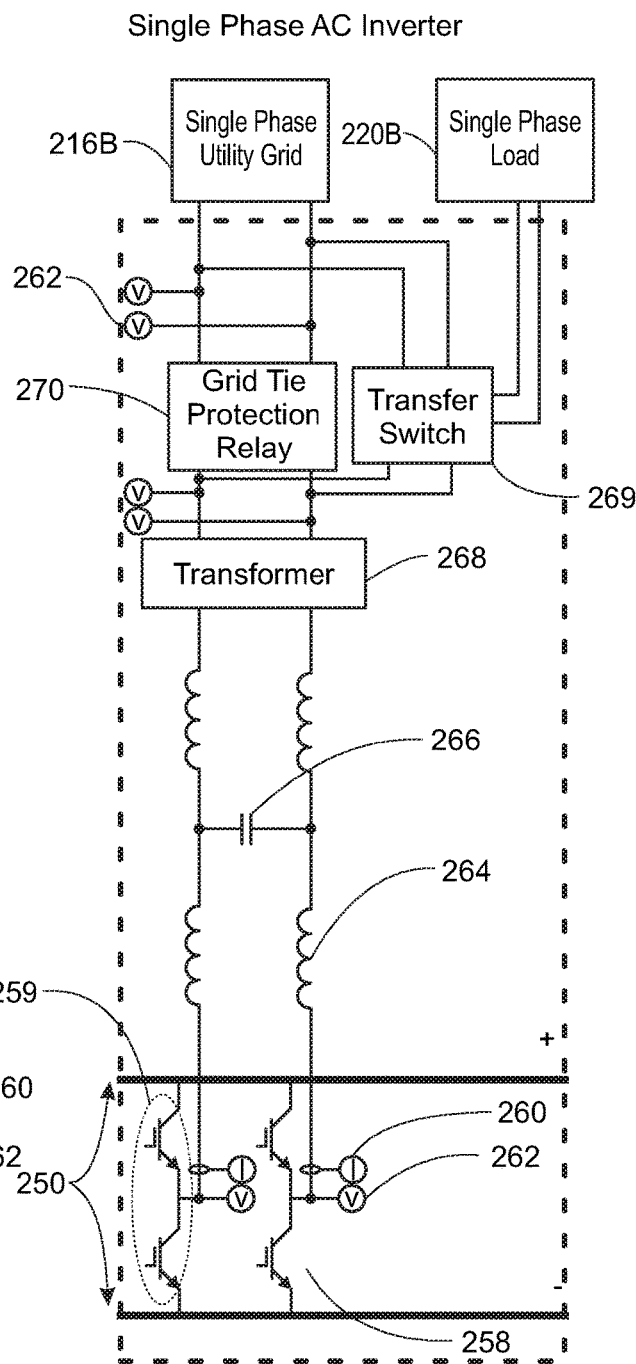

In some embodiments, an inverter module with a grid-tie contactor and a transfer switch, such as the embodiments shown in FIG. 2M, is included. The hardware topology including the half bridges 259, LCL filter, transformer 268 and grid-tie protection relay 270 may be the same/similar as described above for FIG. 2L. In some embodiments, the module in FIG. 2M add a transfer switch to connect the load to the grid or the AC power from the module when the grid fails. In some embodiments, the transfer switch also disconnects the grid from the AC power when the grid fails.

Prioritizing Power Suppliers

In some embodiments, the modular power conversion system 212 may direct the power from a number of sources to one or more loads or sinks of power. The power sources may include, but are not limited to, one or more of the following: internal combustion engine generators, Stirling generator, external combustion engine generators, renewable power generators, battery and the electrical grid. Renewable power generators may include, but are not limited to, one or more of the following: solar photovoltaic, wind turbine generators, hydro power generators, etc. In some embodiments, the sinks or users of power may include the electric grid, in plant AC loads, DC loads, battery charging, brake or shunt. The following describes an embodiment of a modular power conversion system 212 designed such that energy flows as desired. In general, it is desirable to draw power from the least expensive source of power first and as the demand for additional power increases, use the next least expensive power and so on until that last source of power engaged is the most expensive power. Similarly, in some embodiments, the power flows to the highest priority circuits first and when the load of the highest priority circuits is met, power is supplied to secondary and tertiary circuits. By way of example a modular power conversion system connecting a PV circuit, the grid, a local load and a battery may be organized to take power from the PV first, the grid second and the battery last. The same system might charge the battery first and then supply power to the load and grid. Embodiments of circuits to connect these sources and loads are presented in FIGS. 2A-2M and described above.

In some embodiments, prioritization may be achieved by assigning a specific and different operating point to each energy producer or consumer "node". This operating point is assigned in terms of a voltage regulation point on a common DC bus (i.e. shared by all such nodes). Each node embodies a voltage regulating control which in operation attempts to bring the common DC bus voltage equal to its assigned operating point. In some embodiments, the node does this by either causing current to flow into the common DC bus thereby raising its voltage, or causing current to flow out of the common DC bus thereby lowering its voltage. In some embodiments, each node causes current to flow in a direction that balances the current flow from other nodes such that the desired bus voltage is maintained. In some embodiments, the voltage regulators of each node are setup so that only one node at a time is not in saturation, meaning that all but one node are either fully open or fully closed to power flow and one node is actively varying the power flow to or from the DC bus to control the DC bus voltage. Alternative systems may be setup with nodes that do not attempt to control the DC bus voltage. Examples of such nodes may include a PV array operating with a maximum power point tracking and an engine-driven generator operating at a fixed or system-commanded engine speed. In some embodiments, the operating points of each energy producing or consumer node may be changed any time the system is on including, but not limited to, while the system is running. In some embodiments, the operating points may be changed using a user interface. In some embodiments, an overvoltage level may be set on the DC bus 250 so that if the DC bus voltage reaches a set voltage, the system will shut off. In some embodiments, the overvoltage level of the DC bus 250 may be changed any time the system is on including, but not limited to, while the system is running. In some embodiments, the overvoltage level of the DC bus 250 may be changed using a user interface.

A PV array operating with a maximum power point tracking (MPPT) algorithm. In this case the PV subsystem will attempt to seek out the combination of voltage and current at the PV array that result in the greatest supply of power from the array. Maximum power does not correspond with either maximum voltage or maximum current and therefore it is counterproductive to require the MPPT implementation to operate at a fixed voltage target. Instead the MPPT PV node is allowed to operate over any range of voltage that it can achieve while other consumer nodes continue operate at fixed voltage points and consume the energy that is available from the PV.

An engine-driven generator operating at a fixed or system-commanded engine speed. In this case the generator will deliver whatever net energy remains from the raw energy (fuel) that is supplied to its engine. Like the MPPT example above, other nodes will consume as much of this available energy as they able up to their respective limits. This type of node, as an energy producer, always supplies all of its capacity to the common bus, even when that capacity exceeds the combined demand of the consumer nodes.

In various embodiments, a given node may be of a type that may provide current flow in either direction, or only in one direction or the other. For example a grid-tied inverter may be designed to permit current flow in either direction; a photovoltaic array can only provide current flow into the common bus. It cannot consume current flowing out of the bus.

In various embodiments, it may be assumed that each node also embodies a current regulating or limiting control. The value assigned to each node's current control is chosen according to the physical limits or needs of that node (or the broader physical constraints of the overall system if they are more restrictive). For example, a battery charger node may be configured with current limits according to the physical requirements of the attached batteries, and possibly further restricted by the current carrying capacity of associated components and wiring that make up the charging system. In some embodiments, the value assigned to each node's current control may be changed any time the system is on including, but not limited to, while the system is running. In some embodiments, each node's current control may be changed using a user interface.

In various embodiments, the current limits of each node, when and if they are reached, will override the node's voltage regulating control and at this point the node will cease its ability to regulate the bus voltage and enter a mode of constant current regulation. Each node will act up to the limits of its ability, expressed in terms of current flow in one direction or the other, to maintain the common DC bus at its assigned voltage level. Once this limit is reached, that node continues to operate at its maximum capacity but inherently yields its control of the bus voltage to other nodes which have greater capacity.

Backup Power System

Figure 28A:
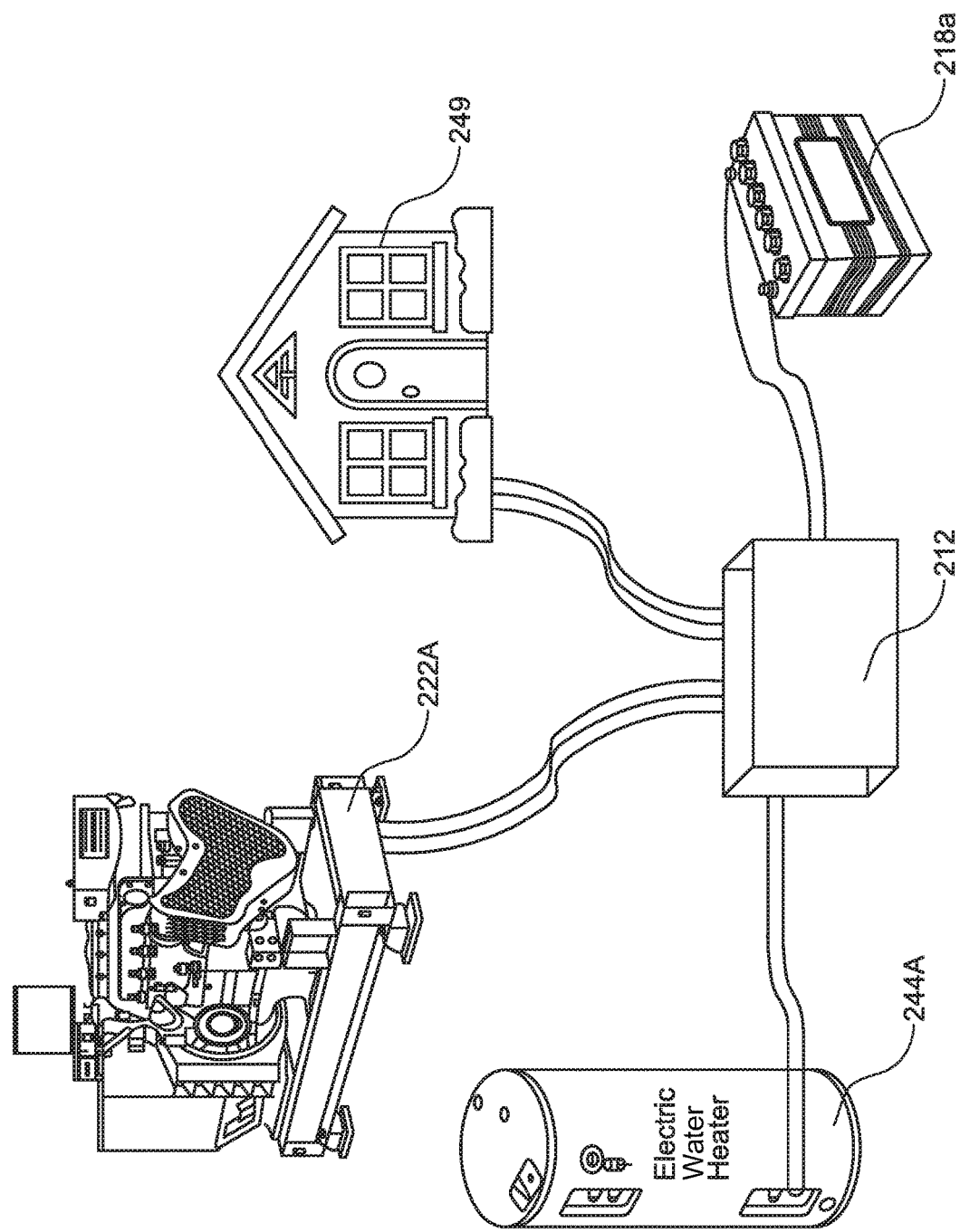

Referring now to an embodiments of a power system FIG. 28A including a battery 218A, a Stirling generator 222A, an inverter connected to a load 249 and a brake 244A that are interconnected with a modular power conversion system 212. The modular power conversion system 212 in this example includes the following modules in FIG. 2A: brake module 244, a generator module 222, an AC inverter module 220 and a battery module 218. The brake module 244 is a power sink and connects an electrical resistor 222A that can dissipate excess electrical power from the DC bus 250 by converting it to heat. In some embodiments, the power from the DC bus 250 may be purposely directed to the brake module 244 to create heat as the primary purpose of the system.

The generator module 222 as described above is a power source that converts the polyphase electrical power from the electric generator 222A into DC power on the DC bus 250. The AC Inverter module 220 is a power sink that converts DC bus power to AC power and delivers it to an external load 249. The battery module 218 may be act as either a sink or a source of power to the DC bus 250.

In various embodiments, the Stirling generator may be one of the various embodiments shown and described in U.S. patent application Ser. No. 12/829,320 filed Jul. 1, 2010, now U.S. Publication No. US-2011-0011078-A1 published Jan. 20, 2011 and entitled Stirling Cycle Machine, which is hereby incorporated herein by reference in its entirety; or in U.S. patent application Ser. No. 13/836,946 filed Mar. 15, 2013, and entitled Stirling Cycle Machine which is hereby incorporated herein by reference in its entirety; or in U.S. patent application Ser. No. 14/211,621, filed Mar. 14, 2014 and entitled Stirling Cycle Machine which is hereby incorporated herein by reference in its entirety.

Figure 28B:
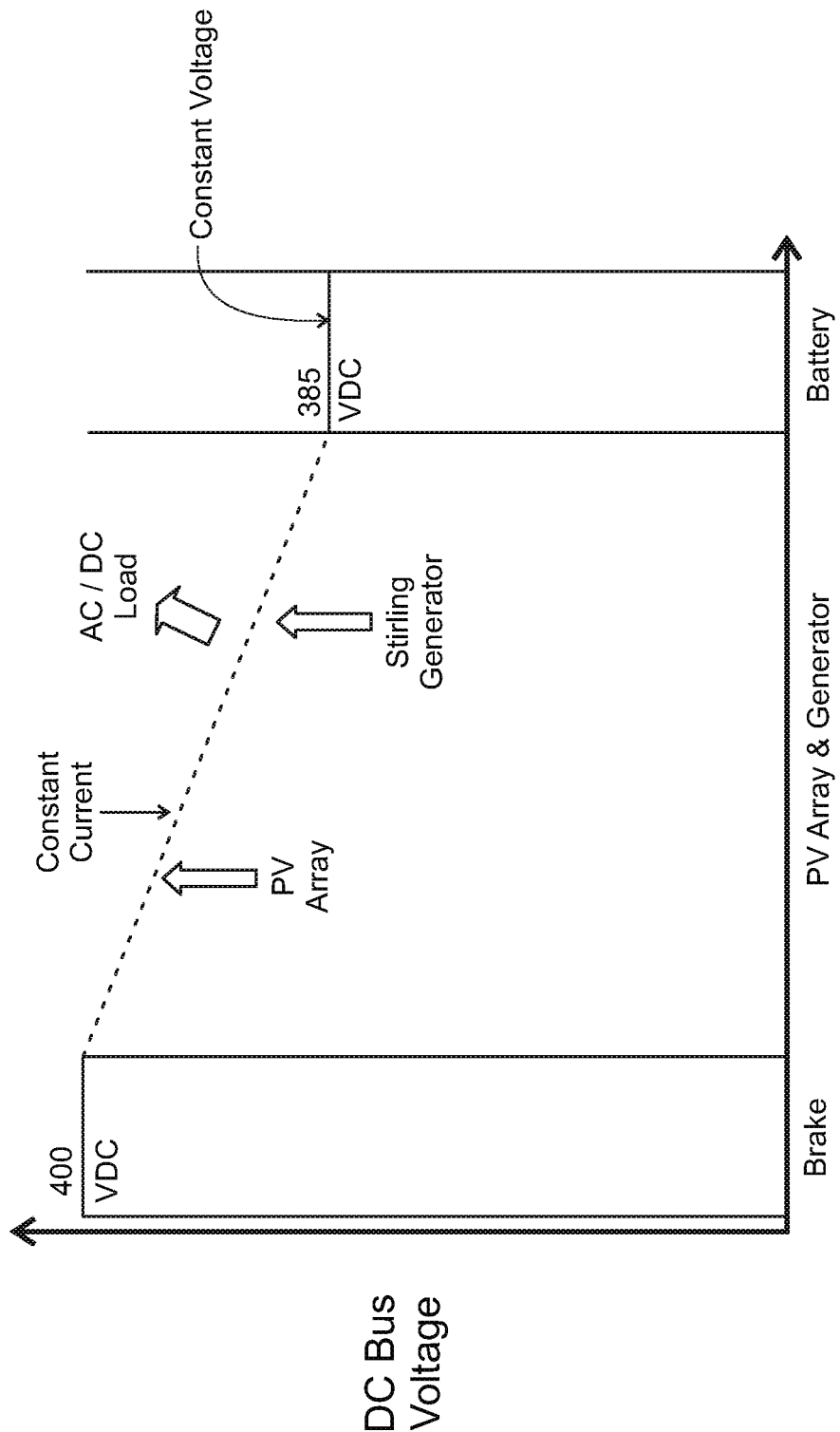

The prioritization of the nodes or modules may be conceptualized in FIG. 28B, where the operating mode is plotted against the DC bus voltage. In this embodiment, the battery boost module 218 may be programmed to supply enough current to bring the DC Bus voltage to 385 VDC up to its current limit. In one example the battery module 218 is limited to 20 amps. In this same example, the Stirling engine may be controlled to a specific speed and temperature. The Stirling generator module 222 supplies the net power to the DC bus, which will drive the bus voltage higher. The AC inverter module 220 supplies the power demanded by the load 249. The module controlling the brake 244 is programmed to limit the DC bus voltage to 400 volts. In operation, the battery module 218 will supply power to the DC bus 250 until the DC bus voltage meets the battery module's setpoint of 385 volts. When the generator 222A is supplying power, the DC bus voltages may rise above 385 volts at which point the battery module 218 will stop supplying power and begin to absorb power by charging the battery 222A. The battery module 218 will continue to absorb more and more power as the voltage rises up to the charging limit of the battery 218A. If the generator continues to supply more power than the battery and the load can absorb then the added power will drive the DC bus voltage higher until the DC bus voltage reaches the brake module voltage set point. The brake module 244 will engage the resistor 244A progressively by increasing the duty cycle of one of the IGBT's 258 in FIG. 2G. In this embodiment the brake module 244 is set to 400 volts. If the load 249 exceeds the power supplied by the generator 222A, the DC bus voltage will drop until it reaches the battery module voltage setpoint. In this embodiment the battery module set point is 385 VDC. If the DC Bus voltage reaches 385 VDC, the battery module 218 will start to supply power from the battery 218A to meet the load demand. If the load exceeds the generator and the battery power capacity, then the DC bus voltage will drop below 385 DC. If the DC bus voltage drops low enough the inverter module 216 will shut down and disconnect the load. This simple example illustrates how power flows to the sinks (battery 218A, brake 244A) and from the sources (generator 222A, battery 218A) can be controlled or prioritizing by individually setting the operating voltages for each of the control modules. However, in various embodiments, the values given may vary.

Grid-Tied Power System

Figure 28C:
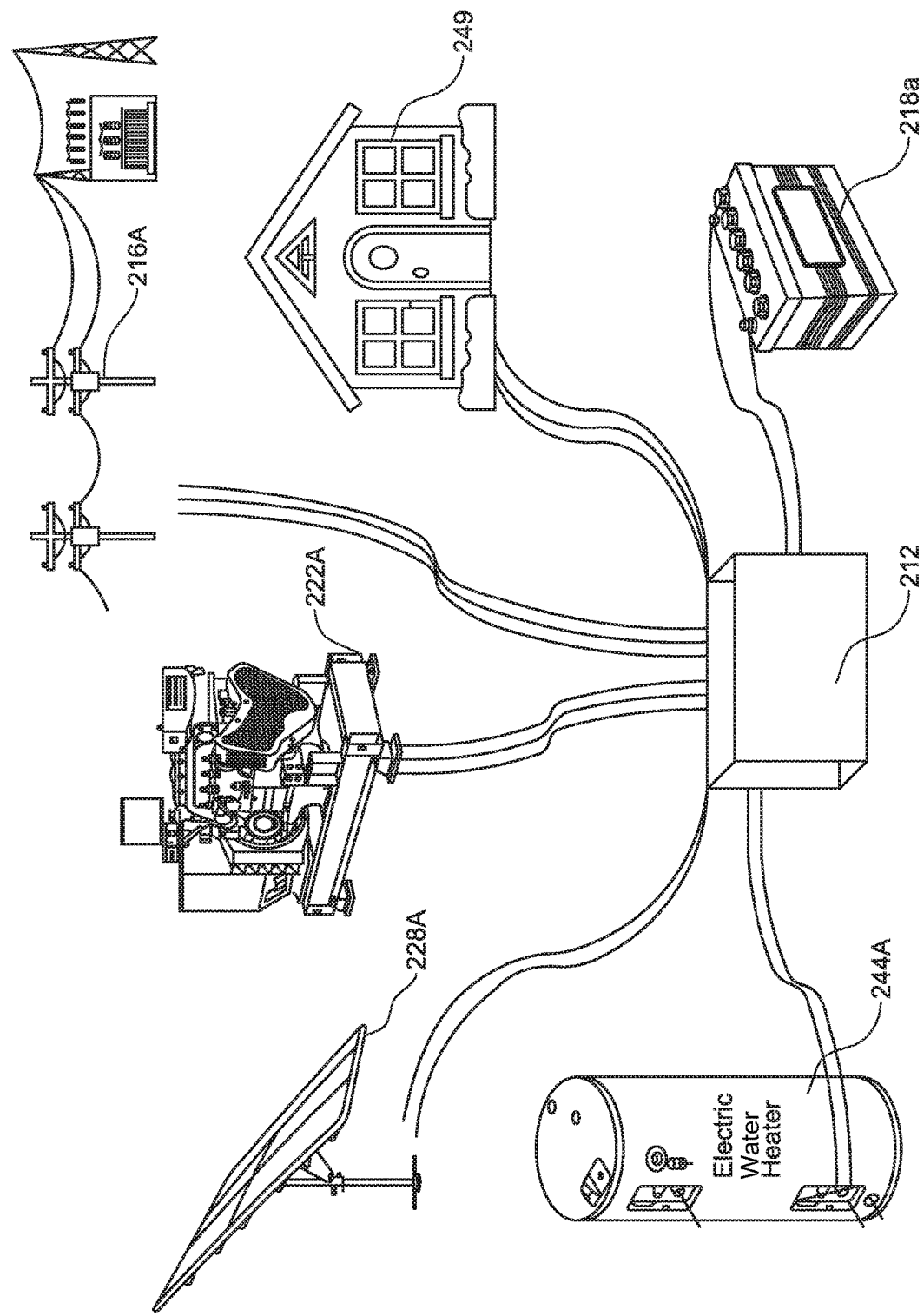

An embodiment of a system including a grid-tied inverter and a solar PV array is sketched in FIG. 28C. The electrical grid 216A and the AC load may in one embodiment be connected to a module 216 that syncs the inverter output to the grid 216A and connects the AC load 220A to either the inverter or the grid 216A. The prioritization of the nodes or modules for a grid-tied example may be conceptualized in FIG. 28D, where the operating mode is plotted against the DC bus voltage. In this embodiment, the battery boost module 218 is programmed to supply enough current to bring the DC Bus voltage to 385 VDC up to its current limit. In one embodiment the battery module 218 is limited to 75 amps. In this same embodiment, the Stirling engine may be controlled to a specific speed and temperature. The Stirling generator module 222 supplies the net power to the DC bus, which will drive the bus voltage higher. Similarly a PV array 228A supplies all its power to the DC bus. In some embodiments, the AC inverter module 220 attempts to maintain the DC bus voltage at its setpoint. In this embodiment the AC inverter module setpoint is 395 VDC. If the DC bus voltages drops below 395 VDC, power will flow from the grid onto the DC bus. If the DC bus voltage increases above 395 VDC, then power will flow out of the DC bus and onto the grid 216A or into the AC load 249. Power will flow in one direction or the other subject to the maximum current rating of the inverter module 216. In this embodiment the maximum current rating for the inverter module 216 is 75 amps. In some embodiments, the module controlling the brake is programmed to limit the voltage to 400 volts. In some embodiments, in operation, the battery module 218 may supply power to the DC bus until the DC bus voltage exceeds the battery module's setpoint of 385 volts. In some embodiments, when the generator 222A and/or PV array 228A are supplying power, the DC bus voltages may rise above 385 volts at which point the battery module will stop supplying power and begin to absorb power by charging the battery 222A. In some embodiments, the battery module will continue to absorb more and more power as the voltage rises up to the charging limit of the battery 218A. As the generator 222A and/or PV array 228A supply more power to the bus, the inverter module 220 will direct this generated-power minus the battery-charging-power to the load 249 and/or grid 216A. In some embodiments, in the event that the generator 222A and/or PV array 228A supply more power to the DC bus 250 than the inverter module 218 and the battery 218A can absorb then the added power will drive the DC bus voltage higher until the bus voltage reaches the brake module set voltage. Similarly, the DC bus voltage may rise, if the inverter is unable to pass enough current to balance the generator power. In this embodiment the brake module set-point is 400 volts, so as more power is supplied to the DC bus by the generator, the brake controller 244 will direct more and more power to the resistive load 244A. In various embodiments, the values given may vary.

Grid-Tied Power System with Prioritized Power Generators

In some embodiments, the elements in FIG. 28C may be prioritized to favor power from one source over another. This prioritized load and generator scheme can be conceptualized in FIG. 28E, where the operating mode is plotted against the DC bus voltage. In this example the voltages set points on the power source modules 216, 218 and 222 are arranged to first use power from the PV arrays 228A to meet as much of the load 249 as possible and then use power from the generator 222A and last of all from the grid 216A to meet the rest of the load 249. The prioritization process, in some embodiments, may include the following process of providing enough power to meet a given load 249 applied to the DC bus 250 through module 220. In various embodiments, the values may differ. In some embodiments, the load 249 reduces the DC bus voltage. The PV module 228, which is set at the highest voltage, attempts to bring the DC bus voltage up to its set point by providing increasing amounts of power from the PV array 228A until either the load is met or all the power of the PV array is connected to DC bus 250. In this embodiment the set point of the PV module 228 is 395 VDC. If the DC bus voltage remains the set point for the generator module 222, then, in some embodiments, the generator module 222 commands increasing amounts of power from the generator 222A until DC bus voltage holds at the generator module voltage set point. In this embodiment the generator module set point voltage is 390 VDC. If PV array 216a and the generator 222A cannot meet the applied load 249, then the DC bus voltage may drop below the generator module set point and the grid-tied inverter module 216 will provide increasing amounts of power to the load in attempting to hold the DC bus voltage at the grid-tied inverter module voltage set point. In this embodiment, the voltage set point for the grid-tied inverter is 385 VDC. However, in various embodiments, this value may be higher or lower. If the load 249 is reduced, the grid-tie inverter module 216 will reduce the amount of power it provides to hold the DC bus voltage at 385 until the grid is providing zero power. If the load is further reduced, excess power from the DC bus will flow onto the grid. This is one embodiment of controlling the prioritization of power resources through the operating voltage set point of the module. These set points are controlled by the master controller 252 and can be changed from moment to moment. In some embodiment, where the price of grid power varies enough that power from the generator 222A is cheaper, the master controller 252 may switch the voltage setpoint of the generator module 222 and the grid-tied inverter module 216 to maximize the amount of power from either the generator 222A or the grid 216A in order to minimize the total cost of electricity.

Figure 28E:
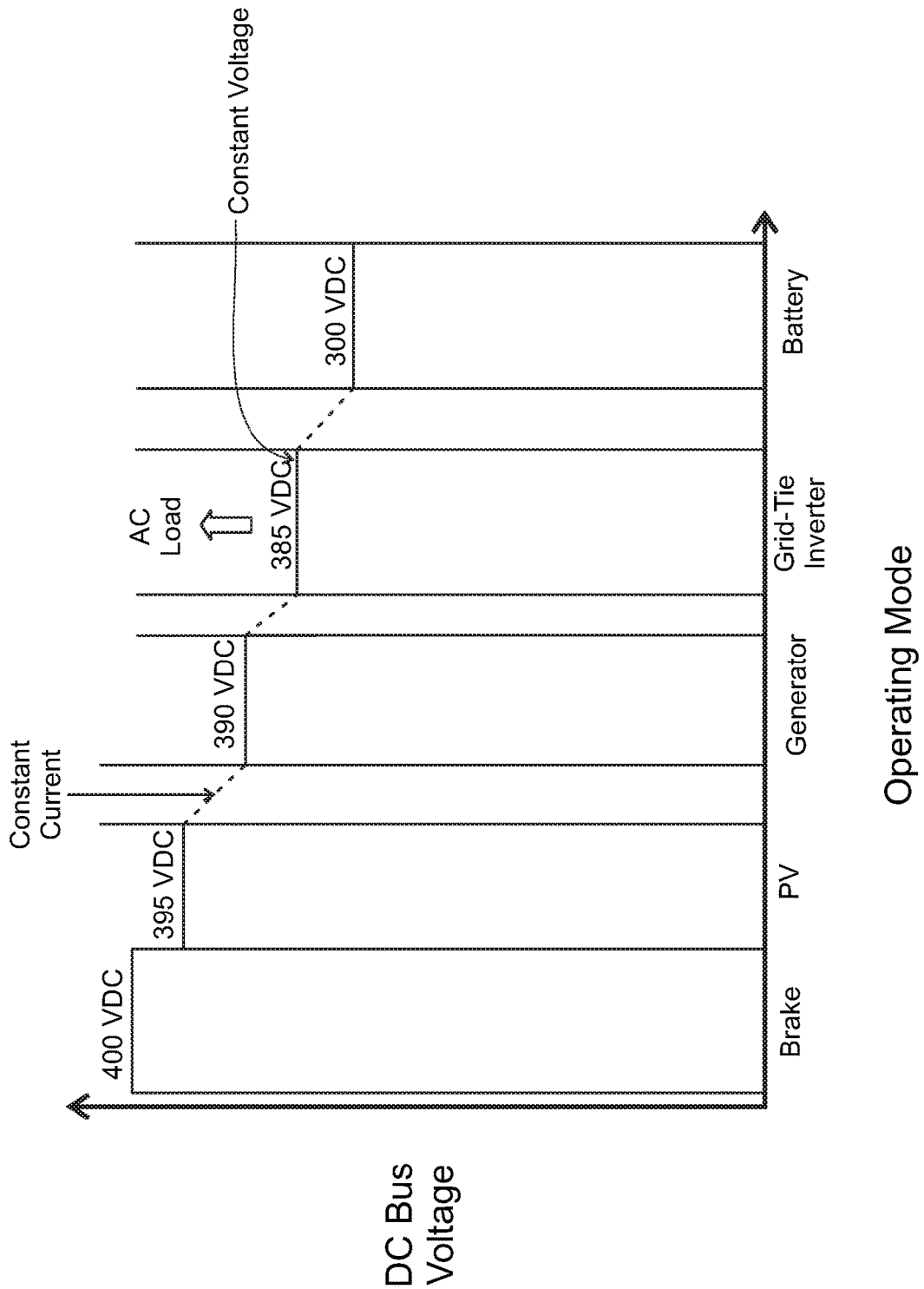

The systems shown in FIGS. 28A and 28C and the module set point voltages in FIGS. 28B, 28D and 28E are examples of embodiments of the modular power conversion system 212. Other arrangements of components, other components and voltages are contemplated in this invention.

Figure 3A:
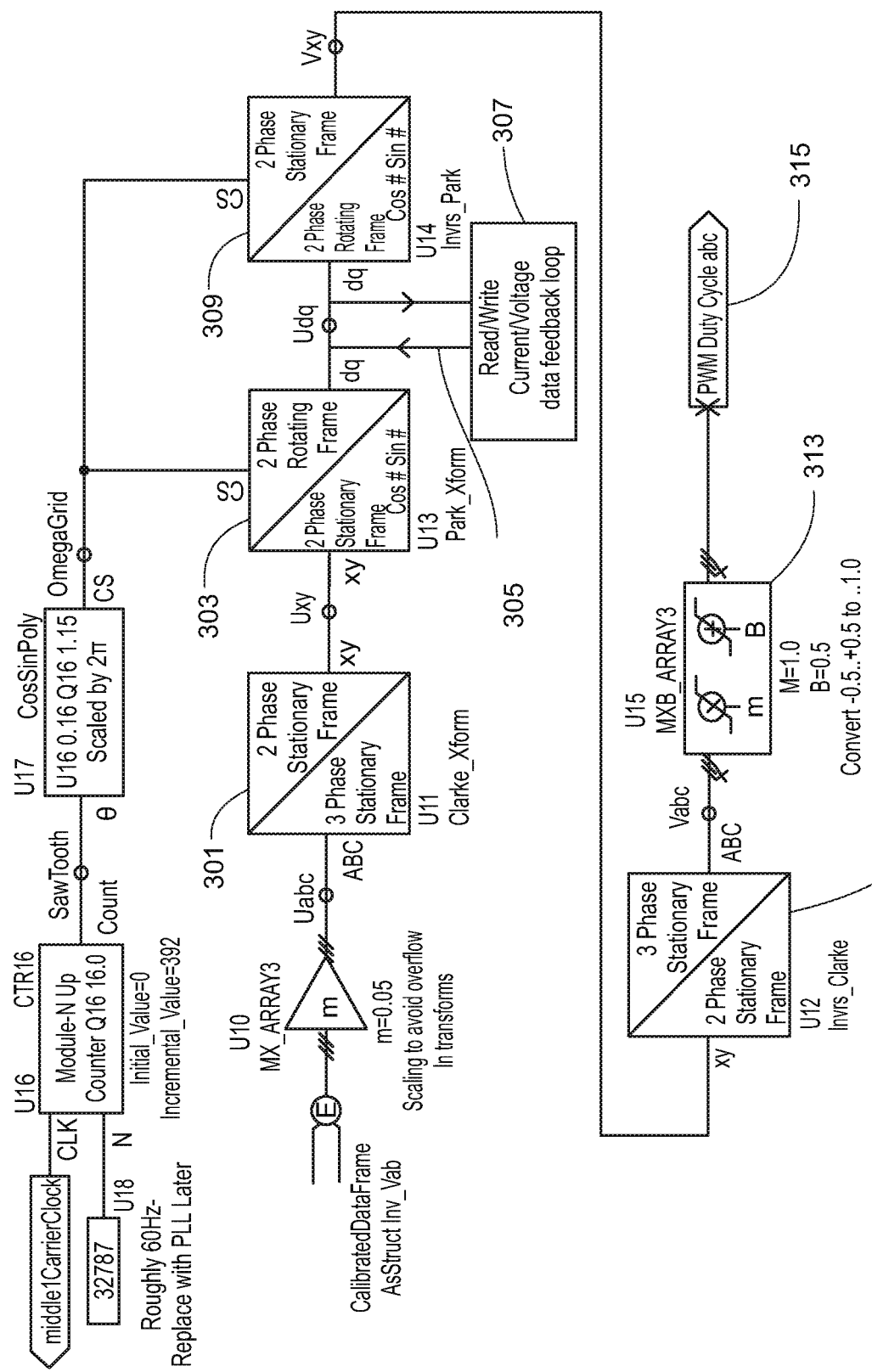
FIG. 3A-3B are a diagrammatic representation of a power conversion system according to one embodiment.
Figure 3B:
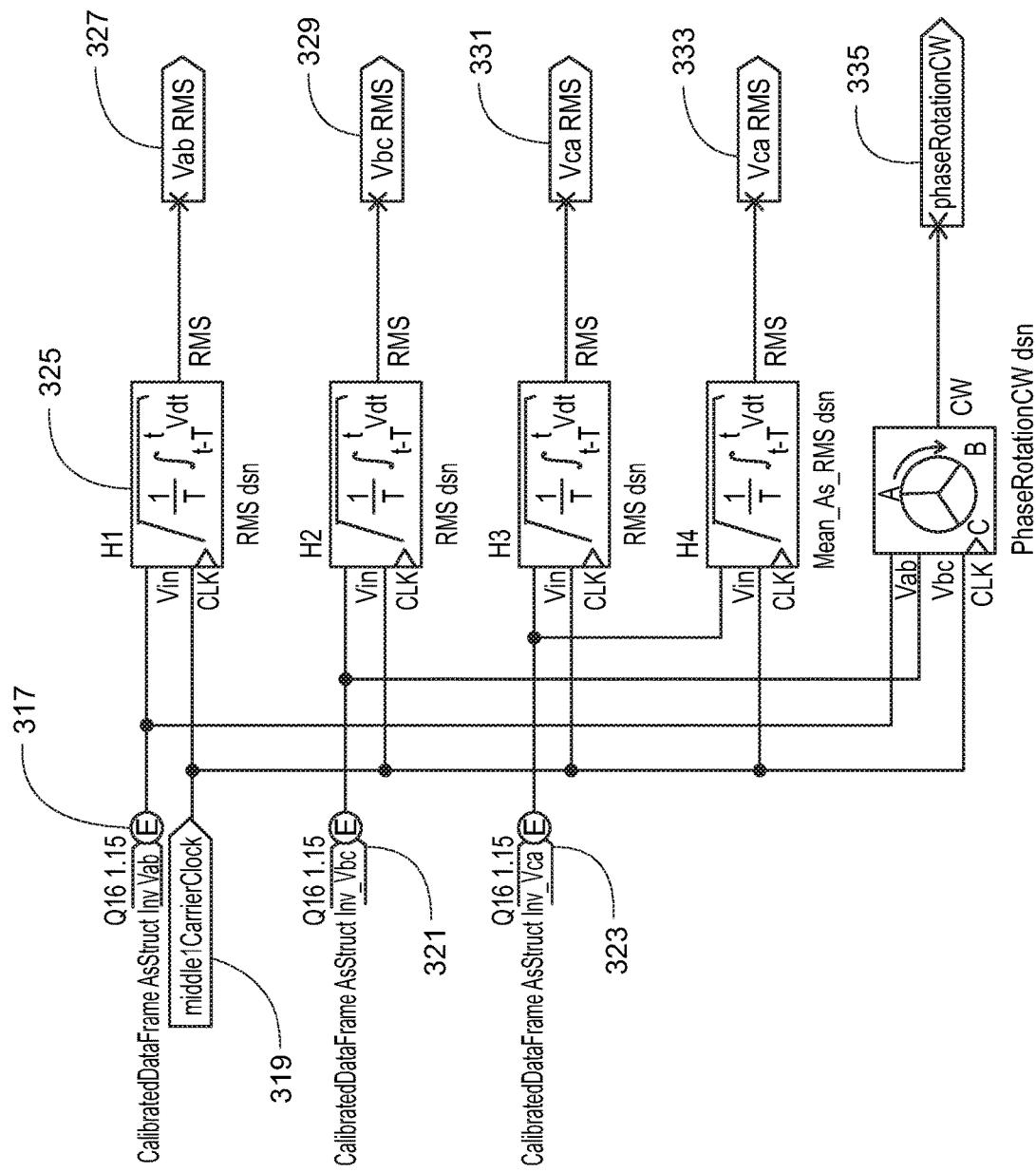

Observing FIG. 3A, a block diagram of a series of blocks which are generally representations of computer code transforming the power to facilitate analysis and reading/writing of desired power distribution to the grid or otherwise is shown. Starting initially from the left hand side of the block diagram the rotation of the power phases must be determined as clockwise, or counter clockwise rotation so that power eventually output from an inverter into the grid system is matched with the grid. To run power in parallel with the grid it is initially important to know the IEEE protective relaying standards that the grid essentially runs on. It is important to know what the Vab, Vbc and Vca RMS component voltages are and the way the phases are rotating as seen in the voltage measurement diagram of FIG. 3B. Returning to FIG. 3A, from the left hand side of the block diagram, Vab, Vbc and Vca make up a three element voltage vector which are scaled and received by the software code embodied by blocks 301-303, for undergoing a Clarke-Park transform. The transform converts the 3-phase vector to an orthogonal coordinate system and a Udq reference frame which enables accurate measurement of the magnitude of the voltage vector uncluttered by the rotating phases of the voltage. By way of explanation, the three phase DC wave form enters block 301_in a stationary 3-phase reference frame for conversion to a stationary form single phase Uabc, i.e. Vabc (U is a European denotation of voltage). A sin-cosine oscillator is oscillating at 60 Hz to form a phase lock loop for locking onto the utility waveform. Subsequently, in the Park transform the stationary frame is converted to the rotating frame by demodulating the stationary wave form with the 60 Hz waveform, which results in the real and imaginary Udq reference frame.

Once the wave form is determined in the rotating Udq reference frame, a general feedback loop 305 is provided to a controller 307 where an operator, engineer or computer program may analyze the rotating Udq reference frame and determine and regulate via read/write how much current is desirable to send to the grid for example, or to any other component of the system for that matter. So once this determination is made, for example how much current to return to the utility grid, the Udq rotating frame is converted back to the stationary frame through the inverse Park transform 309 and the quadrature Vxy vector component is transformed via the inverse Clarke transform 311 back into a 3-phase Vabc component and system hardware shown as block 313 takes the 3-phase signal and generates a duty cycle for the PWM 315.

Figure 34:
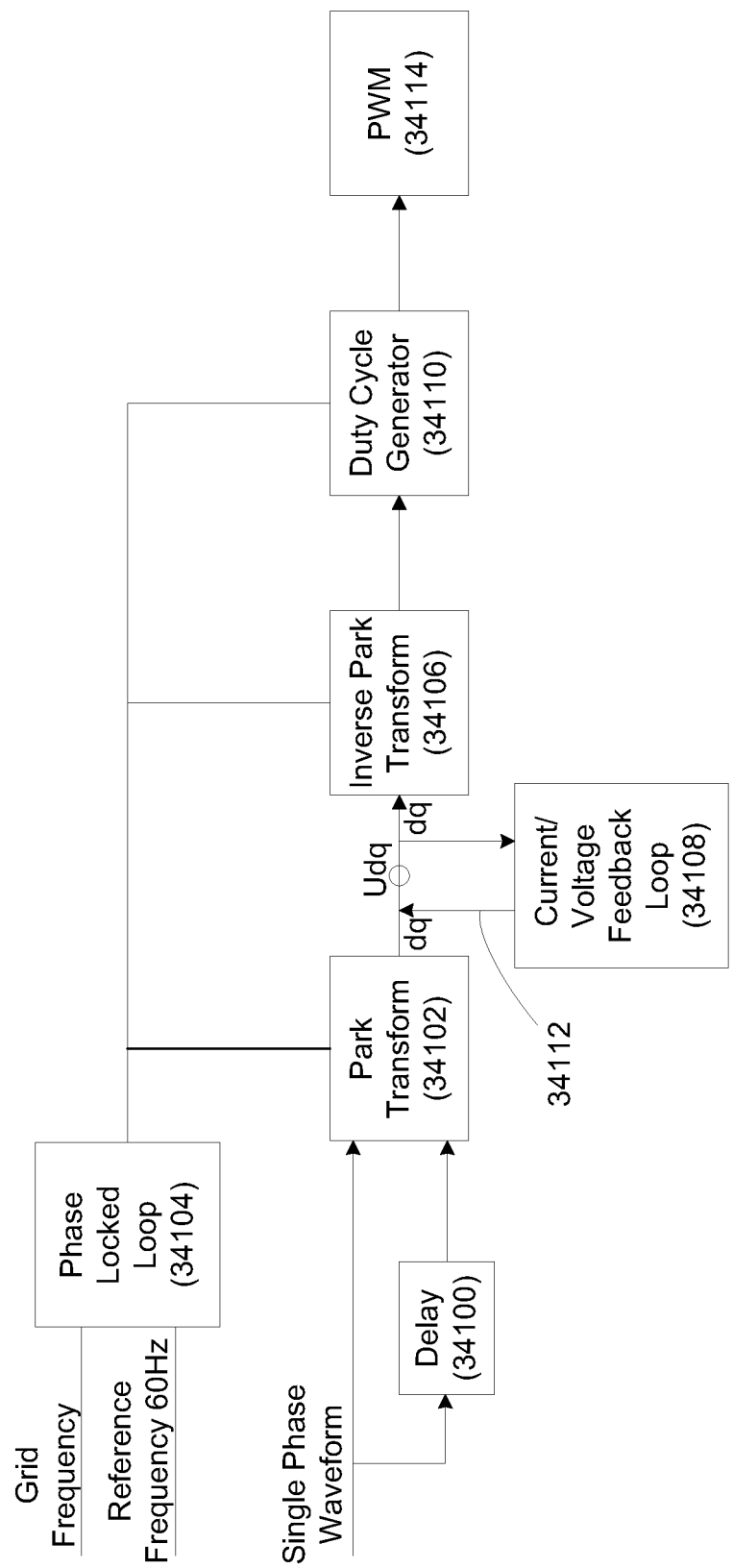
FIG. 34 is a diagrammatic representation of a single phase power conversion system according to one embodiment.

In some embodiments, the computer code transforming the power to facilitate analysis and generation of desired power distribution to the grid or otherwise may be altered for a single phase inverter and a single phase grid. Referring now to FIG. 34, a block of diagram of the computer code transforming the single phase power to facilitate analysis and generation of desired power distribution to the grid or otherwise is shown. In some embodiments, the system may transform the single phase power to facilitate analysis and generation of desired power distribution to the grid or otherwise in a similar manner to that shown in FIG. 3A, but without the use of a Clarke Transform. Instead, in some embodiments, the single phase waveform may be fed through a delay 34100 to create a second waveform that is a 90° phase shifted version of the single phase waveform. In some embodiments, the single phase waveform and the delayed single phase waveform may be used to perform a Park Transform 34102, resulting in a real and imaginary Udq reference frame.

In some embodiments, once the wave form is determined in the rotating Udq reference frame, a general feedback loop 34112 is provided to a controller 34108 where a computer program may analyze the rotating Udq reference frame and determine and regulate how much current is desirable to send to the grid, in some embodiments, or to any other component of the system for that in other embodiments. In some embodiments, once this determination is made, for example, how much current to return to the utility grid (in some embodiments), the Udq rotating frame is converted back to the stationary frame through the inverse Park transform 34106, and the system hardware shown as block 34110 takes the single phase signal and generates a duty cycle for the PWM 34114.

In some embodiments, the analysis obtained from the Park Transformation 303 of the three phase voltage waveform may be used to match the voltage and phase of the inverter to the grid for grid tie. In some embodiments, the inverter's phase locked loop actively adjusts the inverter's Udq reference frame to match the grid's phase and drive the q voltage measurement to zero.

In some embodiments, the analysis obtained from the Park Transformation 34102 of the single phase voltage waveform may be used to match the voltage and phase of the grid. In some embodiments, only the d components of the grid and inverter voltages may be measured as the q components of the grid and inverter voltages are implicitly zero when the phase locked loop is locked. In some embodiments, the q components of the grid and inverter voltages may also be measured. In some embodiments, the analysis obtained from the Park Transformation 34102 of the single phase current waveform may be used to perform current control in both the d and q axes.

Figure 35:
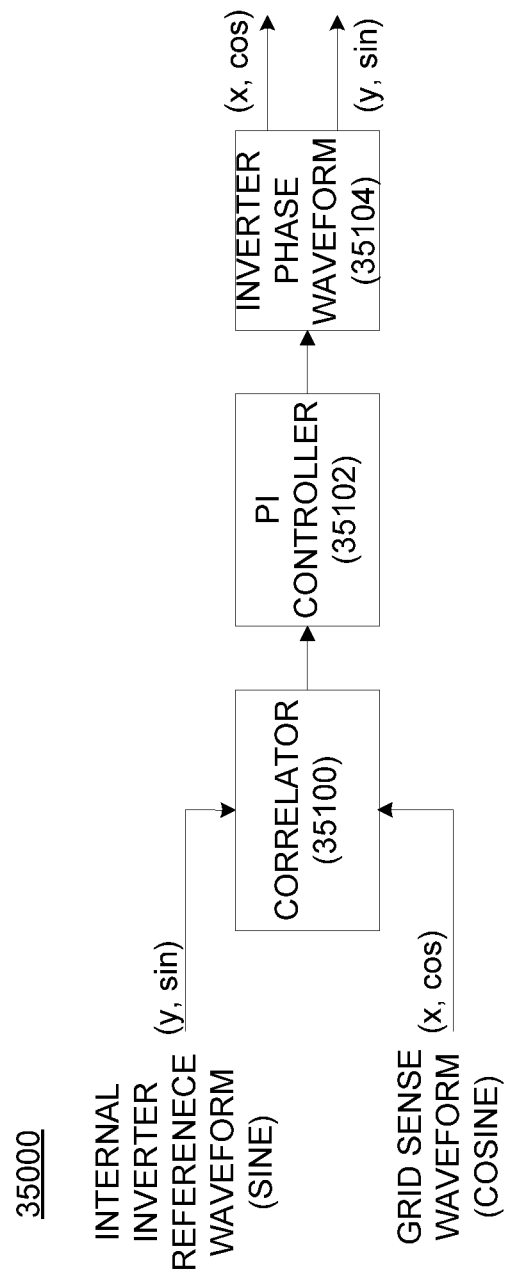
FIG. 35 is a diagrammatic representation of one embodiment of a phase locked loop for the phase synchronization of a single phase waveform with the grid.
Figure 36A:
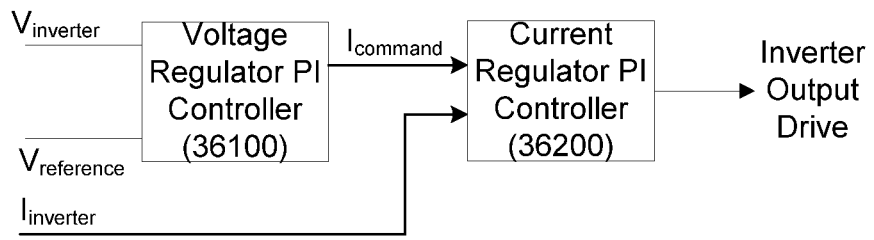
FIGS. 36A-36C are diagrammatic representations of inverter voltage and current control circuits according to one embodiment.
Figure 36B:
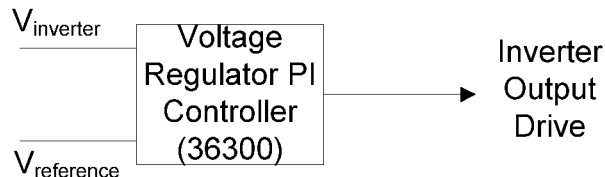
Figure 36C:
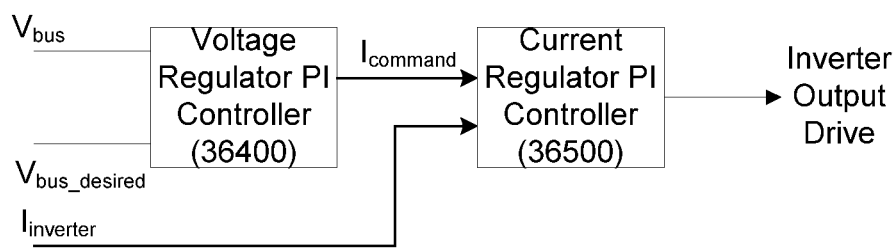

Referring now to FIG. 35, in some embodiments, the phase synchronization of a single phase waveform is performed by a phase locked loop 35000. In some embodiments, an internal inverter reference waveform and a grid sense waveform may be multiplied in a correlator 35100. In some embodiments, the internal inverter reference waveform may be obtained by transforming an angle, θ, into a sine and cosine waveform pair using a counter to drive θ from zero through $2\pi$ radians. In some embodiments, the internal inverter reference waveform may be in the form of a sine wave, and the grid sense waveform may be in the form of a cosine wave so that when there is a 90° phase difference between the inverter reference waveform and the grid sense waveform, there is no DC offset in the output of the correlator 35100. In some embodiments, the phase locked loop 35000 may contain a proportional integral (PI) controller 35102. In some embodiments, the PI controller 35102 may use the output of the correlator 35100 to adjust the frequency (and indirectly the phase) of the inverter reference signal to zero (the inverter's internal sine signal is 90° off from the measured grid cosine signal, and the cosine signals of the inverter and the grid are in phase). In some embodiments, the PI controller 35102 may adjust the frequency of the inverter by using a counter. In some embodiments, the steps of the counter may be altered to either increase or decrease the frequency of the waveform to bring the phase difference between the grid and the inverter to zero. In some embodiments, the PI controller may output the inverter phase waveform 35104 in its cosine and sine components. Referring now to FIGS. 36A-36C, in some embodiments, the inverter may have voltage and current control circuits. In some embodiments, the inverter may have an off grid control circuit 36000 as shown in FIG. 36A. In some embodiments, when the inverter is off grid, the goal voltage is the inverter output reference voltage (i.e. the desired voltage for the system load), so $V_{reference}$ may be the inverter output reference voltage. In some embodiments, a voltage regulator PI controller 36100 may measure the error between $V_{inverter}$ and $V_{reference}$ and send a current command to a current regulator PI controller 36200. In some embodiments, the current regulator PI controller 36200 may measure the error between $I_{command}$ and $I_{inverter}$ and change the output drive signal to increase or decrease the current to reach the desired voltage (i.e. the off grid control circuit controls the voltage by controlling the current). The off grid control circuit 36000 may be advantageous for many reasons, including but not limited to, that the current regulator PI controller may give the DSP a command to control the current so that the current will not reach the current fault threshold of the transistors in the inverter.

In some embodiments, the inverter may have an off grid control circuit 36002 as shown in FIG. 36B. In some embodiments, when the inverter is off grid, the goal voltage is the inverter output reference voltage (the desired voltage for the system load), so $V_{reference}$ may be the inverter output reference voltage. In some embodiments, voltage regulator PI controller 36300 may measure the error between $V_{inverter}$ and $V_{reference}$ and change the output drive signal to decrease or increase the voltage to reach the desired voltage. The difference between the off grid control circuits 36000 and 36002 is that the off grid control circuit 36002 does not have a current regulator PI controller, so the voltage regulator PI controller 36300 sends the inverter output drive signal to the output drive stage. One advantage of the off grid control circuit 36002 is that it is less complex than the off grid control circuit 36000. The off grid control circuit 36002 does not control the current allowed by the DSP like the off grid control circuit 36000, but the off grid control circuit 36002 may be used in some embodiments when it is not necessary to control the current allowed by the DSP. For example, the off grid control circuit 36002 may be used when another part of the inverter circuitry is monitoring the current flow through the transistors. For example, the current flow through the transistors may be monitored by the integrator based current-fault detection circuit shown in FIG. 37.

In some embodiments, the inverter may have a grid tied control circuit as shown in FIG. 36C. In some embodiments, when the inverter is grid tied, the goal voltage is the inverter's set point for the DC bus, so $V_{bus\_desired}$ may be the inverter output reference voltage. In some embodiments, a voltage regulator PI controller 36400 may measure the error between $V_{bus}$ and $V_{bus\_desired}$ and send a current command to a current regulator PI controller 36500. In some embodiments, the current regulator PI controller 36500 may measure the error between $I_{command}$ and $I_{inverter}$ and change the output drive signal to increase or decrease the current to reach the desired voltage (i.e. the grid tied control circuit controls the voltage by controlling the current).

Figure 37:
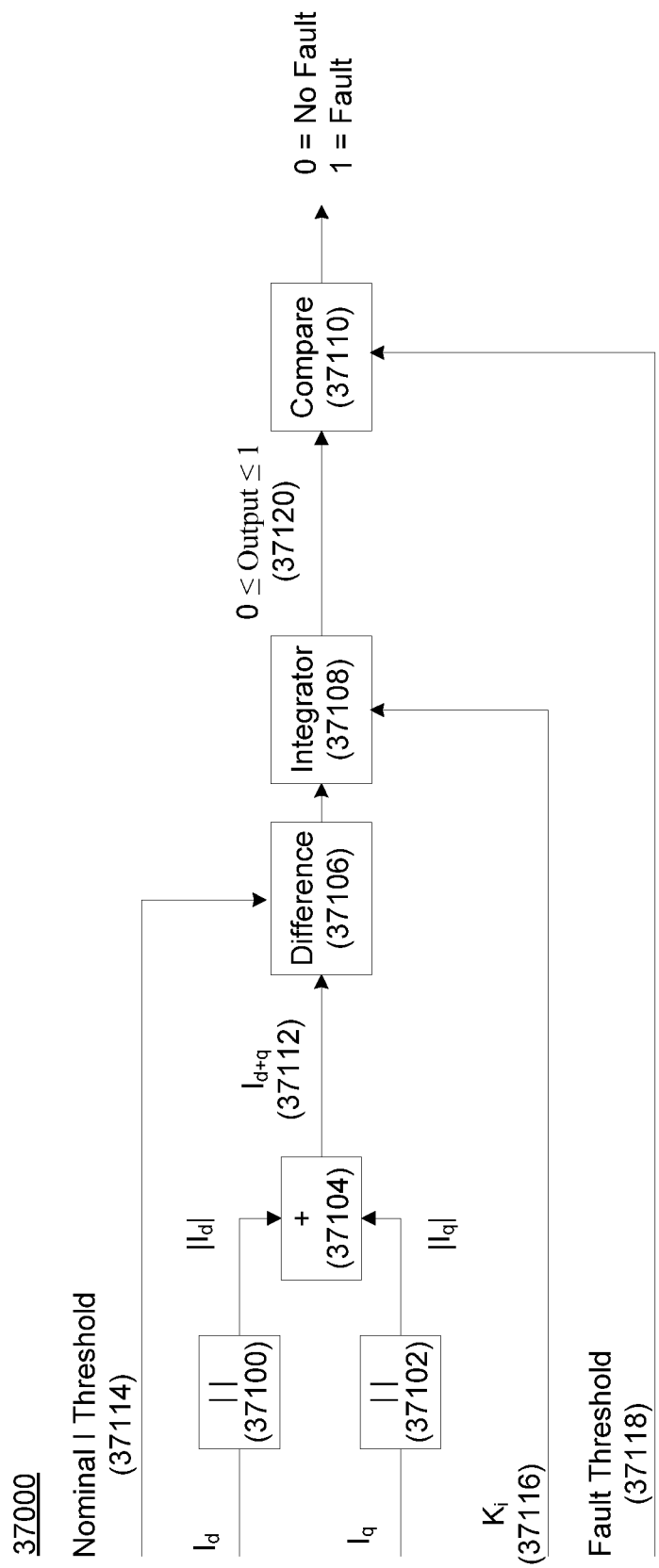
FIG. 37 is a diagrammatic representation of an integrator based current-fault detection circuit according to one embodiment.

Referring now also to FIG. 37, in some embodiments, the inverter may contain an integrator based current-fault detection circuit 37000 to manage over-current or fault current in the inverter. In some embodiments, the integrator based current-fault detection circuit 37000 may be designed to keep the operating point of the inverter current within the safe operating envelope of the inverter's transistors. As stated above, in some embodiments, the d and q components of the inverter current may be measured. In some embodiments, the Pythagorean Theorem may be used to find the amplitude of the inverter current using the d and q components. In some embodiments, to save time and computing power, a summation 37104 of the absolute values 37100, 37102 of the d and q components of the inverter current may be used to estimate the amplitude of the inverter current ($I_{d+q}$ 37118). In some embodiments, the difference 37106 may be found between $I_{d+q}$ 37112 and a nominal current threshold 37114 ($I_{d+q}$ 37112—Nominal I Threshold 37114). In some embodiments, the nominal current threshold 37114 may be chosen to represent the maximum continuous steady-state current that the transistors can tolerate which, in some embodiments, may be that current in which the transistors may operate safely at or below indefinitely.

In some embodiments, the difference 37106 may be multiplied by a constant, $K_i$ 37116, in an integrator 37108. In some embodiments, $K_i$ 37116 may be set to a value from 0 to +1 ($0 \le K_i \le 1$). In some embodiments, the integrator 37108 may then continuously integrate the result of difference 37106\*$K_i$ 37116 to update whether the current level is above or below the nominal current threshold 37114 and to determine the amount by which the current level is above or below the nominal current threshold 37114. In some embodiments, the value of $K_i$ 37116 may be chosen to be in proportion to the periodic computation rate of the system so that the difference 37106 values are integrated in proportion to the actual amount of time that has passed. For example, if the system executes these computations at a rate of 10 kHz, then $K_i$ 37116 may be set to 1/10,000, and a constant value of $I_{d+q}$ 37112=10 would integrate to about 10 amp-seconds after about one second of continuous integration.

In some embodiments, the output of the integrator 37120 may be designed to saturate to zero in the negative direction so that the output of the integrator 37120 may be any real number in the range of 0 to +1. In some embodiments, the range of 0 to +1 may represent a range of 0 to +100% of the full-scale current measurement range of the system and the number of amp-seconds of operation above the nominal level. In some embodiments, the output of the integrator 37120 may be compared 37110 to a fault threshold 37118. In some embodiments, the fault threshold 37118 may be set to a value below the operating limit of the transistors in terms of the transistors' ability to tolerate current above their nominal rating for a certain period of time. In some embodiments, an event where the output of the integrator 37120 is greater than the fault threshold 37118 may indicate that the inverter has operated beyond its nominal rating for a duration of time that may be long enough that it is nearing the safe operating limit of the transistors. In some embodiments, when there is an indication that the inverter has operated beyond its nominal rating for long enough that it is nearing the safe operating limit of the transistors, a fault may be signaled, and the inverter may be shut down to prevent damage to the transistors.

Figure 38:
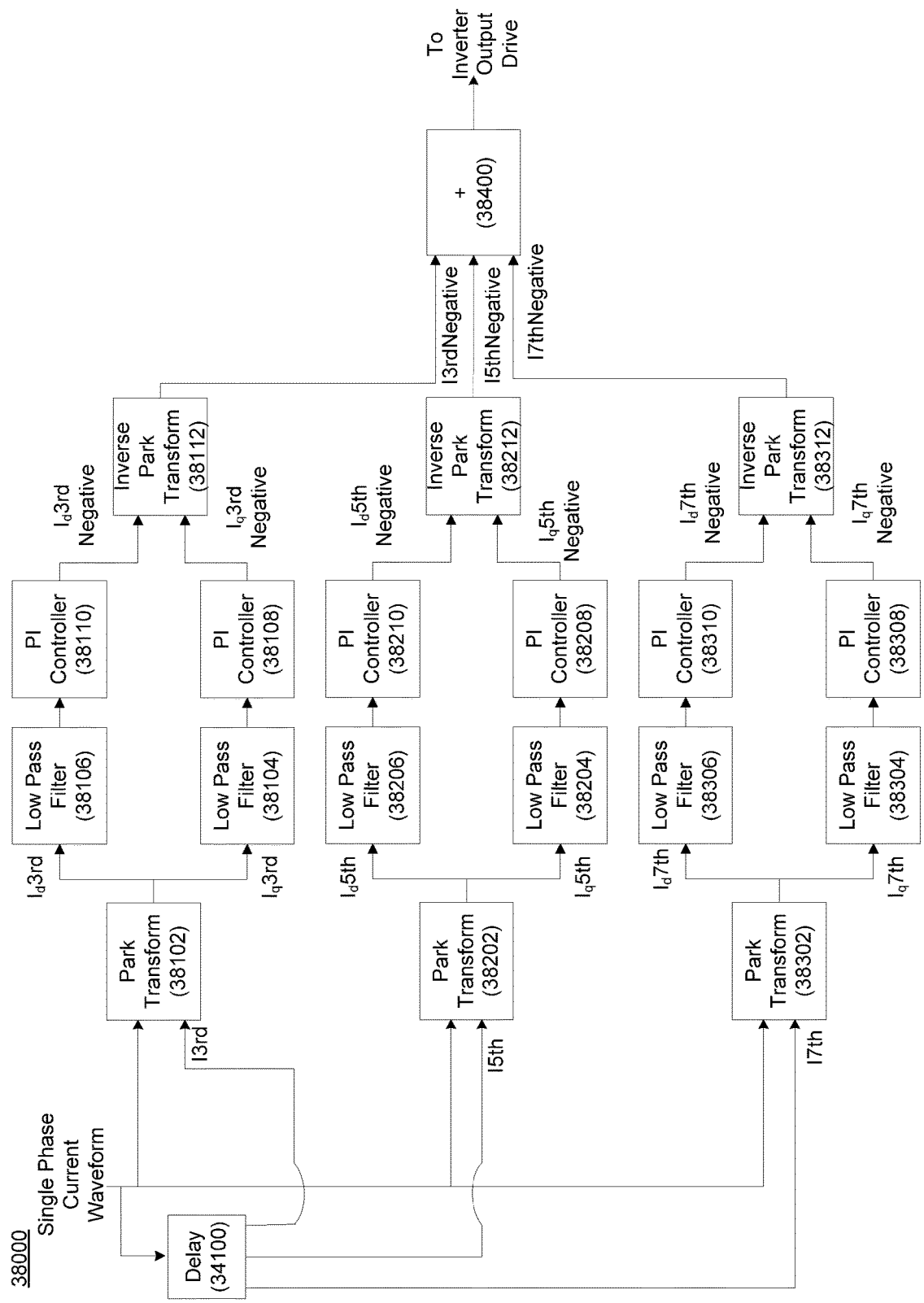
FIG. 38 is a diagrammatic representation of active harmonic current detection and correction circuits according to one embodiment.

Referring now to FIG. 38, in some embodiments, the inverter may contain active harmonic current detection and correction circuits 38000 for single phase current waveforms. As stated above, in some embodiments, a delay 34100 may be used to perform the Park Transform 34102 on a single phase waveform by outputting a phase shifted waveform of the single phase waveform. In some embodiments, the delay 34100 may also output current waveforms designed to be the current harmonics in the inverter current. In some embodiments, the delay 34100 may make current waveforms designed to be the $3^{rd}$, $5^{th}$, and $7^{th}$ current harmonics in the inverter current. In some embodiments, Park Transforms 38102, 38202, and 38302 may be performed using the single phase current waveform and the $3^{rd}$, $5^{th}$, and $7^{th}$ current harmonics I3rd, I5th, and I7th respectively. In some embodiments, the Park Transforms 38102, 38202, and 38302 may output the d and q components of the $3^{rd}$, $5^{th}$, and $7^{th}$ harmonic currents $I_d$3rd, $I_q$3rd, $I_d$5th, $I_q$5th, $I_d$7th, and $I_q$7th into low pass filters 38106, 38104, 38206, 38204, 38306, and 38304 respectively to filter out high frequency components in the waveforms. In some embodiments, the low pass filters 38106, 38104, 38206, 38204, 38306, and 38304 may output the filtered current waveforms to PI controllers 38110, 38108, 38210, 38208, 38310, and 38308 respectively to form the exact negative current waveforms $I_d$3rdNegative, $I_q$3rdNegative, $I_d$5thNegative, $I_q$5thNegative, $I_d$7thNegative, and $I_q$7thNegative of the filtered current waveforms. In some embodiments, inverse Park Transforms 38112, 38212, and 38312 may be performed using $I_d$3rdNegative and $I_q$3rdNegative, $I_d$5thNegative and $I_q$5thNegative, and $I_d$7thNegative and $I_q$7thNegative respectively to form the exact negative of the $3^{rd}$, $5^{th}$, and $7^{th}$ harmonic current waveforms I3rdNegative, I5thNegative, and I7thNegative respectively. In some embodiments, I3rdNegative, I5thNegative, and I7thNegative may be summed 38400 together and added to the inverter current waveform to cancel out the $3^{rd}$, $5^{th}$, and $7^{th}$ harmonics from the inverter current waveform.

In some embodiments, the inverter may also contain active harmonic current detection and correction circuits for three phase current waveforms. In some embodiments, the active harmonic detection and correction circuits for the three phase current waveforms may be similar to the active harmonic detection and correction circuits 38000 for the single phase waveforms with added Clarke Transforms before the Parks Transforms and inverse Clarke Transforms after the inverse Park Transforms. In some embodiments, the $3^{rd}$ harmonic may not be corrected in the three phase current waveforms.

A current embodiment of the modular power conversion system is discussed in detail below in relation to a thermal engine, in this case a Stirling engine. In some embodiments, the Stirling engine may be one described in, or one similar to one described in U.S. patent application Ser. No. 13/836,946 filed Mar. 15, 2013, and entitled Stirling Cycle Machine, or U.S. patent application Ser. No. 14/211,621, filed Mar. 14, 2014 and entitled Stirling Cycle Machine, both of which are hereby incorporated herein by reference in their entireties. However, various other Stirling engines may be used. The Stirling engine may be grid-tied or non grid-tied into consumer (load) to supplement/supplant grid distributed electricity. From a system standpoint what is unique about such a modular interchangeable system is initially the packaging of the modular power conversion and the power electronics and software control of a large range of applications (electrical resources) by the individual modules which may be interchanged, replaced and customized in any given package to accommodate many different power production, transmission and load characteristics. The modules themselves may be consolidated in a cabinet and interconnected for example via an isolated CAN 2.0b or other electrical interface(s) which facilitate communication and data processing between controllers and computers. In more complex systems further modules may be added to handle additional electrical resources. The system may include an LCD front display panel having multiple user GUI's for basic system status monitoring and control inputs. Alternatively, a user's PC may be accommodated by USB, Ethernet, internet, wireless or other known communications format, to enable monitoring and control of the modular power conversion system.

Figure 4:
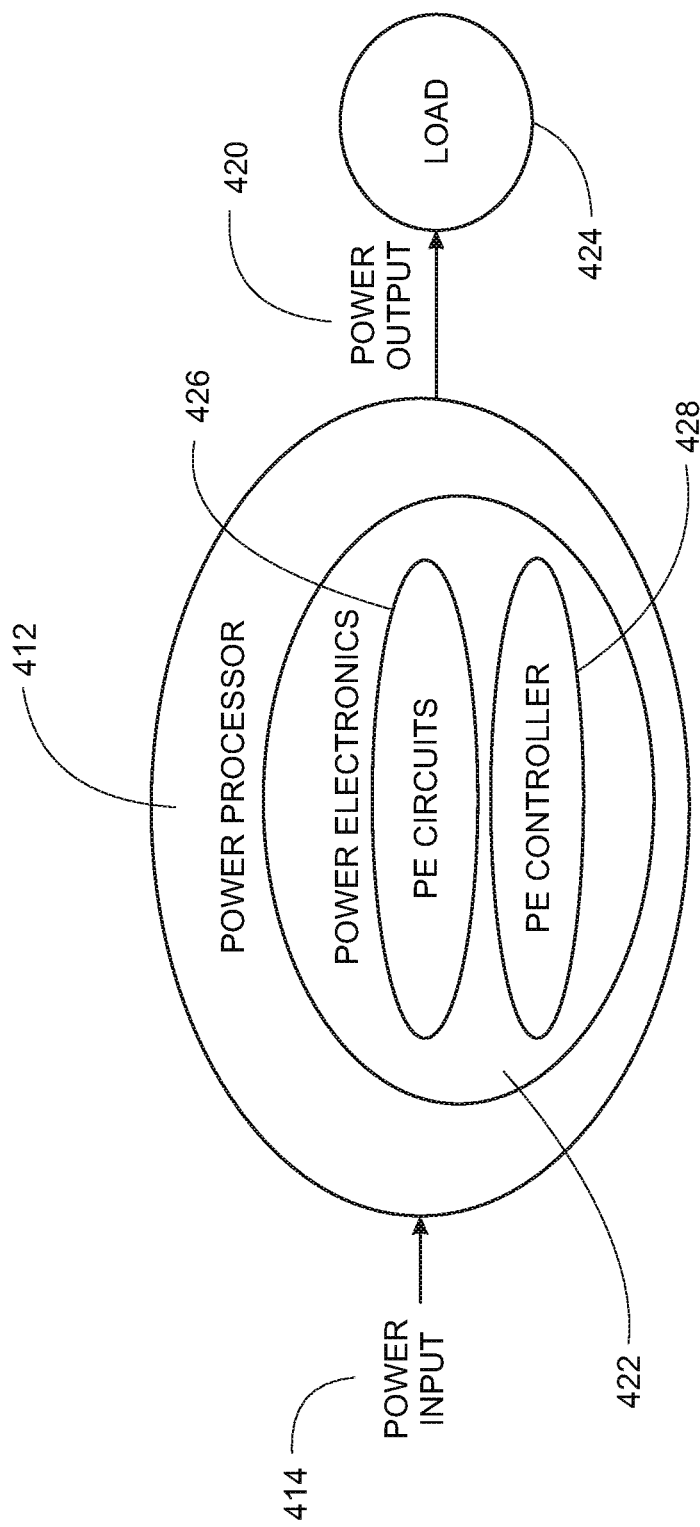
FIG. 4 is a diagrammatic representation of a power conversion system according to one embodiment.

The power electronics which control the power conversion from mechanical to a desired form of electrical power from the Stirling engine are critical for efficient and safe electric power generation. In general, the power electronics in any electro-mechanical system facilitate the conversion of raw power input 414 to a desired output power 420 for efficient use by a load 424 as shown in FIG. 4. The input power may come from a battery, fuel cell, utility, solar, wind or engine including a thermal such as a Stirling engine, and be input to a power processor 412, in the following example including a power electronic system 422 including power electronic circuits 426 and controllers 428. The output from the processor may be used by any load, a motor, utility or micro-grid, computers, commercial or residential or other power requirements. A Stirling engine is discussed in this embodiment for power input, although other mechanical power production machines, such as wind and hydro-turbines, natural gas engines, solar, etc. are contemplated and may be used for local power production to a residence, commercial business or micro-grid. Alternatively, the Stirling engine may be tied into the full grid which receives any excess power produced by the Stirling and in many cases may be validated and cost-economized and such power production offset against future power draw from the grid for a user.

Figure 5:
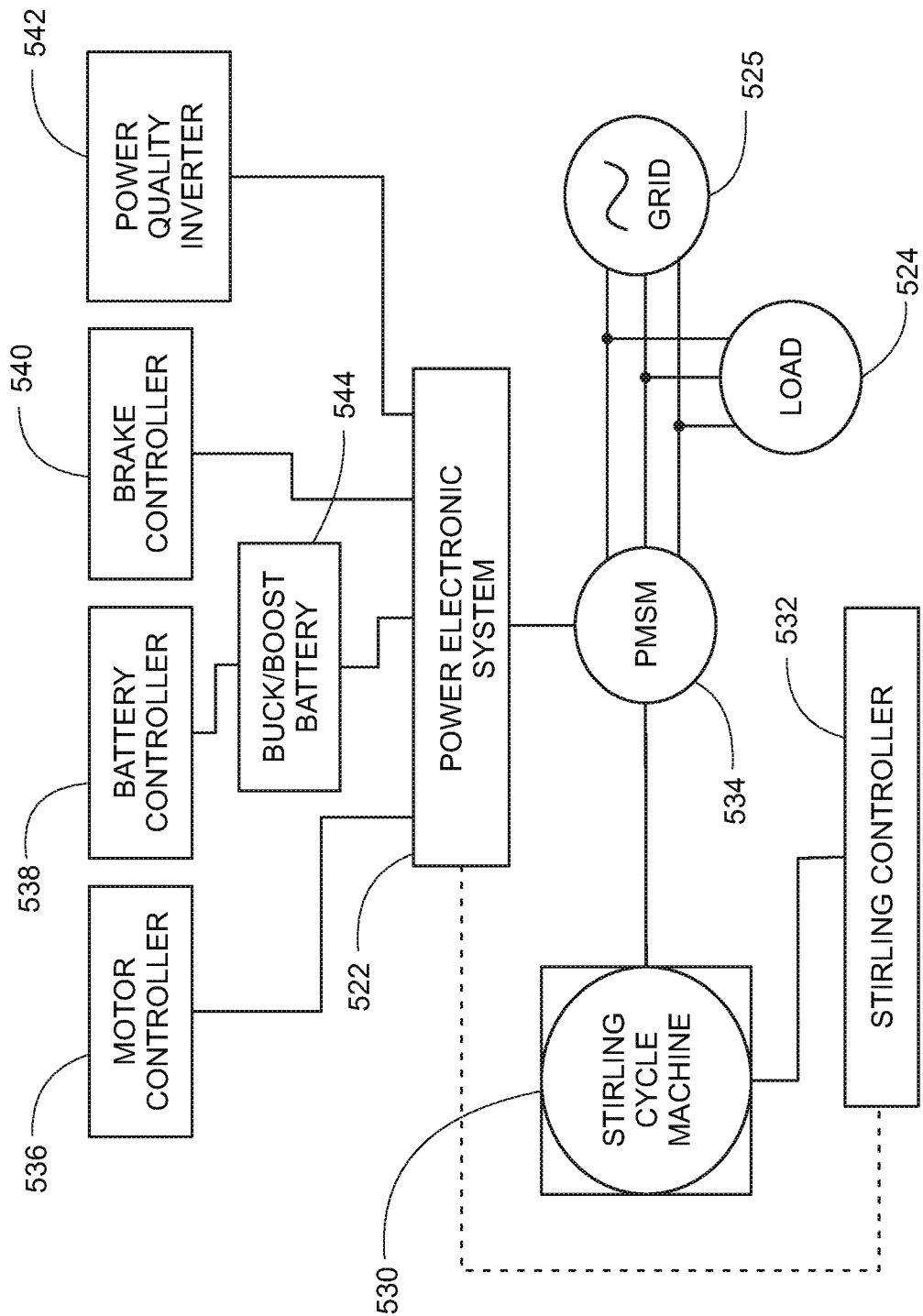
FIG. 5 is a high level circuit diagram of an embodiment of a power conversion system.

As shown in FIG. 5, the Stirling engine 530 controlled by its own Stirling controller device 532 in this embodiment, produces a mechanical output which drives for example a permanent magnet synchronous motor (PMSM motor) 534, other motors are possible such as an induction motor and a synchronous reluctance motor as well. The PMSM 534 as discussed below in the present embodiment must be controlled or conditioned so as to effectively run as an AC motor/generator providing consistent three-phase power to the desired load 524 despite the variable torque generated by a Stirling engine 530. One way to do this is to charge a battery system which receives incoming power, no matter any torque or power fluctuations from the input and/or motor, and stores the power for application to a load 524, grid 525 or other AC motor/generator. However, in some embodiments, it is an important to control the PMSM motor 534 with a power electronics system 522 including for instance a motor controller 536, a battery controller 538, a brake controller 540 and a power quality inverter 542.

Figure 6:
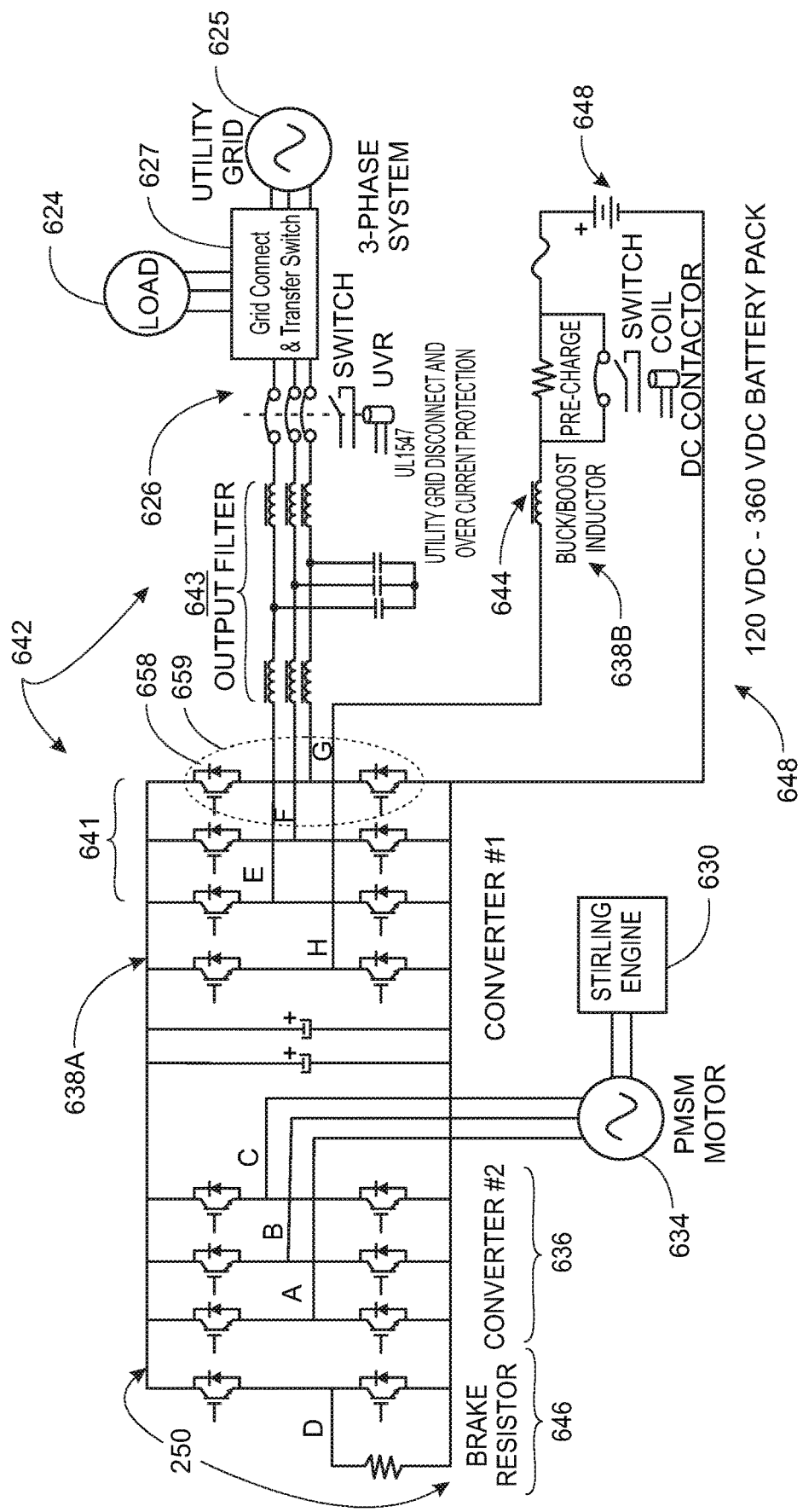
FIG. 6 is a diagrammatic representation of a power electronics system according to one embodiment.

Referring now to FIG. 6 a general high level circuit diagram of one embodiment of the motor controller 636, inverter 642, battery controller and buck/boost circuit 638, brake controller 646 and output connections to a load 624 and the utility grid 625 is shown. The three (3) half bridges 636 rectify the 3 phase sine wave power from the PMSM motor to the DC bus 250. The brake circuit 646 provides a sink for excess energy on the DC bus and consists of an electric resistor drive by a half bridge across the DC bus 250. The battery 648 provides power to run the auxiliary components comprising blower, water, fuel vales etc, and start the engine. The battery 648 is recharged when the Stirling engine 630 makes power. In some embodiments, the battery 648 is connected to the DC bus via an inductor 638B and a half bridge 638A that boost the battery voltage when supplying power to the DC bus 250 and bucking the voltage down when recharging the battery 648.

In some embodiments, the power inverter 642 include three (3) half bridges 641 across the DC bus 250 and an LCL filter 643. The half bridges 641 and LCL filter produce three (3) phase AC power at the desired voltage and frequency. The three (3)3 phase AC power is provided to the utility grid 625 and/or load 624 via an contactor 626 and a grid-connect and transfer switch 627.

Figure 7:
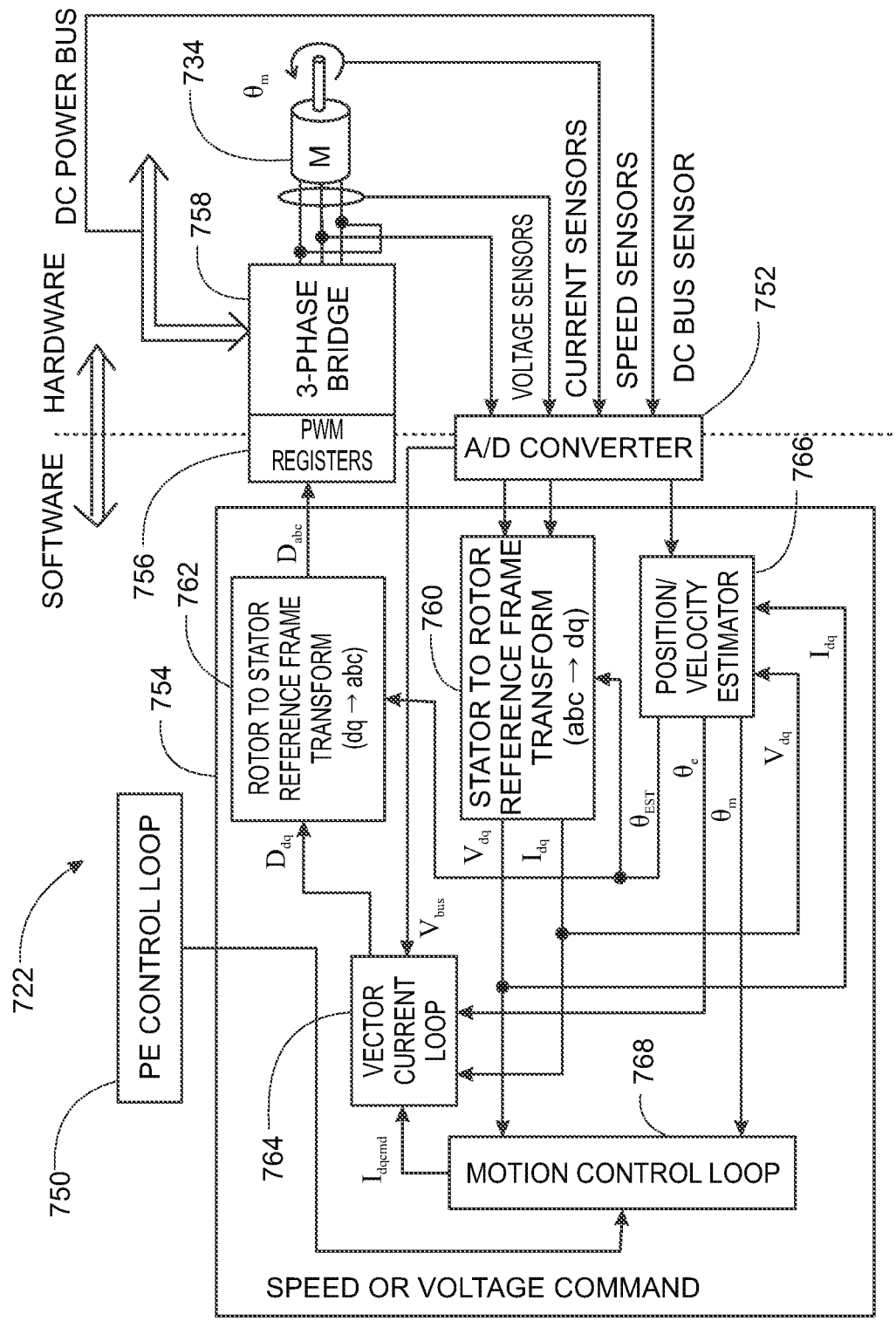
FIG. 7 is a diagrammatic representation of a velocity controller state machine.

An embodiment of a control loop 750 structure including the power electronic circuit 722 for a 3-phase PMSM 734 is shown in FIG. 7. This is by way of example, other control loop structures may also be used to control PMSM motor/generators or other electric motors as well. An analog/digital (A/D) converter 752 converts analog sensor signals from the PMSM motor 734 to digital signals for use by the digital signal processor (DSP) 754. Digital Hall sensors are also contemplated to eliminate the A/D converter 752 if necessary. Voltage and current sensors are provided for 3-phase demodulation of the three phase signals ABC and applying Clarke/Park transforms, given sin/cos of electrical angle, the 3-phase signal is converted to a 2-phase orthogonal (xy) reference frame, and then from the stationary reference frame to the rotor (dq) reference frame for a vector control loop 764. Each of the Clarke and Park transforms orthogonal and rotor reference frames (760, 762) respectively have different scaling and normalization factors and circuitry is provided to prevent saturation of the output duty cycle and allow significant amplitude to be added to the net output duty cycle. A position/velocity estimator 766 receives speed sensor signals from the PMSM motor 734, as well as the reference frame transform and, as discussed in further detail below, compiles a position and velocity estimation of the motor. The vector current loop 764, reference frame transform (760, 762) and position velocity estimator 766 occur in a motor motion control loop 768 which receives commands from an application control loop 750 to directly control the PMSM motor/generator 734.

The power electronics is generally composed of two main parts, the power electronic circuits 426 and the controller 428, shown at a higher level in FIG. 4. The power electronics controller 428 is best understood as a software program receiving feedback from the vector current feedback loop 764 with the AC PMSM motor/generator 734, and is monitoring and controlling the power electronic circuit so that the motor runs efficiently and yields a desired quantitative and qualitative power output to the desired load such as a residence, commercial business, micro-grid full grid etc., as described above. The power electronics controller 428 may also receive data and information from the Stirling controller 532 as well as shown in FIG. 5.

The specific nature of the power electronics in this embodiment is critical because of the nature of a thermal engine, in this case a Stirling engine 530. The Stirling engine does not produce constant output torque, so as it operates, the torque oscillates up and down making motor control a critical issue which must be addressed. It is important in this system to control the motor torque of the PMSM motor/generator 734 and hence the velocity, using the feedback loop to the controller so that the variable torque from the Stirling and the resultant DC power do not detrimentally effect the PMSM motor/generator 734. One way to do this is vector control of the PMSM motor/generator with a velocity control state machine using essentially three different control states: start-up, starting and running states.

A difficulty in controlling the velocity based on input from a Stirling engine is that the Stirling engine torque $\tau_{st}$ has high spatial harmonics:

$$\tau_{st} = \tau_0 + \tau_1 f(\theta_m)$$

Where $\tau_0$ and $\tau_1$ are functions of the slowly changing variables of head temperature and pressure, and $f(\theta_m)$ is a periodic function of amplitude, where 1 is a periodic function of angular position with an amplitude 1 and zero mean, e.g. $\sin \theta_m$.

At start-up of a Stirling engine the start-up torque $\tau_{st}$ is negative and typically varies significantly as the engine turns through a complete revolution. One of the Stirling pistons is compressing gas during part of a revolution leading to more negative torque. In a later part of the revolution, the piston is allowing the gas to expand producing a less negative torque or even a positive torque. This change in torque over small angles i.e. $\tau_{st} \approx -k\, \theta_m$. leads to highly variable torque output (FIG. 31A). This effect occurs during the Stirling cycle, but is more significant during startup as the slow engine speed does not produce a flywheel effect to coast through the more negative torque periods. Once the engine is rotating, the inertia of the engine is enough to maintain a more constant, but still somewhat variable torque. Following start-up because the average torque of a cycle is positive and the time over which the torque harmonics act is inversely proportional to speed, the peak speed fluctuations are inversely proportional to average speed. But at start-up, a velocity controller for the motor/generator may exert a motor torque $\tau\_m$ which should be greater than the peak negative "springy" torque generated in start-up in order to get the engine rotating. At start-up it is preferable that the motor torque $\tau_m$ increases at a steady rate until it exceeds a lower threshold $\tau_{max\_neg}$ and the engine accelerates. The rate of torque increase cannot occur too slowly otherwise start-up will take too long to start and the motor controller runs the risk of overheating. If the torque increase is too fast, more motor torque than necessary may be produced and the controller may not be able to tell how much torque is actually needed.

Ideally, the motor controller should counteract or dampen the "springiness" of the engine at low speeds, and not use excess torque in accelerating the engine. The costs of excess torque are excess heating and excess power draw. Also, start-up and starting torque may exceed average running torque by a factor of 2 or 3 in typical engines, so it is start-up and starting torque that dictates the peak power handling capability of the motor controller. A proportional-integral (PI) controller of speed will work in this application, but it is important to determine the integral of start-up and starting torque that works well for the Stirling engine application.

Once the engine is rotating at sufficient speed, motor torque $T_m$ needs to be negative to counteract the engine's average torque and maintain roughly constant speed. The motor controller yields generated power from the motor/generator as a side effect of speed control. Once the Stirling is running, the same PI controller gains used for start-up and starting states will not work well for running state. At running speeds, the gains should be low so that the motor speed controller does not fight the oscillating Stirling torque fluctuations. The gains should maintain a slowly changing generating torque to counteract the average torque from the engine, while allowing moderate speed fluctuation.

Figure 8:
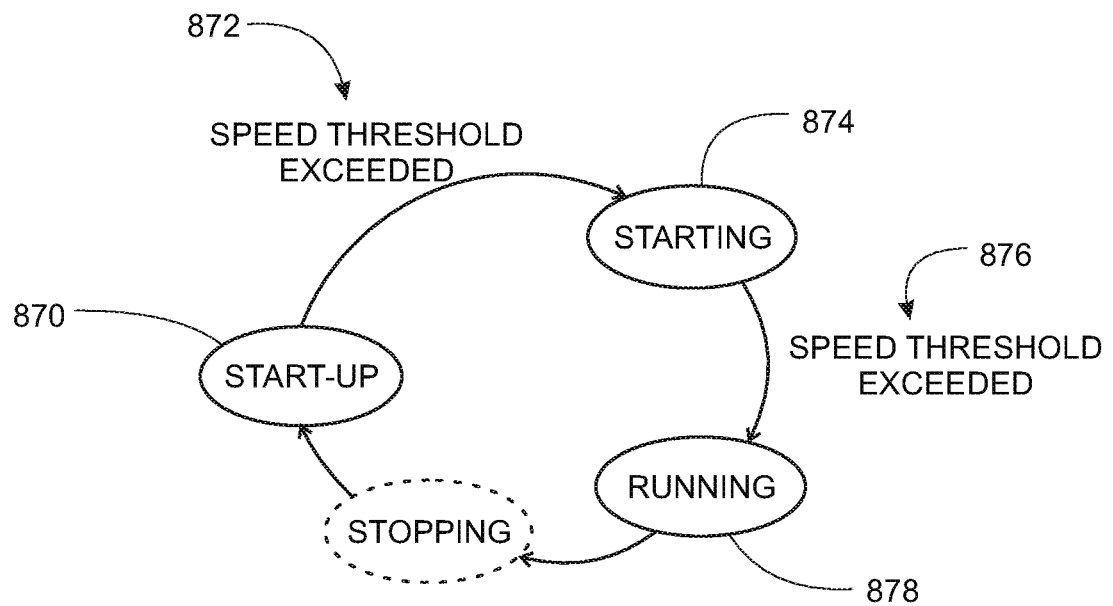
FIG. 8 is a diagrammatic representation of state and transition values of an embodiment of a velocity controller state machine.
Figure 9:
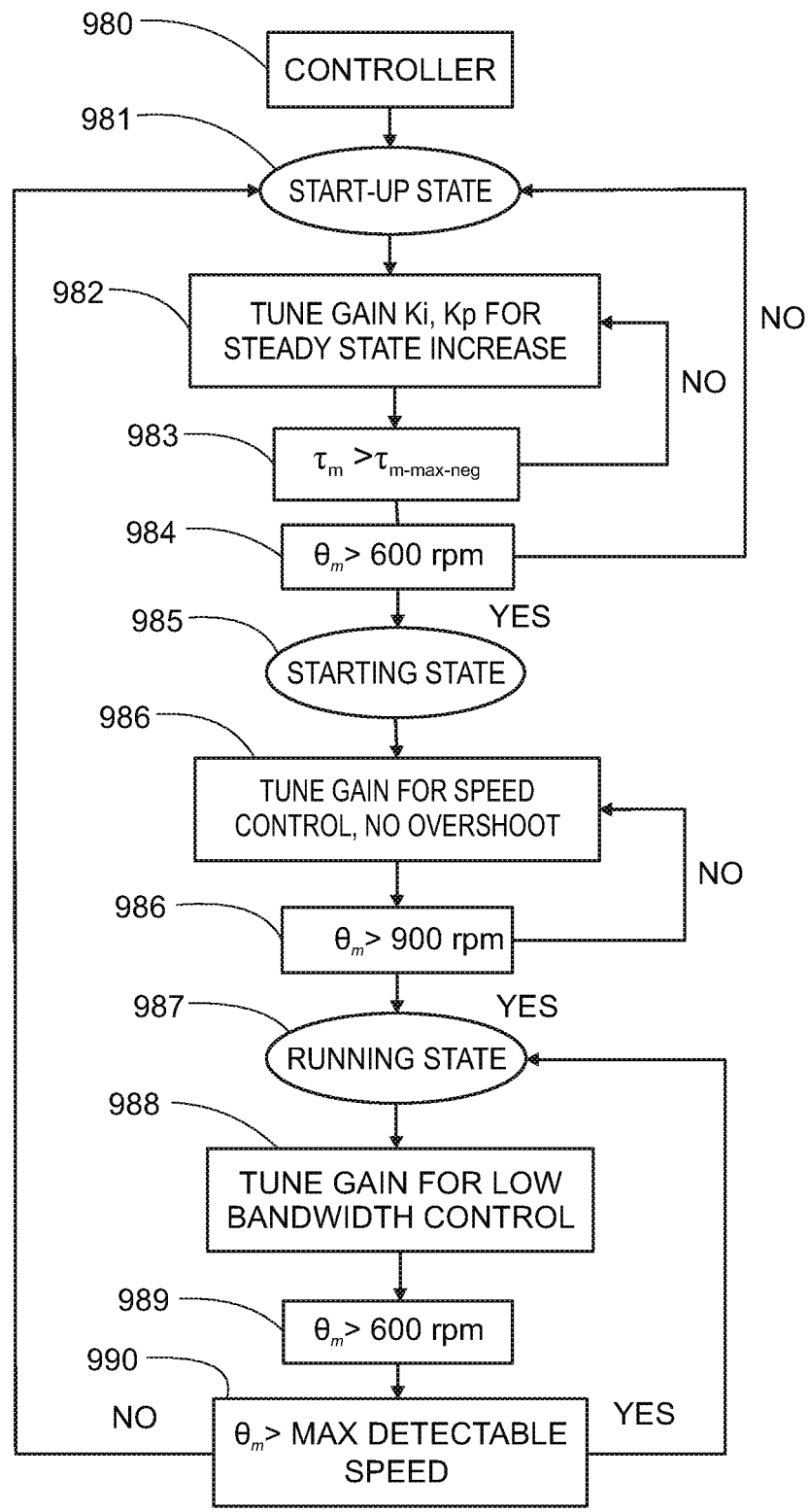
FIG. 9 is flow chart of state and transition values of an embodiment of a velocity controller state machine.

One solution to the substantial differences between start-up and running torque utilizes a velocity controller state machine with three (3) states as shown in FIG. 8, although other numbers of states could also be determined. The controller initiates in the start-up state 870 and once a predetermined speed threshold 872 is exceeded, the controller enters the starting state 874. Once a second predetermined speed threshold 776 is exceeded the controller shifts to a running state 778. Each of the three states are essentially identical, however each having a different integral gain Ki and different proportional gain Kp. The state transition condition for each speed threshold is:

|ω$_m$|<thresh_lo or |ω$_m$|>thresh_hi where ω$_m$ is the measured or estimated motor velocity. A maximum speed command max_cmd parameter limits the input to the PI velocity control loop to be within the range of +/−max_cmd. Kp and Ki are tuned according to the desired behavior of each state. An example of some parameter sets for the start-up, starting and a flow diagram in FIG. 9 show these three states and transition values as follows:

Start-up:
  Kp, Ki tuned for optimal torque ramp rate
  Thresh_lo=0
  Thresh_hi=600 rpm
  Max_cmd=650 rpm (transition to starting state when speed >600 rpm just slightly greater than the transition threshold.)
Starting:
  Kp, Ki tuned for fast speed control without overshoot
  Thresh_lo=0
  Thresh_hi=900 rpm
  Max_cmd=950 rpm (transition to starting state when speed >900 rpm just slightly greater than the transition threshold.)
Running:
  Kp, Ki tuned for low bandwidth speed control;
  Thresh_lo=600
  Thresh_hi=spd_max (max detectable speed)
  Max_cmd=spd_max (no limit)

Figure 30:
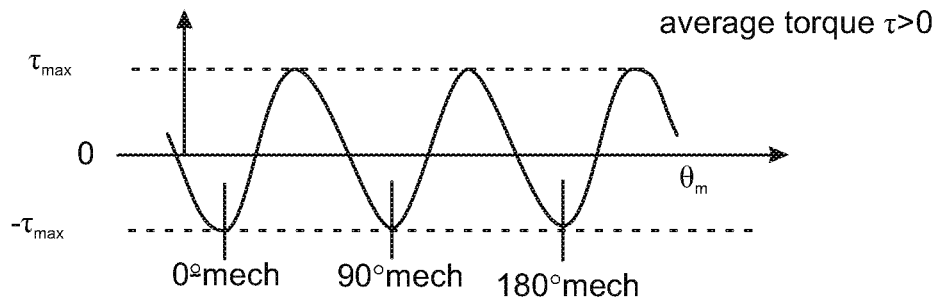
FIG. 30 is a plot of the Stirling engine torque according to one embodiment.
Figure 31:
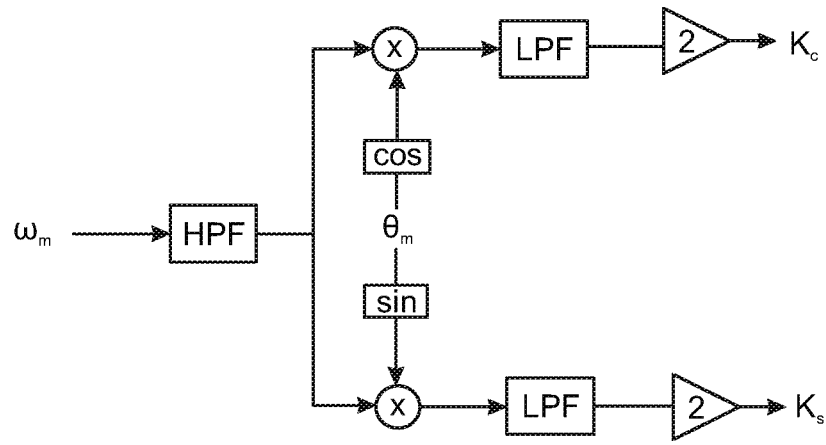
FIG. 31 is a schematic of an alternative engine starting algorithm according to one embodiment.

One alternative to the above parameters is to override motor speed in all states besides the running state, instead of limiting it. Controlling the motor speed with a feedback PI loop on the motor speed depends on a varying instantaneous motor speed over each revolution during starting as the torque varies (FIG. 30). Thus, in some embodiments, an adaptive estimate the amplitude and phase of speed fluctuation using low pass filtering (LPF) to remove noise and thus subtract out as much of the fluctuation as possible, so that the PI loop does not need to respond to this fluctuation. The amplitude and phase may change very slowly, so quadrature demodulation may allow amplitude component resolution as shown in FIG. 31. In FIG. 31, the speed signal is filtered to remove frequencies much higher than the speed ripple. Next, the signal is passed through a synchronous demodulated algorithm to produce Kc and Ks. The time varying values of Kc and Ks are the sinusoidal components of speed ripple that are at 90° from each other. Note that the low pass filters (LPF) of the demodulator algorithm and the equation in FIG. 31 are different. One can estimate the ripple-free or average speed by calculating, ωm'=ωm−Kc*cos(θm)−Ks*sin(θm)

and control speed based on this estimate of ωm'.

In a further embodiment of motor control architecture a vector control motors which may use variable frequency drives to control the torque, and thus the speed of 3-phase electric motor/generators by controlling the current fed to the machine is used. Different motor types are possible such as induction motors, permanent magnet synchronous motors (PMSM) and synchronous reluctance motors (Synch Rel) for instance with PMSM motors used by way of example for the present embodiment. PMSM motors are relatively simple motors where the permanent magnets on the rotor are pulled in one direction or another by the relative position of the stator and rotor fields. Because the rotor field is fixed in orientation with the rotor, torque production and control requires knowledge of rotor position.

There are a number of ways to write the torque equation for a PMSM motor, for example;

$$V_{dq} = K_e \omega_m = RI_{dq} + L_{dq}\frac{dI_{dq}}{dt} + J\omega_e L_{dq} I_{dq}$$

where V is the terminal voltage, I is the motor current, K$_c$ is the back-emf constant, ω$_m$ is the mechanical rotational frequency of the rotor, ω$_e$=ω$_m$P/2 is electrical rotational frequency of the rotor, P is the number of poles, and L and R are the inductance and resistance.

The equation is written in the rotor (dq-) reference frame with $$J = \begin{bmatrix} 0 & -1 \\ 1 & 0 \end{bmatrix}, V_{dq} = \begin{bmatrix} V_d \\ V_q \end{bmatrix}, I_{dq} = \begin{bmatrix} I_d \\ I_q \end{bmatrix},$$

$$L_{dq} = \begin{bmatrix} L_d & 0 \\ 0 & L_q \end{bmatrix}, K_e = \begin{bmatrix} 0 \\ \frac{2\lambda m}{P} \end{bmatrix}$$

with λ$_m$=rotor magnet flux, which may then be used to write out the state equation in scalar form as $$V_d = RI_d - \omega_e L_q I_q + L_d \frac{dI_d}{dt}$$

$$V_q = K_e \omega_m + RI_q + \omega_e L_d I_d + L_q \frac{dI_q}{dt}$$

The cross terms (with we) result from reference frame rotation (similar to Coriolis "force"); in the stator (xy-) reference frame, they are not present but the L$_d$I/dt and K$_e$ω$_m$ terms are more complicated. The cross terms are a complicating force in control loop design as they couple the two equations at nonzero speed. The torque equation is $$\tau m = \frac{3}{2}\left(\frac{P}{2}(Lq - Ld)IqId + KeIq\right) = \frac{3}{2}\frac{P}{2}((Lq - Ld)IqId + \lambda mIq)$$

which consists of a reluctance torque term due to rotor saliency (Lq≠Ld) and an alignment torque term.

In the present embodiment a PMSM motor with the torque control loop structure could utilize a sine-drive or a six-step drive. The six-step drive is simpler and a good match for digital Hall sensors but the performance risks are substantial where commutation represents an extra disturbance due to the controller switching electrical angle instantaneously, especially at high speeds. Utilizing a sine-drive, the choice of torque loop may be decoupled from the choice of position/speed sensor.

This embodiment contemplates the speed controller as a proportional-integral (PI) controller to monitor and maintain a proportional-integral loop with current error as input, and desired voltage as output. In this way it is possible to limit output to an acceptable range and stop integrating in the direction of continued error when a range limit is reached. Proportional gain gives a more stable controller but not zero steady state error. It is better to control/command torque with PI controllers based on speed error. The Stirling engine does not produce constant torque as discussed above so as it spins the torque oscillates back and forth significantly. This makes for a difficult mechanical load to control, where the Stirling is highly time variant as to its speed-torque. The goal of the power electronics here is to provide a method to most efficiently control the Stirling or any torque producing machine for that matter.

Thus, the nature of the Stirling which acts very different in start-up, as opposed to running state, is that it does not work well with standard PI controllers with high proportional gain. A better method is to use a PI controller with a low proportional gain, so the speed controller does not fight the natural speed fluctuation of the Stirling engine. The PI controller 980 is tuned for at least two or three different states of the motor, start-up 981, starting 985 and running 987 and the different gains depending upon what state the motor is in are used. A simple state machine with the three states, startup, starting and running state with their own proportional integral gain as discussed above is preferable. Speed is measured and compared to a known threshold; if the threshold is crossed the PI controller is transitioned to the next state. There is a maximum speed setting with each state, for example start-up state 881 has a maximum speed of 600 rpm 984. The starting state 985 is a transition state which ensures that a smooth transition takes place between start-up state 981 and running state 987. In any event, for all the states what is very important for the controller 980 is that an accurate value for speed of the motor be determined.

Position/velocity estimation may be accomplished with position sensors, for example a resolver, or three (3) Hall sensors at 60 degrees. Using Hall sensors in their stateless form it is possible to decode the sector from the Hall sensor and compute position increment and unwrap. This provides no speed estimate, just a raw Hall angle. But it gives a good indication of which positional motor segment the rotor is in. In order to obtain the necessary motor speed estimate for the controller, it is now necessary to go from position to speed. A typical solution would be to take the position and differentiate it however this is a relatively noisy solution and may introduce substantial error.

Figure 10A:
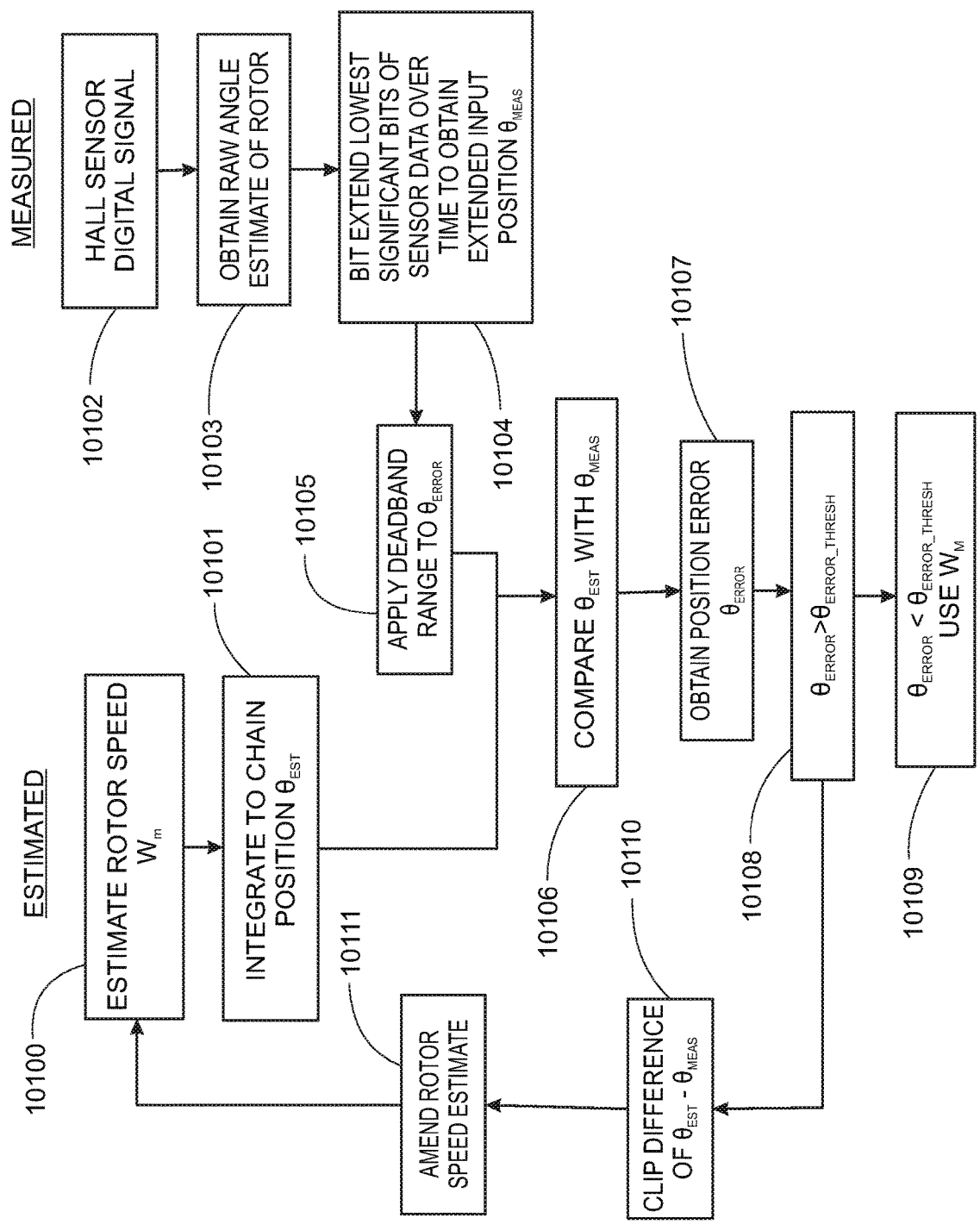
FIG. 10A is a block diagram of an embodiment of a feedback loop for adjustments to rotor speed.

Another solution is to use a feedback loop as shown in FIG. 10A, where rotor speed is estimated 10100, and the estimated speed is integrated to get an estimated rotor position 10101. One compares 10106 estimated rotor position to measured rotor position from the Hall sensor(s) 10103. The difference produces an error term to reevaluate 10107 and change the initial speed estimate 10111. An important aspect of obtaining an accurate measured rotor angle position is the use of limiters, i.e. current limiting methods and techniques, as well as deadbands based on Hall sensor performance. The limiters 10104 and deadbands 10105 are important in the present embodiment where they facilitate a more accurate speed and position in particular with the use of the Hall sensors.

From the Hall sensors one obtains digital signals 10102 for a raw estimate of angle of the rotor 10103 with each 60 degree step of the motor cycle, which are then unwrapped by extending the lowest significant bits of sensor information over time to obtain a bit extended input position 10104. The input position may then be put through a deadband block 10105 which transforms the sawtooth error from the Hall sensor narrowing the input position value that is then compared to the estimate position. The deadband range compensates for the + and −30 degree limit of known natural error of a Hall sensor. The deadband range is 70-80% of this limit of natural error and therefore everything outside the error which exists within the deadband range may be essentially disregarded and/or moved towards a zero value. Error may also be limited by the use of techniques and methods for dynamically setting limits on the commanded current.

Current limits are used in electronic circuitry in order to prevent excessive current that may result in catastrophic failure of electronic components, in this case the motor/generator. In the present embodiment one method is the generation of commands for current which prevent the current from exceeding a dynamically predetermined limit. The limit may be determined for example as a function of power dissipation in a component as estimated from a measured current level and as a function of a measured temperature proximate to the component. Other methods and techniques for limiting current are possible as well. Some of these are described in U.S. Pat. No. 6,992,452 which is hereby incorporated herein by reference in its entirety.

From the standpoint of an output limiter, the input sensor has some inaccuracies, Hall sensor to 30 degrees, a resolver to 5 degrees for instance, so no matter what the estimator does, input sensor overrides if the error between input sensor and estimate is too high. For example, if Hall sensor measurement is 5 degrees different from the raw input estimate, then the estimated value is used. On the other hand if the error is within 70 degrees it is more feasible to clip the difference 10110 between the Hall sensor and the estimate to a desired range, for instance an error_threshold of 35-45 degrees, this limits the error value to a band around the desired angle. Other threshold errors could also be used as well.

Figure 10B:
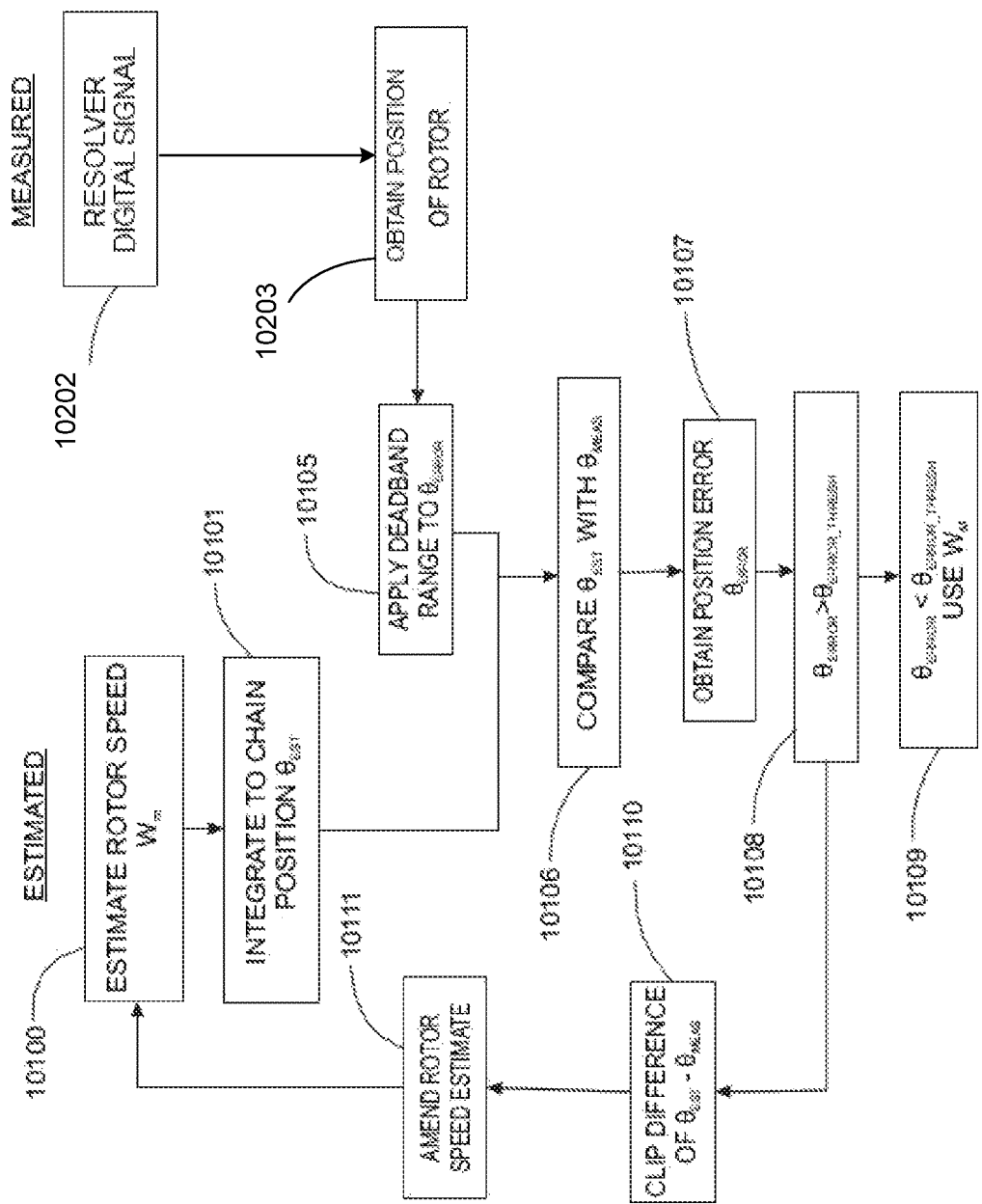
FIG. 10B is a block diagram of one embodiment of a feedback loop for adjustments to rotor speed.

Referring now also to FIG. 10B, in some embodiments, the feedback loop of FIG. 10A may use a resolver instead of Hall sensors. The rotor speed may be estimated 10100, and the estimated speed may be integrated to get an estimated rotor position 10101. One compares 10106 estimated rotor position to measured rotor position from the resolver 10203. The difference produces an error term to reevaluate 10107 and change the initial speed estimate 10111. An important aspect of obtaining an accurate measured rotor angle position is the use of limiters, i.e. current limiting methods and techniques, as well as deadbands based on resolver performance. The limiters 10104 and deadbands 10105 are important in the present embodiment where they facilitate a more accurate speed and position in particular with the use of the resolvers.

From the resolvers one obtains digital signals 10202 for a position of the rotor 10203. The input position may then be put through a deadband block 10105 which transforms the sawtooth error from the resolver narrowing the input position value that is then compared to the estimate position. The deadband range compensates for the + and −5 degree limit of known natural error of a resolver. The deadband range is 70-80% of this limit of natural error and therefore everything outside the error which exists within the deadband range may be essentially disregarded and/or moved towards a zero value. Error may also be limited by the use of techniques and methods for dynamically setting limits on the commanded current.

In order for the power electronics system 522 discussed above to function properly it must ensure that the subsystems such as the motor controller 536, battery controller 538, brake controller 540 and power quality inverter 542 communicate their messages, demands and conditions effectively to one another so that the most important demands and conditions are acted on first by the system. The communication system described below also operates to control the communication between the power electronics for motor control as well as the actual Stirling engine control 530 of the present embodiment. In the present embodiment a CAN bus is used to connect the various subsystems in the power electronics 522, Stirling controller 532, and various control actuators and/or receive feedback from various sensors and ensure that the appropriate messages are timely delivered to the appropriate subsystem to be evaluated and acted on by the power electronics. In using a CAN bus, each message from an electronic control unit of the power electronics is transmitted serially onto the bus in a time dependent and orderly manner, and where two messages are transmitted to the bus at the same time, standard protocols for priority using a dominant or recessive id of an entire message are known to ensure the most important message is acted upon first.

However, an important feature disclosed is that the message id is split into a priority field and a general identifier field, with the priority field at the most significant bits to ensure that critical system control messages do not get superseded by less important messages. The general identifier field provides specific information and details of the message on system operational status, control commands and system faults. To ensure that such messages are prioritized, any messages for the power electronics system may be set at any priority using the bits of the priority field of the message id, a value which ultimately sets the priority in the bus arbitration, with the lowest numbered id's having the highest priority. This is a particular artifact of this message schema and not part of any available CAN bus specification. Standard priority protocols using a CAN bus always arbitrate bus access using the entire message id and do not interpret the meaning of any user-defined scheme.

Using a 29 bit extended mode message identifier, from 0-28, the message priority is defined by the top 3 bits, 28, 27, 26 with zero being the highest priority. Messages at the same priority will be arbitrated by the remainder of the message ID bits. The priority zero (highest) is used only for the most critical control and alarm functions. The highest bits are used to define priority because similar to standard arbitration protocols if two messages are transmitted at the same time as soon as a recessive (1 value bit) is seen for a lower priority message transmission, the message is stopped and a higher priority message with a dominant (0 value bit) is sent unimpeded to the CAN bus. For example a message with the bits 28, 27 and 26 set to zero is the highest priority message that may be set. On the other hand if these same bits are all set to 1, this is the lowest priority that may be set for a message, but a recessive value at any bit location would stop transmission of the message if another message being transmitted has a dominant bit value at the same location. The impeded message is then transmitted based on its priority after the higher priority message. This provides for a total of eight different priority combinations or definitions where each bit is either 0 or 1 in binary notation, and thus with 3 bits the total number of permutations is 2×2×2=8 combinations or definitions for message priority.

After transmission of the message priority 11120, the remainder of the bits are utilized as the message definitions body themselves and these definitions are divided into a series of groups as shown in FIG. 11, the System Group 11122 is defined by 3 bits, 25, 24, 23, the Functional Group 11124 by 4 bits, 22, 21, 20 and 19, the Module Group 11126 is assigned 8 bits 18-11, and the Message Group 11128 is defined by 11 bits, bits 10-0. The message priority and the groups do not have to contain these specific bits or this exact number of bits described here, other allocations of bits may be provided as well. The specific allocation of bits is based upon experiments and understanding that for priority, an allocation of 3 bits with 8 combinations is sufficient, while for example the Message Group 11128, where the system will need to be able to communicate an untold number of messages, having 11 bits is capable of providing $2^{11}$ combinations permits over 2000 possible messages.

The System Group 11122 is currently allocated 3 bits with only single value 25 assigned to a power electronics system. Other configurations for the power electronics systems may be assigned using other bit value combinations. The Functional Group 11124 is assigned to each of its 4 bits the subgroups of: power production, power transmission, power consumption and energy storage, other subgroups may be defined as well here. The Module Group 11126 relates specifically to the modular power conversion system which permits this power electronics system to work with numerous different power production, transmission and consumption devices and methods, for example engines such as diesel and gas generators, thermal engines such as Stirling engines, wind turbines, photovoltaic systems, fuel cells, power transmission grid tied inverters, static transfer switches, power quality inverters, and for energy storage with battery storage systems and battery charging systems.

So understanding that in the present embodiment there may be over 2000 messages defined in the Message Group 11128, for example for any given message it may apply to a different Module for instance a wind turbine generator or for a Stirling engine, which may then be further defined by the Functional Group 11124 as power production and then assuming only the power electronics system in the System Group 11122 for the moment, given a desired message priority the CAN bus may now evaluate that message and arbitration may occur with the highest priority messages being given the higher priority. One of the important aspects of this scheme is that in the event that it is determined that messages are not being given the appropriate priority during operation of the power electronics and underlying power system, only the priority of any individual message need be changed to raise, or lower the priority of that message.

For example, if a message from the Message Group 11128 indicating motor velocity is too low/high, etc, and that this critical message is being superseded by other less critical messages, the operator need merely set the Message Priority bits 11120 to a value which trumps the priority of other less critical messages, and no other change need be made to the remaining message bits of any of the motor velocity messages. Another example as shown in FIG. 11, all of the bits in the 29 Bit CAN Bus Message Map may be set to 0. The Message Group 11128 has defined a motor velocity of 0 to be a critical alarm, for the Stirling engine in the Module Group 11126 defined also at 0, and power production in the Functional Group 11124 as 0 for the power electronics system at 0 in the System Group 11122, and having the highest priority of 0 in the Message Priority 11120. This is only an example of a message definition and other allocations of bits are contemplated and possible for these and other messages as well.

It is also important that we not use up all of the values defined by the adjacent possible combinations of bits in each of the Groups. For instance as shown in FIG. 12 using only even values initially, Power Production 12132 has a value of 0, whereas Power Transmission 12134 has a value of 2, Power Consumption 12136 has a value of 4 and Energy Storage 12138 has a value of 6 as understood using hexadecimal notation. This leaves not only room for additional subgroups beyond these four, but also the odd values between each of those currently defined in case another subgroup needs to be added at a value level between those already defined, or that the subgroups need to be moved based on current and future Functional Group 12124 definition analysis and evaluation.

An example of certain currently constructed messages for control of the power electronics system and the Stirling controller as well, is shown in FIGS. 13 and 14. FIG. 13 is an example of the bit assignment and hierarchy allocation to each of the above described Groups. FIG. 14 is a table of the Message Priority 14120 showing a list of message priorities from highest, e.g. alarms and critical controls having a priority 0, to lowest (priority 7). All of these values are shown to the right as hexadecimal notation system which is a human-friendly representation of binary coded values in computing and digital electronics. FIG. 15 is a table of the System Group 15122 showing the power electronics system having the highest priority (priority 0) represented as 0x00000000, with the remaining lower priority systems to be decided (TBD). Next in the hierarchy, FIG. 16 is a table of the Functional Groups 16124 with power production having the highest priority (priority 0), and again represented as 0x00000000. Power transmission is a priority 2, 0x00100000, and priority 1 is reserved in case another functional group need be prioritized between production and transmission that is currently unknown or undecided. The Module Group 17126 table in FIG. 17 indicates the values attributed to different power production devices, with a 3-phase Stirling generator having the value 10 which becomes 0x00005000 in hexadecimal notation as shown in the table. Alternatively, production devices may be photovoltaic or fuel cells with appropriate values assigned. The Module Group 17126 may also include devices for transmission such as a grid-tied inverter, or static transfer switch, or devices for storages such as a battery, or for consumption such as a power quality inverter or battery charger.

Figure 18A:
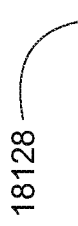

Next, is the Message Group 18128, FIGS. 18A-18D show the table for messages, i.e. message detail, with two parts to the message detail, first the message identifier and second the message data attached to the message identifier which is for instance received data from a sensor such as Hall sensor data for velocity control. As shown in FIG. 18A, the message identifier uses an initial bit position value for example critical faults (Critical Control Flags) are given a value of 2 and represented as 0x00005002 in hexadecimal notation. Again, this leaves some room for a value of 1 and 0 in case it is determined that there is a more important critical fault that needs to be denoted. In FIG. 18B examples message identifiers for System Faults are shown. A description of each fault is shown to assist in programming. Examples of Power Stage Faults, Overvoltage Regulator Faults, Motor Drive Faults and Buck/Boost Faults are also shown in FIGS. 18C and 18D.

This is not the only selection or arrangement of message identifiers which may be determined and other arrangements and definitions of messages are certainly contemplated. What is important from the standpoint of control messaging is that this message format for controlling the power electronics in the present Stirling embodiment, and even in other embodiments as shown in the Module Group 17126, provides a hierarchical system management format which defines unique and specific identifiers for the critical system priorities, system components, functions, modules and every specific message to be communicated across the system power electronics. These specific and unique identifiers not only readily allow orderly communication of messages across the CAN bus, but also tell the controllers what the message is, and may contain associated measured or sensed data which permits the controller to determine appropriate commands for controlling the various modules or system components.

Measured or sensed data and other arbitrary information from the embedded power electronics system 1922 must be collected in real-time to diagnose errors and/or debug issues. A digital signal processor or DSP 19140 as shown in FIG. 19 or other controller is connected to an external device such as a computer or PC 19142 via a communications link 19144. The communication link 19144 as implemented in a first embodiment is a serial port or UART, but alternative communication may be through Ethernet, Bluetooth wireless, or other communication protocols. The relevant characteristic of the communications link 19144 is that there is a stream of information flowing in each direction. A protocol defines several different types of packets of information for each direction of the protocol. The DSP 19140 transmits packets to the PC 19142, some of which may broadcast arbitrary data. The PC 19142 transmits packets to the DSP 19140, some of which are commands to read or write data in the DSP 19140, including data that determines which data the DSP 19140 should be broadcasting to the PC 19142. This allows for changes at any time as to which data the PC 19142 receives. In addition there are other packets that allow the DSP 18140 and PC 18142 to determine whether a good communication link between the two is maintained. If that communication link is interrupted and resumed, a status check of the communication link between each of the devices and links with other devices within the system is performed with diagnostic checks that determine if there are any changes in performance of any of the devices. Further executable programs such as a DiagUI 191200 program may be installed on the PC 19142 and use the communications link to transmit and receive data as discussed in further detail below.

In implementation of the system, the information available to both the DSP 19140 and PC 19142 ahead of time includes how to communicate via the protocol, as well as how to build metadata including the following data that are generated at the time the DSP program was compiled:

date and time the DSP program was compiled a unique 128-bit ID generated per the standard Universally Unique Identifier (UUID) mechanism program identifier (a human-readable string to distinguish varying types of DSP programs)

version number that corresponds to the version of the source code stored in a source control repository such as SurroundSCM, Clearcase, or Subversion The build metadata 19146 is stored within the executable file 19148 that is generated at compile time. The DSP 19140 is programmed using this executable file 19148. If the PC 19142 has access to this executable file 19148, it then has access to the same build metadata 19146. The executable file 19148 also has the DSP symbol table: given the name of a variable on the DSP 19140 which has a fixed memory location, this allows the PC 19142 to determine what type of variable it is (e.g. 16-bit unsigned integer, 32-bit pointer, structure, union, etc.), and where it is located in the DSP's memory.

In implementation the system may use a 2.34375 Mbaud serial port with the standard UART configuration of one start bit, 8 data bits, and one stop bit per byte, or 234375 bytes per second maximum throughput in each direction. A diagnostic kernel routine on the DSP executes at a 10 kHz rate meaning that the diagnostic kernel may send and receive at most 23.4 bytes on average; data that exceeds that length is enqueued or dequeued in a buffer.

Each packet 19150 consists of;
a header 19152
a message digest 19154
data (varies depending on the type of packet) 19156
a delimiting mechanism 19158

The delimiting mechanism 19158 provides a determination of when one packet ends and the next packet begins. Consistent Overhead Byte Stuffing or COBS, as described in the 1997 paper of the same name by Stuart Cheshire and Mary Baker of Stanford University is used providing a fixed overhead of 2 bytes for packets of less than 255 data bytes (one extra byte per packet for encoding, and one extra byte for delimiting), thereby efficiently encoding and decoding each packet.

A message digest 19154 provides a means for detecting transmission errors by adding extra bytes at the end of the packet 19150 which are a function of the previous bytes in the packet, so that a receiver of the packet may compute the same message digest 19154, and if it matches the one transmitted, there is high probability that the packet 19150 has arrived without errors. A 16-bit CRC is used in the present embodiment as a message digest, adding 2 bytes overhead. Before transmission, the packet 19150 is first formed as a raw data packet, which then gets the 2 byte CRC appended to it, and is then encoded with COBS. The header consists of at least one byte at the beginning of the raw data packet that determines which type of packet it is. Each header 19152 starts with a tag that is a prefix code, i.e. within the set of possible header tags, no tag is the prefix of any other tag (e.g. the header tags 0xff, 0xfe00, and 0xfe01 are a valid set, but the header tags 0xff, 0xff00 are an invalid set because 0xff is a prefix of 0xff00). Using this method 256 valid one byte header tags may be developed and more if more than one byte for some of the header tags is used. As a result, the overhead for packet encoding is at least 1 byte for the header tag, 2 bytes for the CRC, and 2 bytes for COBS, or 5 bytes per packet.

There are a number of different packet types that have been developed and may be used for communication protocols. Some that are commonly used are provided as an example;

Ping packet—sent from DSP 19140 to PC 19142 on a periodic basis, or in response to a ping request packet. It contains a counter incremented each time a ping packet is sent (this allows the PC to detect missing packets), a 16-bit timestamp, and critical message counters (described later).

Ping request packet—sent from PC 19142 to DSP 19140 on an arbitrary basis. For "keepalive" purposes, a predetermined timeout of approx 100 msec is used both for ping packets and ping request packets: namely, that both PC 19142 and DSP 19140 will transmit the corresponding packet during each timeout interval, and if a timeout interval elapses without receiving the corresponding packet, then something is wrong and the communications connection may be considered to be interrupted.

Memory read request—sent from PC 19142 to DSP 19140 on an arbitrary basis. Contains an 8-bit read request ID, 8 bits of flags, an 8-bit byte count, and a 32-bit starting address. The flags include 1 bit determining whether the address points to absolute memory or "virtual memory" (described later). Upon receiving this, the DSP 19140 will read the requested memory and respond with a memory read response.

Memory read response—sent from DSP 19140 to PC 19142 in response to a memory read request. Contains the 8-bit read request ID, and data corresponding to the memory read request. The request ID is so that the PC 19142 may request several different pieces of data and may match up the responses with its requests, since there may be some delay before receiving those responses. If a read response is not received, the PC 19142 may re-issue the read request.

Memory write request—sent from PC 19142 to DSP 19140 on an arbitrary basis. Contains an 8-bit critical message count, 8 bits of flags, a 32-bit starting address, and data. The flags include 1 bit determining whether the address points to absolute memory or "virtual memory" (described later). Upon receiving this, the DSP 19140 will write the requested memory. The DSP's critical message count is maintained by the DSP 19140 and reported in its ping packet. For packet types which are considered critical messages (including memory write requests), the DSP 19140 will ignore any message where the received critical message count does not match its internal counter. If the critical message counts match, the DSP 19140 acts increments its critical message count and acts upon the received message. This allows the DSP 19140 and the PC 19140 to stay in sync with respect to critical messages: if messages are improperly received, they will be ignored, and the PC 19142 may detect this and decide to re-send messages. If the same message is received twice, it will be acted upon at most once.

Broadcast packet—sent from DSP 19140 to PC 19142. This consists of a packet ID header tag, an 8-bit counter field, and data. The 128 header tags 0x00-0x7f for broadcast packets are reserved, leaving tags 0x80-0xff for the packet types described above as well as application-specific packets not discussed in this document. A broadcast packet is sent once each time the DSP's diagnostic kernel executes and the DSP 19140 has detected valid communications from the PC 19142 (e.g. it has received a ping request packet within its timeout). The packet ID header tag allows 28 different sets of data to be sent.

Each data set may have arbitrary data, to the extent that it may fit within the available bandwidth. In practical terms 23 bytes are available with 4 bytes overhead for COBS and the CRC, −1 byte for the packet header tag and 1 byte for the counter field, leaving 17 bytes left for data. In practice normally 14 bytes (7 16-bit words) are used at most.

The 8 bit counter field consists of a 3-bit change counter and a 5-bit tick count. The change counter is incremented once each time the DSP 19140 executes a memory write request that could affect the contents of the broadcast packet, so that, for example, if the PC 19142 sends a request to write memory that would change the contents of the DSP's broadcast packet, the PC 19142 may determine exactly when the DSP is sending new data.

Figure 20:
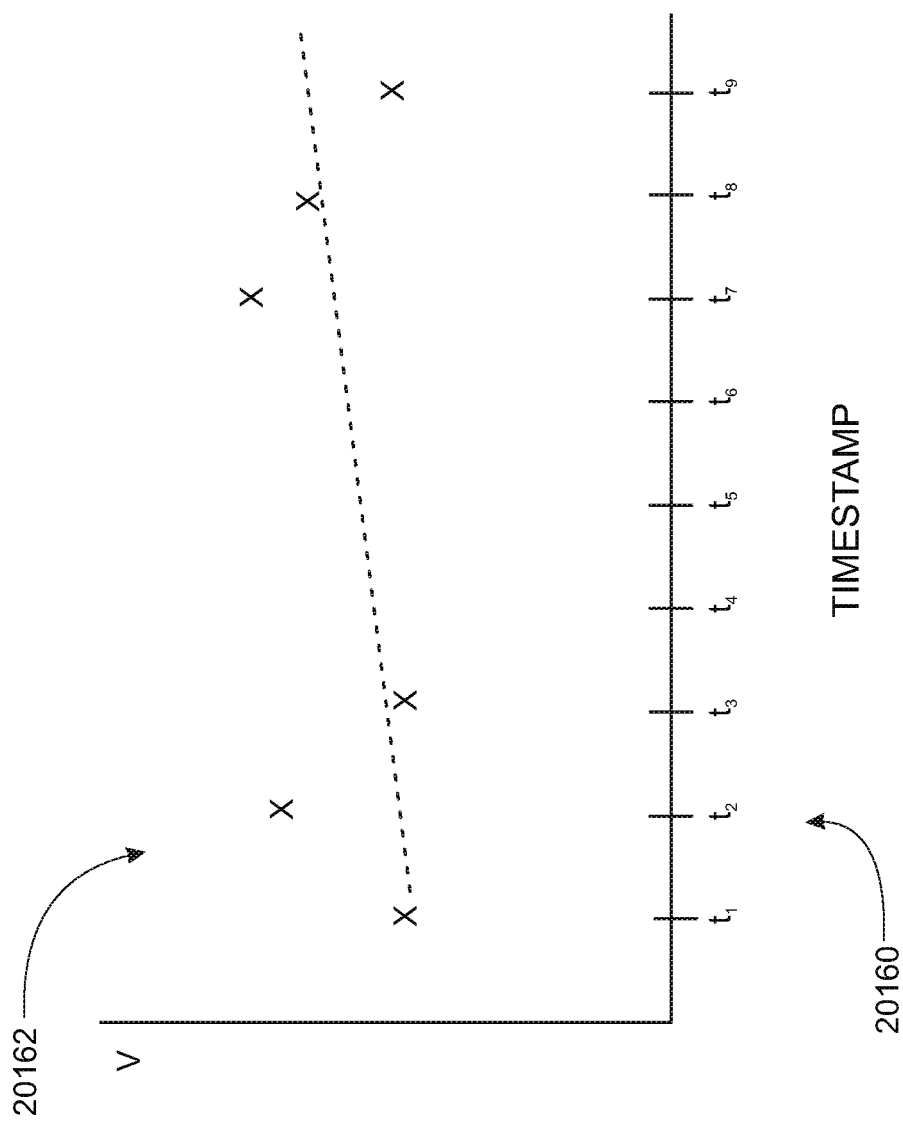
FIG. 20 is a diagrammatic representation of an extrapolation of data from received and missing data packets in the communications and transmissions of an embedded power electronics system according to one embodiment.

The 5-bit tick count provides a fine-grained timestamp 20160 for the data that was sent. This allows for up to 31 broadcast packets to be lost while still maintaining a valid timestamp 20161. The ping packet 20162 contains the same timestamp but uses a full 16 bits. The combination of these two timestamps allows the PC to track timestamps even in the presence of missing packets ($t_4$, $t_5$, $t_6$) and extrapolate received data for example from measured or sensed voltage data as shown in FIG. 20 without the DSP having to allocate large amounts of bandwidth.

Figure 21:
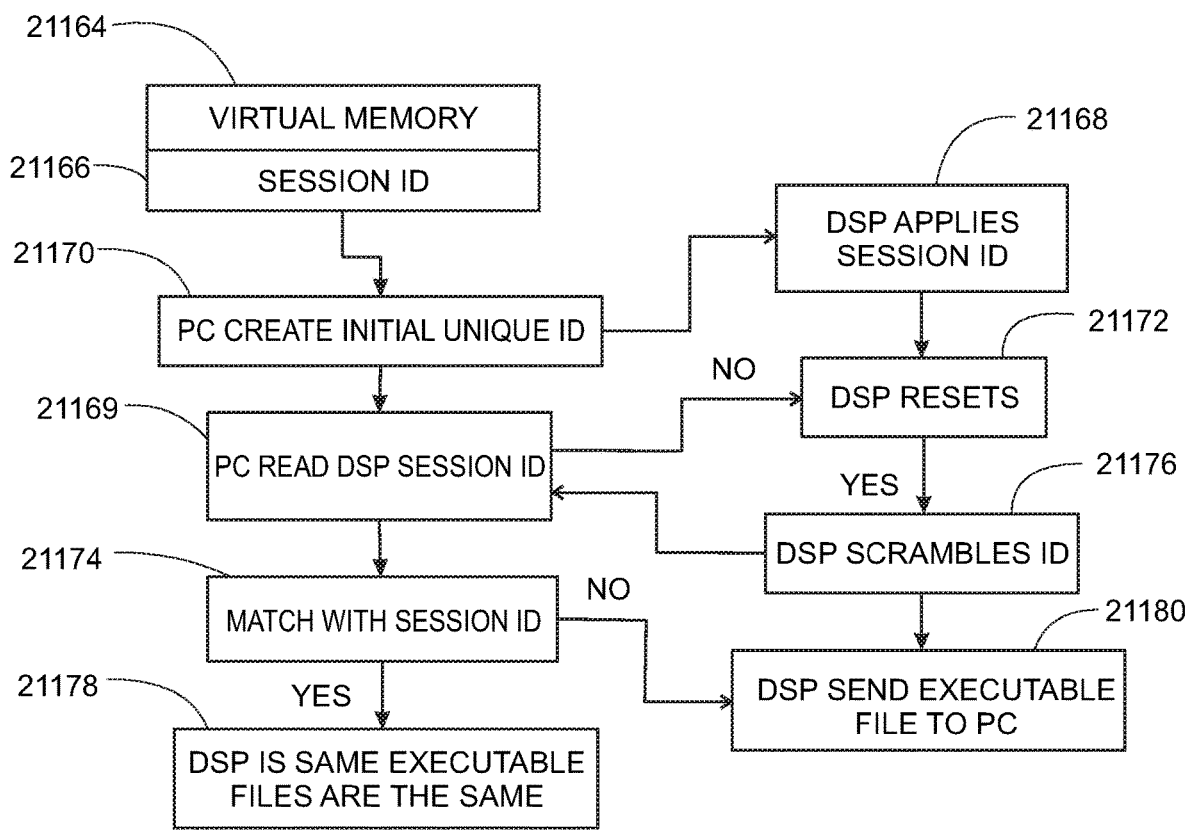
FIG. 21 is a flow chart of an embodiment of the use of a Session ID to confirm an interruption in the communications and transmissions of an embedded power electronics system.

The PC includes a copy of the DSP's executable file containing the symbol file, providing the PC with access to the DSP's memory. There are, however, certain items of data which, in order to access reliably, cannot be accessed by absolute DSP memory address, because this address may vary as the DSP program changes. Therefore a limited area of "virtual memory" 21164 where the DSP must translate well-known fixed virtual addresses as shown in FIG. 21 is provided to read and write memory stored in a place that the DSP knows but the PC may not know.

This includes the following items:

Build metadata (discussed earlier)—this lets the PC determine that a given executable file is appropriate to use on the DSP. If the build metadata in its executable file does not match the build metadata received from the DSP, then it cannot reliably read or write data using the absolute addresses found in the symbol table of the executable file.

Session ID—this is an arbitrary number created by the PC each time it first contacts a DSP. As shown in FIG. 21, the DSP scrambles 21176 its session ID 21166 every time it resets 21172. This allows the PC to determine what happens when it experiences a communications interruption (via ping packet timeouts). It may read the session ID 21166 from the DSP, and if the session ID 21166 changes, then either the DSP has been reset, or the PC has been connected to a different PC. If the session ID 21166 is the same, it may assume that it was merely a temporary communications interruption and the DSP is the same one.

Metadata for broadcast packets: see below.

Figure 22:
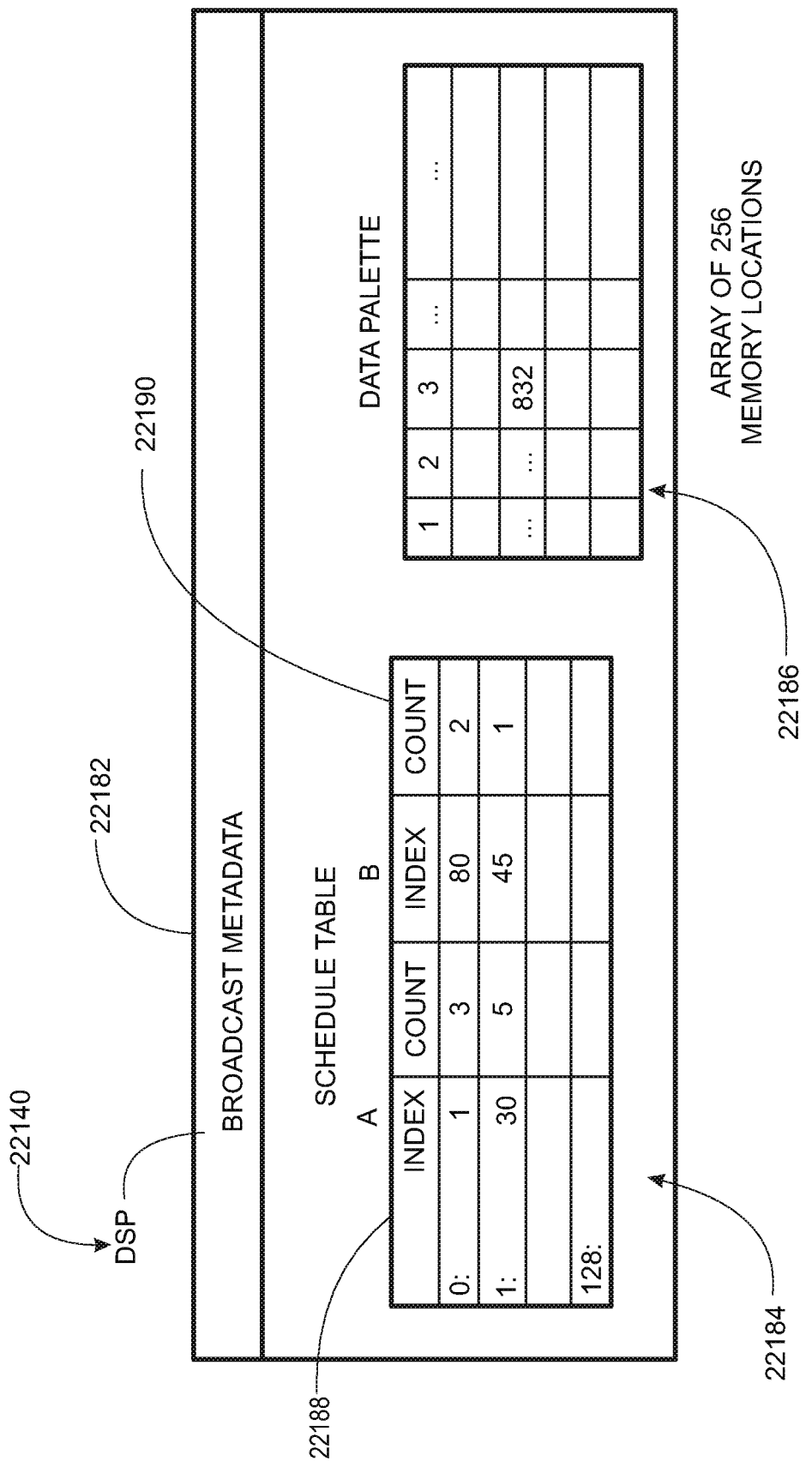
FIG. 22 is a diagrammatic representation of schedule table and data palette of the communications links and transmissions of an embedded power electronics system according to one embodiment.

CPU metadata, including flags that determine whether the CPU uses 8-bit or 16-bit memory words whether the CPU uses 16-bit or 32-bit pointers for memory addressing whether multiple-word quantities are most-significant-word first or least-significant-word first whether memory address alignment is 1-byte-aligned, 2-byte-aligned, 4-byte-aligned, or 8-byte-aligned The DSP uses a particular block of virtual addresses to determine which data it sends over broadcast packets, including the schedule table, the data palette, (both described below) and a few counters. As implemented in a first embodiment and as shown in FIG. 22, the 128 broadcast packet ids 22182 correspond to 128 rows of a "schedule table" 22184. This schedule table 22182 tells the DSP 22140 what information to send for each of those ids. Each row of the schedule table 22184 contains 2 pairs of data, the A and B pair, with each pair consisting of an index and a count referring to a broadcast data palette 22186, also known for historical reasons as the debug address table or DBAT. The data palette 22186 contains 255 addresses of 16-bit data words. (8 data words may only be logged by using one whole 16-bit data word; 32-bit data words may only be logged by using two entries in the data palette) These are arbitrary and are written by the PC. The schedule table's index 22188 and count 22190 are interpreted as a starting offset and a starting count within the data palette 22186.

For example, if schedule table row 0 contains A index 1, A count 3, B index 80, B count 2, then the DSP broadcast packet id 0 will send the contents of data palette addresses #1, #2, #3, #80, and #81. If schedule table row 1 contains A index 30, A count 5, B index 45, B count 1, then the DSP broadcast packet id 1 will send the contents of data palette addresses #30, #31, #32, #33, #34, and #45. Typically the A data series is for several words of data that are broadcast at every 10 kHz cycle, or every other 10 kHz cycle, whereas the B data series is for 1 or 2 words of data that cycles through a long list of data, thereby creating a "fast" set of a few data words, and a "slow" set of many data words, making for a flexible system for data transfer.

If the PC sets the contents of the data palette 22186 and the schedule table 22184, then it may unambiguously interpret the contents of each broadcast packet and associate it with the appropriate DSP memory locations that it selects. In the present embodiment, the DSP cycles through schedule table rows 0 to SCHEDPERIOD-1, where SCHEDPERIOD is a counter located in the virtual address space and may be set by the PC. It is possible, however, for the DSP to use any arbitrary ordering of schedule table rows (e.g. 0,1,0,2,0,3, 0,4,0,1,0,2,0,3,0,4, etc). Since the schedule table row # is transmitted as the packet ID of broadcast data packets, the PC does not need to know about this ordering to be able to interpret it correctly, but a mechanism is provided that sets up the desired ordering.

Another aspect disclosed herein relates to a debugging/diagnostic system and user interface (DiagUI) for indicating and relaying engine operational data from the Stirling engine to technicians, operators and engineers. Operational data for the engine itself may be collected from a plurality of engine sensors and from the DSP and engine controller system hardware and software. The operational data may be optionally stored in a memory storage device, or relayed directly through the DiagUI to the operator. The diagnostic system and DiagUI is essentially a computer program which enables an operator to easily read and write data to the DSP of the Stirling engine, as well as monitor the engine and DSP and attend to data logging of predetermined operational data to evaluate and analyze operational conditions of the Stirling engine. The diagnostic system may accomplish these tasks in a number of ways, for instance in real time using for example a high bandwidth data communication channel, or the system may buffer data within a given time frame, or take a snapshot of desired sensor data at some point in time of the operating data from the Stirling engine and present the data in a coherent form for analysis.

There are several critical tasks to accomplish for a robust debugging/diagnostics system for the Stirling engine. The first is the necessity to read/write data to and from desired variables of the Stirling controller. The read/write function is essentially an on-demand task for the diagnostic system and is essentially a one-time task, meaning although repetitive from the operator's perspective; the read/write function to any particular variable is begun and completed in a short one-time task. Another important task is monitoring of the proceeding engine operations which means that the DiagUI displays desired variable values on the screen, i.e. through the DiagUI for immediate evaluation of engine operation, and data logging i.e. the recording of desired data in a time frame for specific analysis by the operator or engineer.

Reading and writing of variables for example includes determining and selecting a desired variable to write to, for example a control parameter for the engine which the operator desires to modify such as a voltage gain threshold limit which the engineer or operator desires to change to improve engine operations. Monitoring of a desired variable includes for instance displaying a real time motor current in a table of the DiagUI and then logging that value to a data file for subsequent analysis. In various embodiments, the desired variables may be any variable from the executable file. The system only need know how to translate a variable name to an address and the system accomplishes this by reading the executable file.

Figure 23:
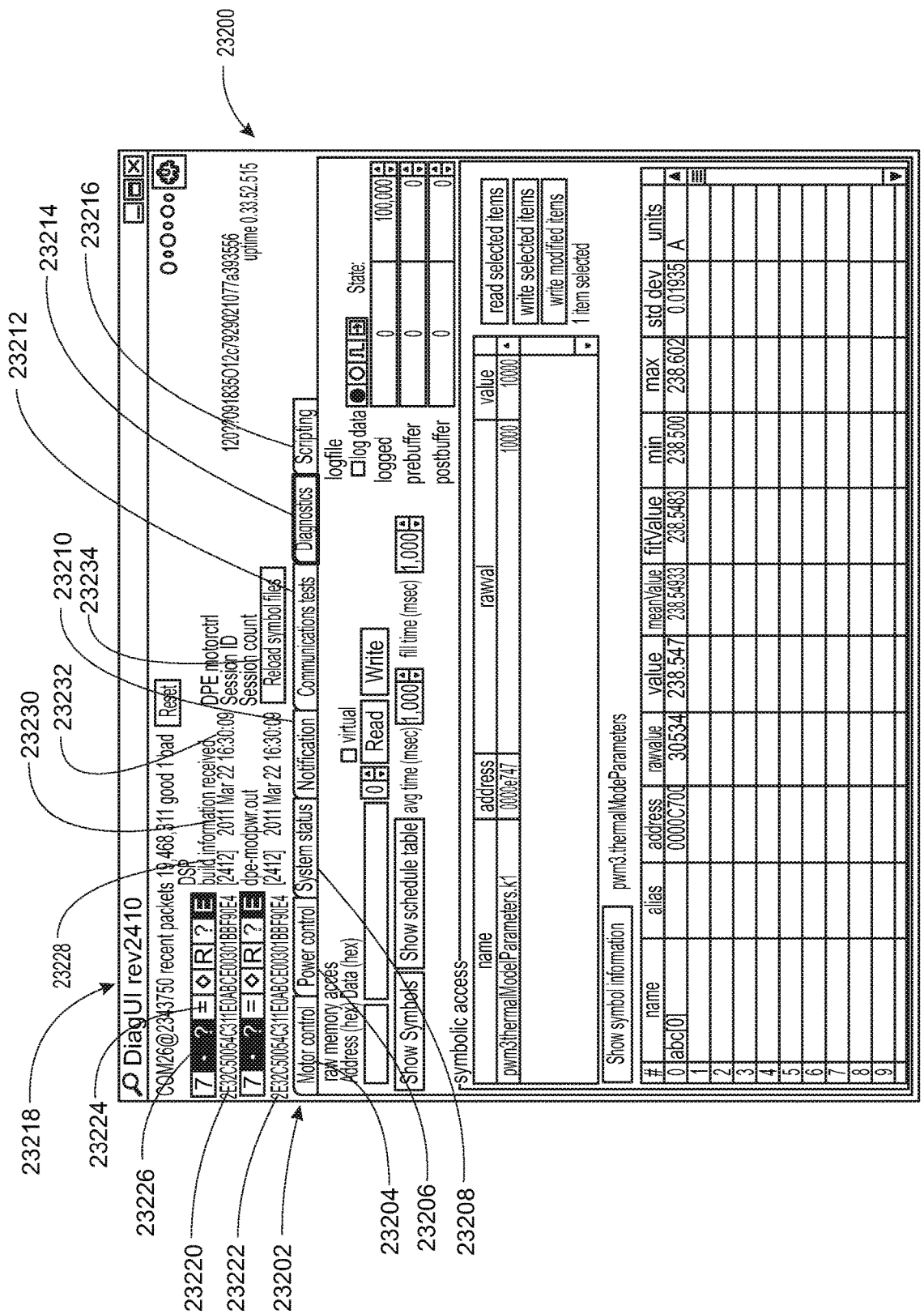
FIG. 23 is an embodiment of a representation of diagnostic software for an embedded power electronics system.

Each of these tasks are facilitated through the DiagUI 23200 shown in FIG. 23. Generally, the DiagUI 23200 consists of a number of differentiating tabs 23202 shown here as Motor control 23204, Power control 23206, System status 23208, Notification 23210, Communications tests 23212, Diagnostics 23214 and Scripting 23216. The DiagUI 23200 is not limited to these systems, and there are certainly other systems and components of the Stirling engine which could be differentiated here. The Diagnostics tab 23214 is the most important for the following discussion because this tab facilitates the reading/writing, monitoring and data logging functions for the operator or engineer as described above.

At the top of the window there is a series of vertically adjacent icons, with each icon containing a specific symbol, this is referred to as a Build ID indicator 23218. The issue addressed by the Build ID indicator 23218 component of the diagnostic screen is to provide an easily identifiable symbol to the operator which indicates that the version of the diagnostic program executable file matches the version of the DSP executable file. At start up a communication link between the DiagUI and the DSP is initiated and a version indicator for the DSP 23220 and for the DiagUI 23222 is displayed as a hexadecimal number below the Build ID indicator icons 23218. The version indicator 23220, 23222 is a hex translation of the date, time and version of each of the executable files. However, the version displayed in hexadecimal form is not as straightforward to read and compare and an operator may make a visual error in comparing the two numbers. The use of simple symbols provides an easily read indication of differences in software versions and therefore the hex number of each version is translated into the Build ID indicator 23218 with a first set 23224 of the symbolic icons displayed for the software version of the DSP and a second set 23226 of symbolic icons displayed for the DiagUI. If the symbols of the first 23224 and second 23226 sets match the version of software of the DSP and DiagUI are the same. If one or more symbols between the two sets do not match the DiagUI and DSP do not have the same version of software. It is important to quickly identify a difference in software versions where the disparity may result in calls to variables at incorrect address locations and writing and language errors in resolving or transmitting data between the DiagUI and the DSP.

An indication of a mismatch in software versions on initiation of the communications link between the DiagUI and DSP provides for an operator to quickly scan the date 23230, time 23232 and build version 23228 of the source code displayed next to the Build ID indicator 23218 and determine if a new version of software must be installed for either the DiagUI or DSP. This initial data exchange and version indication reduces transmission errors and saves time as errors attributable to the incompatibility of software versions are removed.

Also provided in the diagnostic window is a counter 23234 to account for issues in the communications packet stream. The DSP may send, as an example 10,000 communications packets per second, and a counter which identifies bad, i.e. unreadable or corrupted packets, is important to the operator to ensure that the communications packets are being properly received. The counter may also be reset if necessary.

Figure 24:
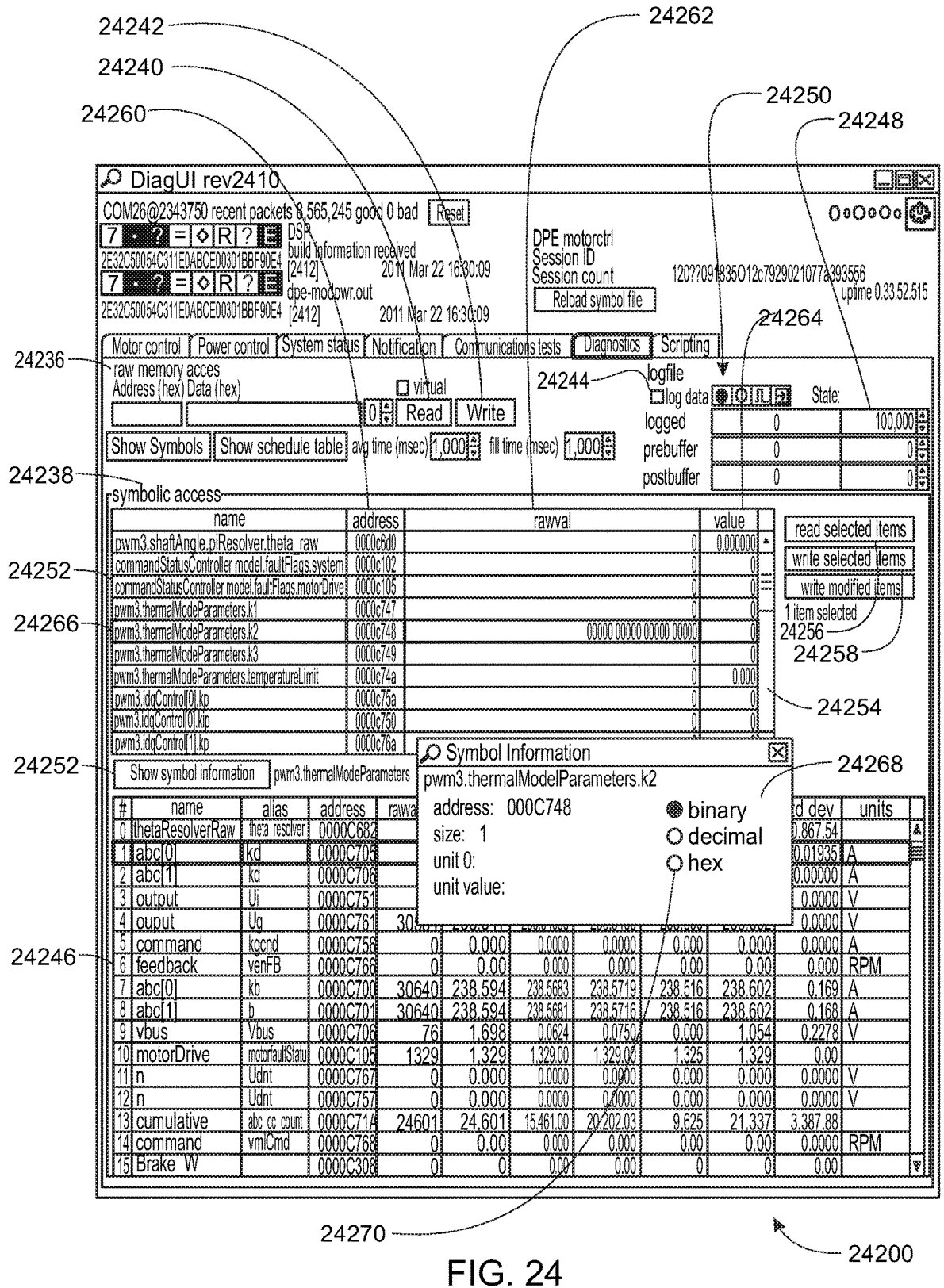
FIG. 24 is an embodiment of a representation of diagnostic software with a Symbol Information for an embedded power electronics system.

The diagnostic window 24214 as shown in FIG. 24 is broken into an upper and lower portion with the upper portion including a raw memory access display 24236 and the lower portion including a symbolic access display 24238. It may be helpful to have direct access in the main DiagUI window to the raw data at any given address. Using the raw memory access box 24236 the operator may directly read/write data from any given address through this box using the read 24240 and write 24242 buttons. To the right of the raw memory access panel 24236 access to data logging is enabled by checking the log data box 24244, and selecting a desired slot no. 0-255 from the data logging palette 24246 within the symbolic access display 24238. A counter window 24248 is provided on the right hand side to set a predefined number of samples, i.e. 10,000 samples for a data logging file. A maximum number of samples must be defined to prevent logging of data in excess of available storage space. Almost like a tape recorder there are record and stop buttons 24250 to start and stop data logging. The record button may be used in combination with a pre and post trigger data storage buffer to define a time period before the actual button is activated by the operator, and similarly to record data for a given time period after a user stops the logging. Also the operator may define a trigger, i.e. a condition which triggers data logging for a predetermined time period at a specified sample rate. The diagnostic system may also send an email or text message to a desired operator if a serious loss of communication between the diagnostic program and the DSP occurs.

The symbolic access display 24238 has two sections, the watch item table window 24252 and as previously mentioned the data log palette 24246. The watch item table 24252 provides access to any variable using a scroll bar 24254 to move up and down through a list of variables. The address 24260, raw value 24262 and the engineering value 24264 of a watch item 24266 is displayed and one or more parameters may be read and adjusted to desired values in the engine controller by utilizing the "read selected item" 24256 and "write selected item" 24258 buttons to the right of the watch item table 24252. Alternatively, the operator who generally has knowledge of the variables in the program may select the variable in the data log palette 24246 to have the value displayed in the watch item table 24252. The watch item variable 24266 symbol information may be shown in binary, decimal or hex notation by selecting the symbol information button 24268 and selecting the appropriate radio button 24270 to format the variable symbol information.

Figure 25:
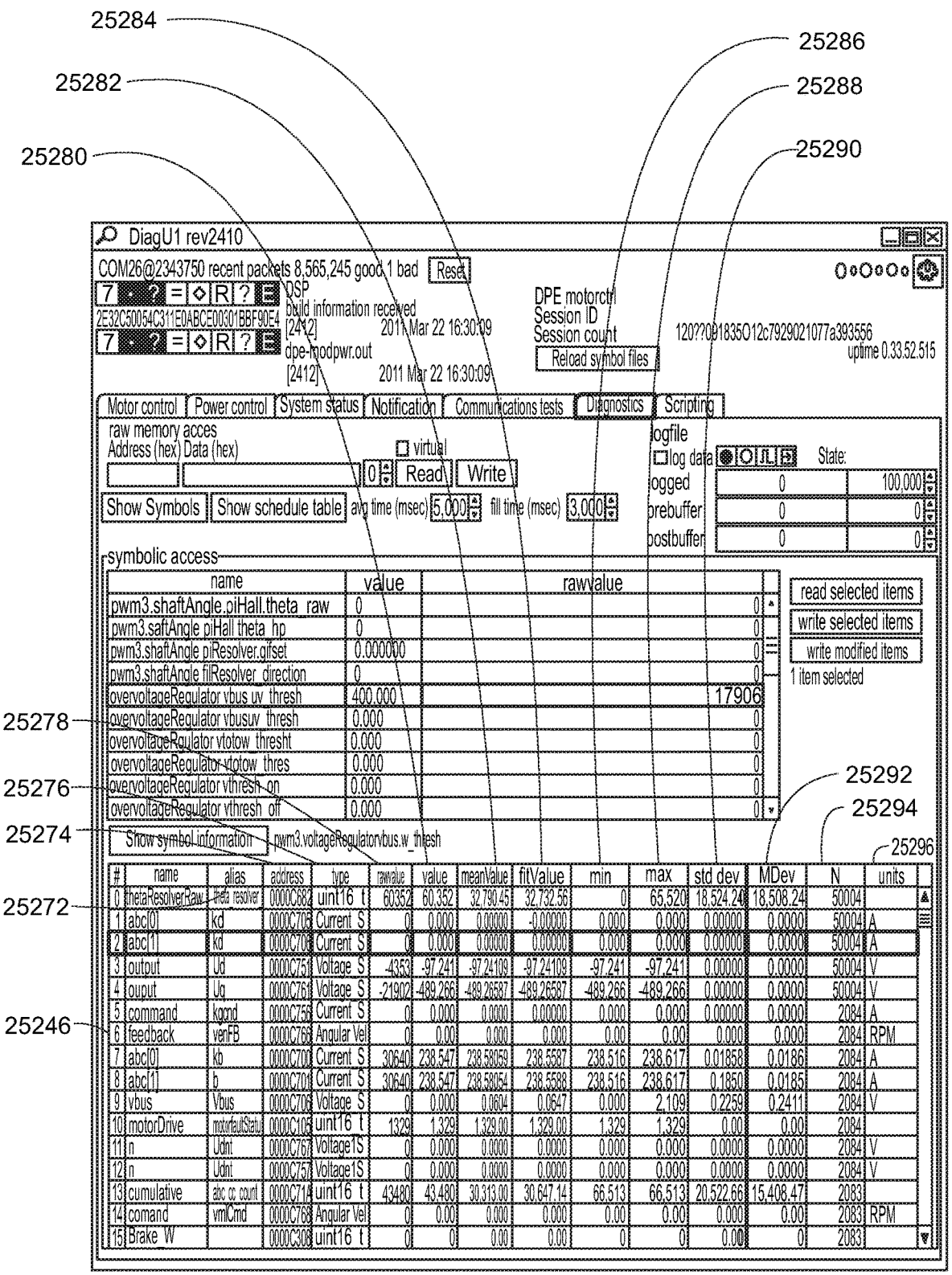
FIG. 25 is an embodiment of a representation of diagnostic software for an embedded power electronics system.

Below the watch item table 25252, as shown in FIG. 25, is the data log palette 25246 for monitoring and data logging. The symbol information here is shown in real time and for purposes of analysis includes a variable's alias 25272, an address 25274 in hexadecimal notation, a data type 25276, the raw value 25278, the engineering value 25280, the mean value 25282, the filtered value 25284, the min 25286, the max 25288 of variable, the standard deviation 25290, the filtered deviation 25292, the N value 25294 and the unit value 25296. The raw value 25278 of a DSP variable is an integer of for example 16 bits, stored in memory that is an encoded number of counts based on dynamic range and resolution that corresponds to a more readily recognizable engineering value. For example, for temperature a raw integer count of 1 is predefined=0.01 degrees C., so a raw value of 10,000=100.00 degrees C. The diagnostic program may display the raw value or the engineering value by selecting the appropriate format in the symbol information window as discussed above which is helpful to the operator who may find it easier to work with either the raw value or the engineering value depending on the circumstance. Any variable in the program which requires translation between a raw value and an engineering value may be stored and represented in optional formats to enhance the information provided to an operator, for example voltage at various components in the system may be represented as measured voltages as an engineering value and as integer counts as a raw value that may quickly and easily be compared with other similar variables.

By way of further explanation the DSP program contains the variables which represent quantities that have associated physical units, e.g. battery temperature, motor current, bus voltage. The program is provided with a conversion ratio between integer counts in a program variable and an engineering value, for example:

100 counts=1° C.
$2^{15}$=32768 counts=732 V
$2^{15}$=32768 counts=256 A

A variable is associated with a unit definition by encoding for example a voltage unit as 732.0Q15V wherein 732.0 is the unit conversion factor and the Q value 15 is an arbitrarily chosen modifier to adequately represent an engineering value with integer mathematics. The rest of the definition is merely the unit name, i.e. descriptive nomenclature such as V for volts, A for amps, or any other descriptive markers the programmer believes are necessary. For example an engineering value of 366 volts maybe converted to a raw value of counts by dividing the engineering value by the conversion factor and multiplying 2 to the Q modifier power as shown below.

$$(366.0 \text{ volts}/732.0 \text{ volts}) \times 2^{15} = 16384 \text{ counts}$$

To associate specific unit definitions with DSP program variables it may be helpful to use typedef declarations to identify a variable by the unit of measure that it represents. From a programming standpoint each DSP variable is associated with a variable type, e.g. uint32_t, an unsigned 32 bit, int16_t, signed 16 bit, and uint8_t, unsigned 8 bit. The typedef declaration is an understandable synonym used in place of a data type to more easily associate that variable with specific data, such as a voltage, current, temperature, etc.

Typedef int int16_t; creates the type "int16_t" as an equivalent to type "int" As shown below diagrammatically using typedef declarations a string of variables equivalent to the following is shown:

```
typedef  int            int16_t;
typedef  unsigned long  uint32_t;
typedef  unsigned long  baz;
typedef  int16_t        foo;
typedef  int16_t        bar;
typedef  bar            quux;
typedef  uint32_t       blam;
```

Figure 32A:
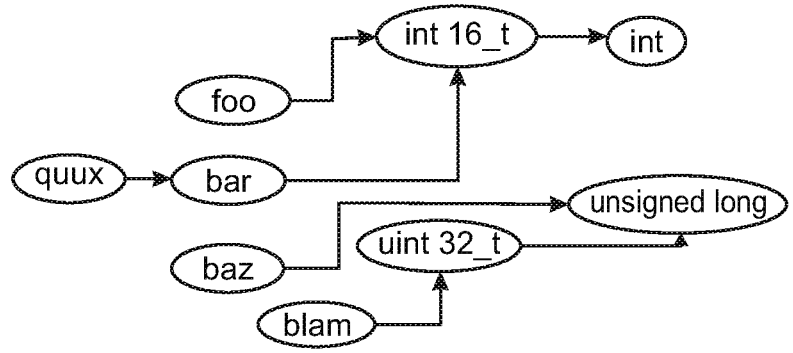
FIGS. 32A-32B are representations of a method to annotate software variables in an embedded system according to one embodiment.

This assignment is show schematically in FIG. 32A.

In this example foo is a synonym for data type int 16_t which is a synonym for data type int meaning foo is of data type int. In this way a synonym of an easily understandable term may be used to name a variable. The use of typedef declarations provides clarity to programmers and users and provides a methodology to automatically associate a DSP variable with a unit definition as described herein. Any variable or set of variables may be defined; for example a set of current and voltage readings may be defined as current1_S16, voltage1_S16, temp1_S16, current2_U32, voltage2_U32, etc. with each of these unit types resolved to a C/C++ native data type. Variable names may be created with specific metadata such as an identifier, in this example a suffix that includes the unit type. The identifiers may be grouped as members into a data structure providing for the group of identifiers to be called under one name, the name being a new valid type name the same as the fundamental types such as int or long. The structure name may then be used in a particular namespace context allowing for variables having the special group identifier to be recognized be selected from other variables.

For example a typedef declaration is made for each identifier and these identifiers are grouped under a data structure with a special pre-arranged name such as _Unit_Base_Marker_as shown below. A typedef declaration is also made for each variable to point to each of the appropriate identifiers. In this way each variable string contains the unit base marker suffix and may be recognized from other similarly named variables that are not within the same context as those variables of the _Unit_Base_Marker type.

```
typedef uint16_t U16;
typedef int16_t S16;
typedef uint32_t U32;
typedef int32_t S32;
struct _Unit_Base_Marker_ {
U16 x000;
S16 x001;
U32 x002;
S32 x003;
}
```

Figure 32B:
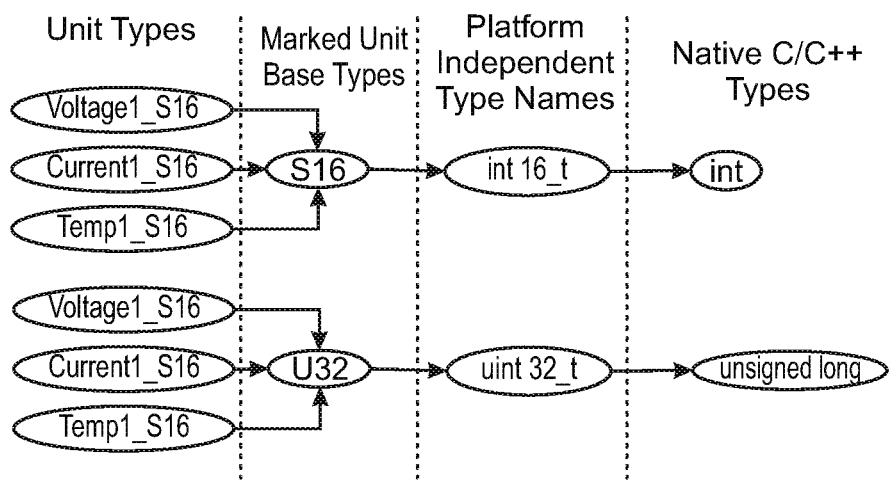

This assignment is show schematically in FIG. 32B.

This provides for a variable string having raw value data to be automatically associated with a unit definition and thereby convert the raw data value to an engineering value using the conversion factor as described above. In operation, the DiagUI executable program provides a set of global variables that each include a unit name, a static address and unit type. Using the specific address information, the DiagUI extracts data from the DSP and associates this reading or measurement with the specific global variable having that address information and creates a variable string that includes the unit name, identifier unit type, and the DSP data. As an example for a variable string;

Voltage1_S16 Vbat;

Using typedef and the stored metadata defining the string the diagnostic tool enables DSP data to be associated with unit definitions in the following manner:

(1) The DSP output data file with symbol string information may be read to detect a program variable's type.

(2) The typedef chain is compared to the data structure type for the special _Unit_Base_Marker_and if the typedef chain is defined within the context of that data structure type, a unit definition may be associated with the variable.

(3) If the variable type is descended from one of a unit base type, the name is analyzed to determine if the name ends in one of the members of the data structure, in this example one of the suffixes _S16, _U16, _S32, _U32.

(4) If the variable name contains one of the suffixes, the variable data is resolved to remove of the identifying suffix from the unit name to determine the global variable, here for example the variable "Voltage1_S16 Vbat" has an inferred unit name "Voltage1".

(5) The unit name is searched for in the encoded unit definition string, here "732.0Q15V"

(6) The unit definition is interpreted as $2^{15}$ counts=732.0V and this data is associated with the program variable, Vbat thereby converting the raw value DSP data to an engineering value.

In some embodiments, the unit definition for any variable in the system may be changed using the DiagUI any time the DiagUI is turned on including, but not limited to, while the system is running. In some embodiments, the DiagUI may only update the unit definitions for variables when it is turned on or when it is reinitialized. In some embodiments, the DiagUI may be programmed to update the unit definitions for variables at any time including, but not limited to, when a user requests the DiagUI to update the unit definitions for variables, at specific time intervals, and whenever a unit definition for a variable has been updated using the DiagUI. In some embodiments, when a unit definition of a variable has been changed using the DiagUI, the DSP will update the unit definition of that variable and any unit definitions of variables dependent on the unit definition of that variable. For example, the unit definition of power may depend on the unit definitions of voltage and current; therefore if the unit definition of voltage and/or current are changed, the DSP will not only update the unit definitions of voltage and/or current, but also the unit definition of power.

The scripting display window 26298 accessed by selecting the scripting tab 26216 is another important aspect of the DiagUI. As is well known in the art a scripting program is essentially a series of instructions interpreted at one time by a software application in a given system. The script is not usually part of the source code of the software application and may be a different language from the source code as well. Scripts are generally stored in a location from which an operator may retrieve and run the script to accomplish the specific and often dedicated commands in the script.

Figure 26:
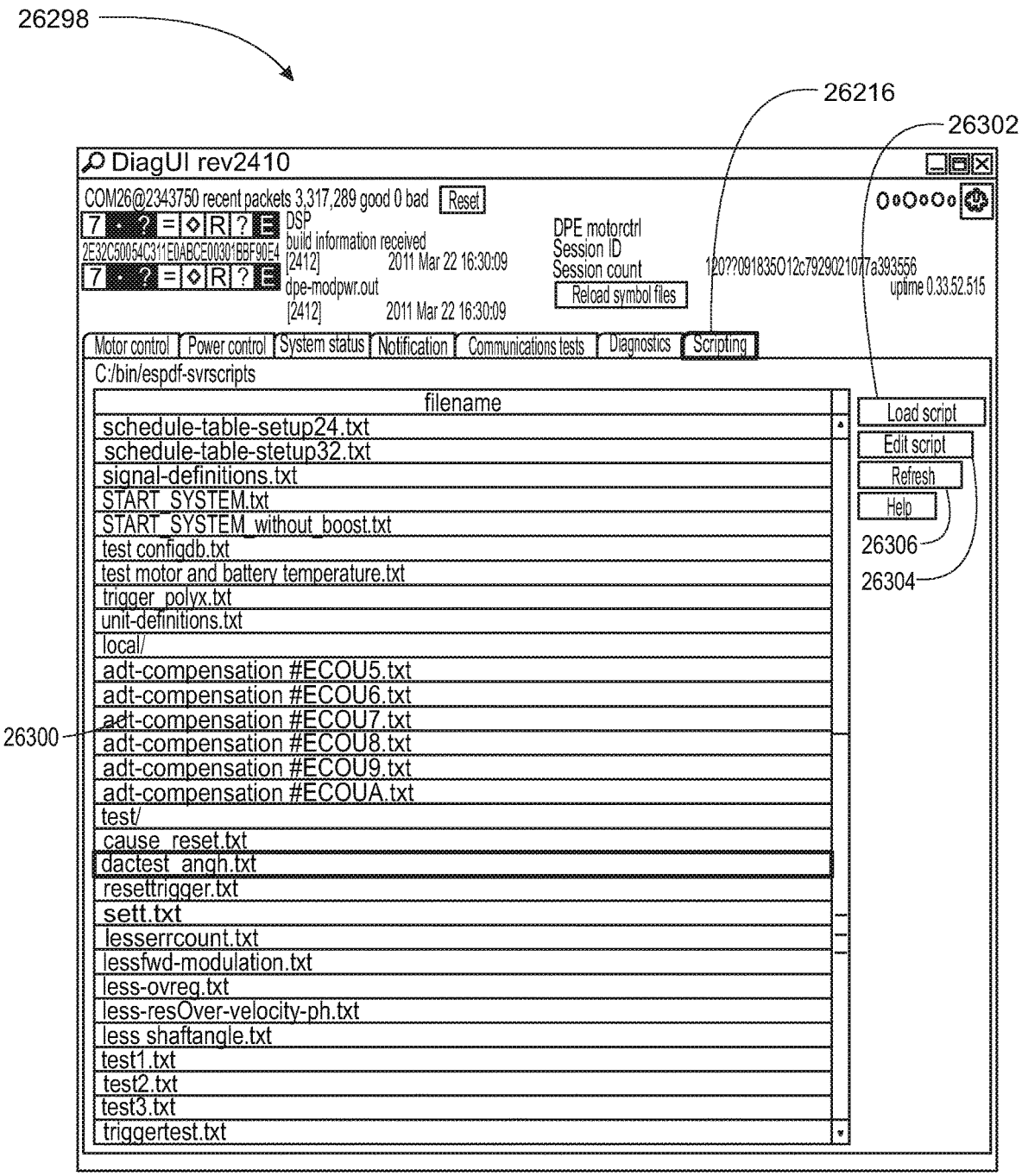
FIG. 26 is an embodiment of a representation of scripting software for an embedded power electronics system.

As seen in FIG. 26, the scripts are shown as simple text files .txt 26300, and may be readily retrieved by selecting the scripting tab and opening a window displaying all of the available scripting files for the operator. The buttons on the right provide the operator the ability to load 26302, edit 26304, and refresh 26306 any selected script.

A variable may be given a verbose name by a programmer therefore the scripting program allows the use of an alias for a variable. The alias may be used in the script to perform an action on, evaluate or change a value of a variable. An address defines the location of the variable in the DSP. Statistical analysis of the variable may also be provided within a time window, for example a mean value over 5 seconds, best fit value, max and min as well as std. deviation may be helpful. The data unit for example Amps may be used in a script.

Figure 27:
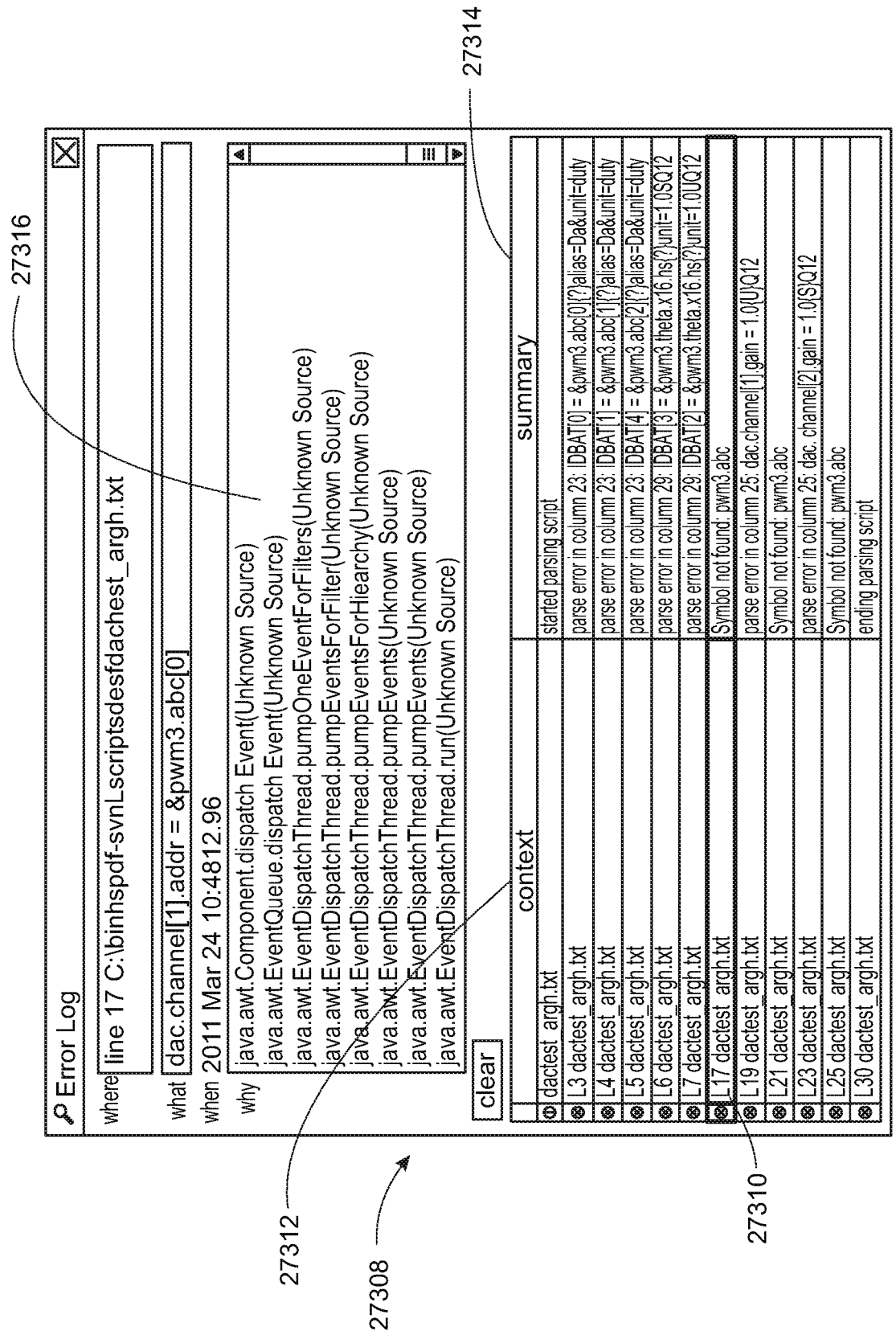
FIG. 27 is an embodiment of a representation of an Error Log for an embedded power electronics system.

A first embodiment of an errorlog 27308 is shown in FIG. 27. Errors detected by the diagnostic program are provided to the operator in a visual attraction form by blinking, highlighting an error message or other visually distinctive methods of directing the attention of the operator to the error 27310. This occurs for an appropriate amount of time for example 5-10 seconds. Context 27312 and summary information 27314 of the error may be provided. The operator may open the message 27310 in a window to retrieve detailed information 27316 relating to the error message.

Software to AutoCode Display of State Bits

In some embodiments, the DiagUI may display a large number of state bits in the symbolic access display 24238. In some embodiments, these state bits may be Boolean and indicate a variety of conditions including but not limited to one or more of the following: batteryUnderVoltageSoftware, transistorOvertempD, inverterOvertemp, GridPllLocked, bridgeDisableABCD. In some embodiments, some of these state bits may be latched values meaning that if the value of the bit changes from its initial value, then it remains at the $2^{nd}$ value until the values are reset. By way of an example, in some embodiments, if the motorspeed bit momentarily displays a fault state and then returns to the run state, the latched motorspeed bit remains in the fault state until reset. In some embodiments, the state bits may be displayed to allow easy assessment of the condition: bits in the no fault state show an empty box, bits that show a past fault, but not currently in the fault state (latched fault) show as a grey box with an X on it and bits that show an active fault show a box with a red X on it.

The state bits used in the DSP and displayed in the DiagUI may be changed, in some embodiments, and may, in some embodiments, be pre-determined/preprogrammed. The state bits may be changed by modifying the C++ code for the DSP and the Java code for the DiagUI. However, those changes may be complex and, in some embodiments, are coordinated between the C++ and Java code. In some embodiments, the method described below may be used. Therefore, in some embodiments, the system may include a method to auto-generate C++ code that is compiled with the rest of the code that in part controls the DSP and can be read by the DiagUI.

Figure 33:
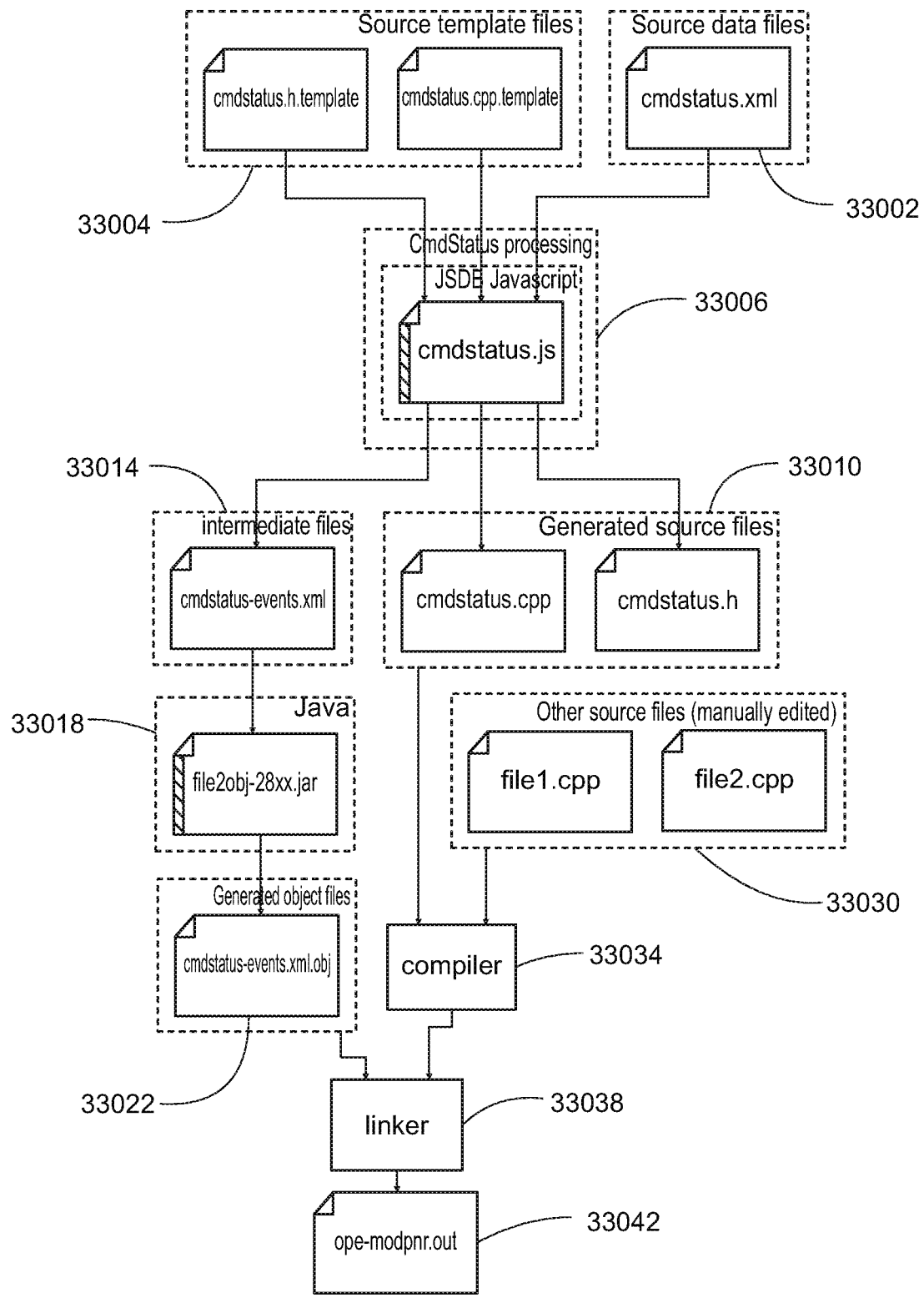
FIG. 33 is a flow chart of a software build process for handling system-wide command and status bits according to one embodiment.

In some embodiments, the process to implement changes to the displayed state bits is presented schematically in FIG. 33. Modification may be made to cmdstatus.xml file 33002 to define which state bits will be displayed and if the display will include the latched value. Extensible Markup Language (XML) is a markup language that defines a set of rules for encoding documents in a format that is both human-readable and machine-readable. The two files cmdstatus.cpp.template and cmdstatus.h.template 33004 are template files that once written may not need to be changed. These files 33002, 33004 are processed by a java script cmdstatus.js 33006 to auto-generate source code files cmdstatus.cpp and cmdstatus.h 28010 and intermediate file cmdstatus-events.xml 33014. A java program file2obj-28xx.jar 33018 reformats cmdstatus-events.xml 33014 to a machine readable object file cmdstatus-events.xml.obj 33022. In some embodiments, the javascript file 33006 and the java file 33018 are files that may be written only once and generally may not need to be changed when the XML file 33002 is modified.

The auto-generated source code files cmdstatus.cpp and cmdstatus.h 33010 may be compiled with the rest of the C++ files required to program the DSP 754 and then may be linked with at least the object file cmdstatus-events.sml.obj 33022 to produce the execute able file dpe-modpwr.out 33042. The DiagUI, which, in some embodiments, runs on a separate computer that is linked to the DSP 754 via a communication cable, accesses the executable file dpe-modpwr.out 33042. The DiagUI reads the executable file dpe-modpwr.out 33042 to extract cmdstatus-events.xml and decode the events sent from the DSP into meaningful displayed values. As noted previously, the DiagUI displays the version of the executable used by the DSP and DiagUI to confirm that they match.

Figure 29:
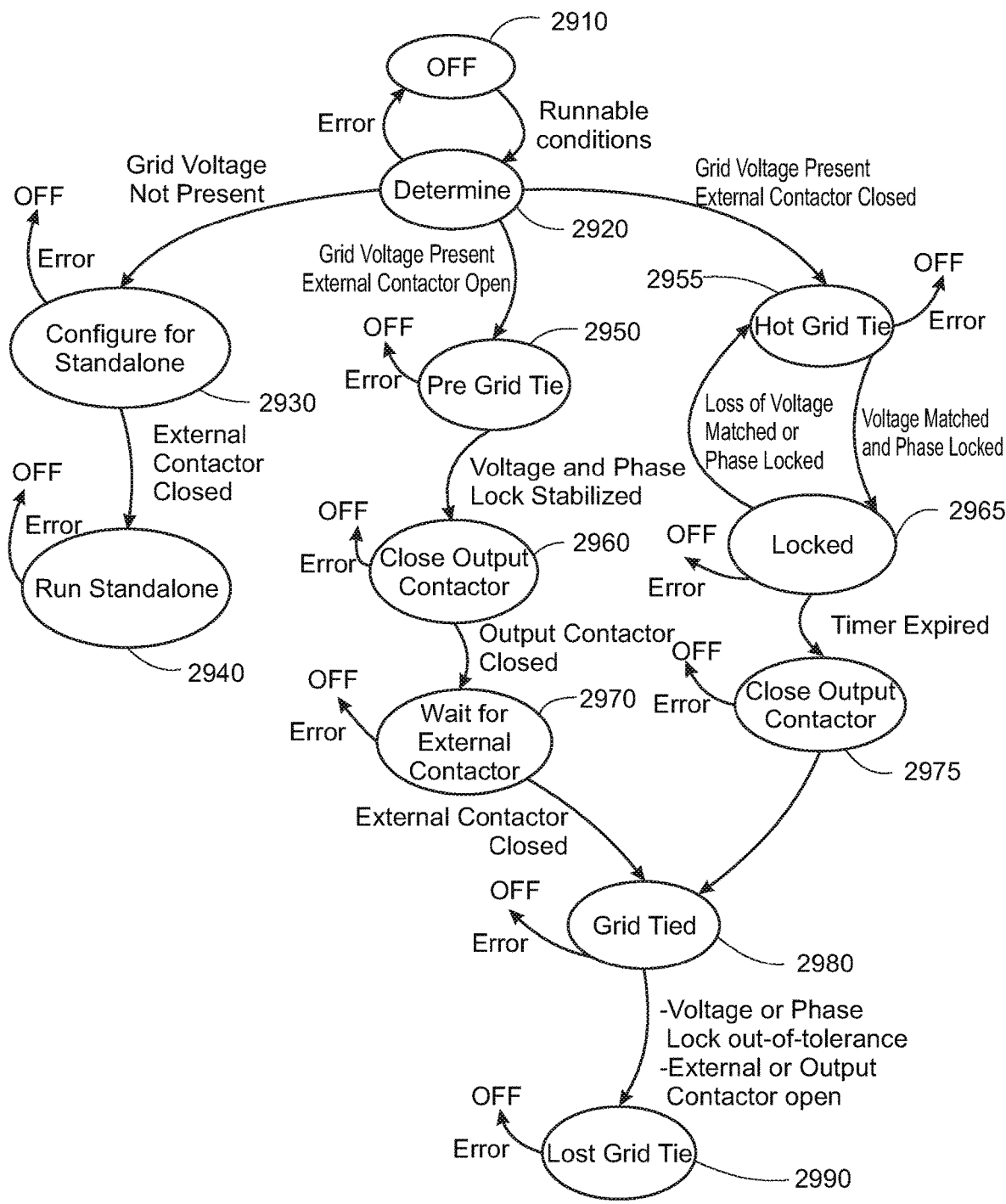
FIG. 29 is a schematic description of an inverter state machine according to one embodiment.

In some embodiments, the structure of the software to start the AC inverter is presented in FIG. 29. The inverter software turns on the inverter 642 (FIG. 6), syncs the inverter output with the grid power for frequency, phase and amplitude. The inverter starts off in the OFF state 2910 and returns to the OFF state if an error occurs. If the system is not in error the inverter moves to the Determine state 2920.

The inverter system is not in an error and in a runnable condition if the following conditions are true:
a) the inverter is enabled
b) no system faults comprising:
  i. DC bus overvoltage
  ii. Inverter drive bridge overcurrent (measured per phase, for hardware protection)
  iii. Inverter output overcurrent (measured as the sum of the phases, for general operating limits)
  iv. Inverter drive bridge gate fault
  v. Inverter drive bridge disabled (i.e. some other part of the system has commanded the bridge circuitry to be disabled independently of the inverter)

vi. Invalid system configuration data (this is a specific check made on the configuration data stored in non-volatile memory)
vii. Faults-measurement DAC (digital to analog converter) not programmed (i.e. certain fault conditions cannot be reliably detected because part of the measurement system is non-operational)
c) the inverter output circuit breaker is closed.

In some embodiments, in the Determine state 2920 the software determines if the utility grid is 625 is present by measuring the voltage on the lines connected to the grid. If no voltage is detected on the lines connected to the grid, the inverter state machine proceeds to Configure for Standalone state 2930, where the inverter frequency and output voltage are set to fixed values and the drive circuits that control the IGBTs 658 are enabled. The software in Configure for Standalone state 2930 closes the external contactor 626 then the state machine transitions to Run Standalone state 2940. In some embodiments, the output contactor 627 transfers the load to the inverter output when the grid is not present. In some embodiments, the inverter runs in standalone mode in state 2940 until commanded off or an error conditions occurs.

In some embodiments, every state will transition to the OFF state in the case of an error condition. If the error condition is removed then the inverter will again move through the various states toward either the Run Standalone state 2940 or Grid-Tied state 2980.

The state machine transitions form the Determine state 2920 to the Pre-Grid Tie state 2950 if the correct voltage is detected on the grid power lines and the external contactor is not closed. In some embodiments, in the Pre-Grid Tie state 2950, the drive circuits are enabled and controller monitors the grid voltage for amplitude, frequency and phase. The Pre-Grid Tie state 2950 adjusts the output of the bridges 659 to produce AC voltage at the output contactor 626 that matches the grid voltage and is phase-locked with the grid. In some embodiments, the state machine transitions from the Pre-Grid Tie state 2950 to the Close Output Contactor state 2960 when the inverter output is stabilized, matches the grid voltage and has established phase lock with the grid. In the Close Output Contactor state 2960, the output contactor 626 is closed. The state machine transitions to the Wait for External Contactor state 2960, where the software waits until the external contactor 627 has closed before transitioning to the Grid-Tied state 2980. In the Grid-Tied state 2980, the inverter controller adjusts the power flow through the bridges 659 to regulate the voltage of the DC bus 250.

In some embodiments, the state machine remains in the Grid-Tied state 2980 until the inverter output goes out of tolerance or either of the two contactors 626, 627 are opened. The state machine will transition to the Lost Grid-Tie state 2990 if either the voltage or the phase lock between the inverter output and the grid goes out of their respective tolerance range. The state machine will also transition to the Lost Grid-Tie state 2990 if the output contactor 627 or external contactor 626 are opened.

In some embodiments, the state machine transitions from the Determine state 2920 to the Hot Grid Tie state 2955 if the correct voltage is detected on the grid power lines and the external contactor is closed. In some embodiments, in the Hot Grid Tie state 2955, the drive circuits controlling the bridges 659 are enabled and output contactor 627 remains open while the controller matches the voltage and phase of the inverter output to the measured values for the Grid 625. In some embodiments, the state machine transitions from the Hot Grid Tie state 2955 to the Locked state 2965 which runs a timer. If phase lock or voltage match is lost while the timer runs, the state machine transitions back to the Hot Grid Tie state 2955. Otherwise the state machine transitions to the Close Output Contactor state 2975 when the timer expires. In the Close Output Contactor state 2975 the software commands the output contactor 627 closed and waits until the contactor has closed before transitioning to the Grid-Tied state 2980.

Figure 39:
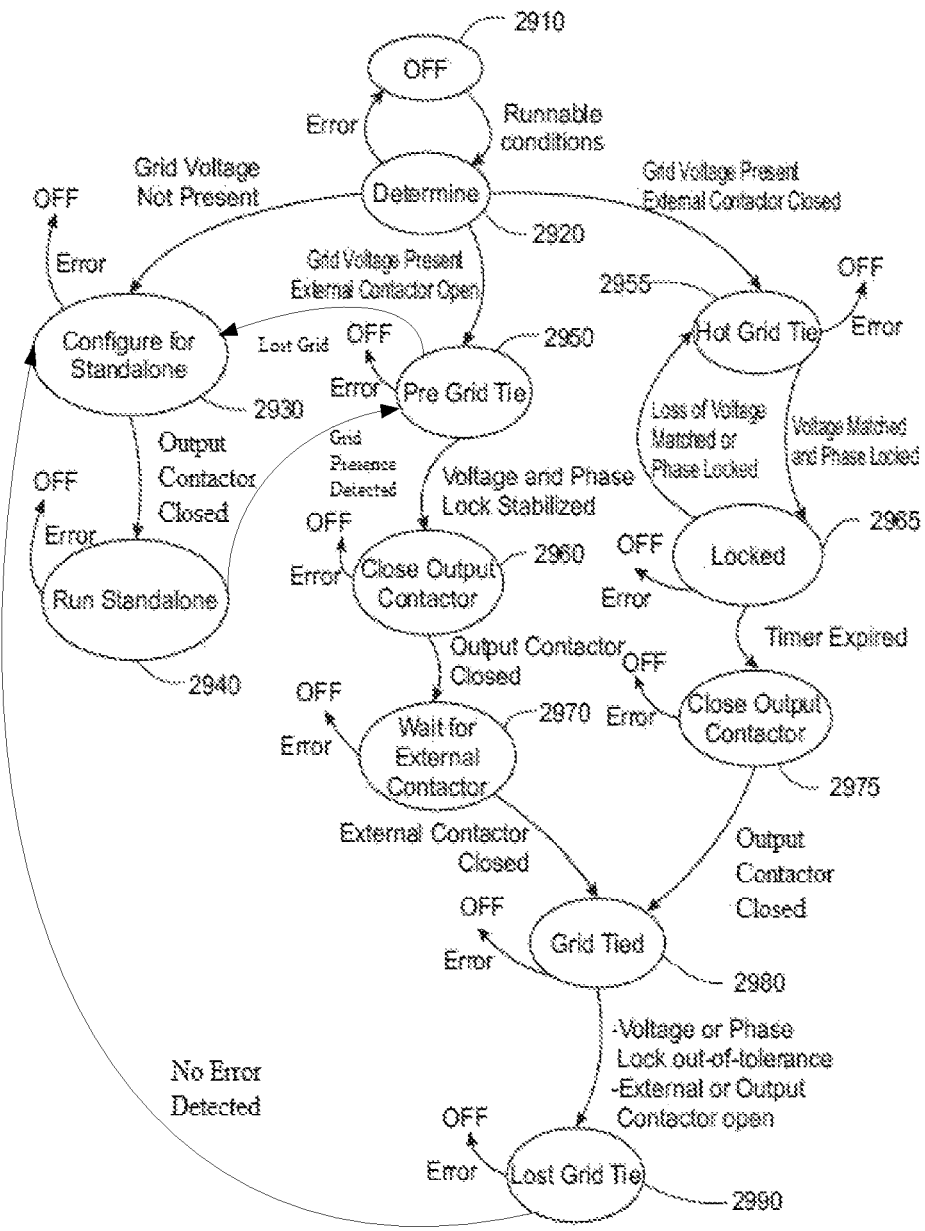
FIG. 39 is a schematic description of an inverter state machine according to one embodiment.

In some embodiments, the structure of the software to operate the AC inverter is presented in FIG. 39. In some embodiments, the structure of the software to operate the AC inverter in FIG. 39 is the same structure of the software as in FIG. 29, but with the advantage that the inverter does not have to go to an OFF state 2910 before attempting to switch between running in standalone and running tied to the grid. In some embodiments, when the inverter is in the Run Standalone state 2940, the inverter may proceed to the Pre Grid Tie state 2950 if the correct voltage is detected on the grid power lines and the external contactor is not closed. In some embodiments, when the inverter is in the Pre Grid Tie state 2950, the inverter may proceed to the Close Output Contactor state 2960 as stated above. However, in some embodiments, when the inverter is in the Pre Grid Tie state 2950, the inverter may proceed to the Configure for Standalone state 2930 if there is no longer any voltage detected on the lines connected to the grid. In some embodiments, when the inverter is in the Hot Grid Tie state 2965, the inverter may proceed to the Locked state 2975 as stated above. However, in some embodiments, when the inverter is in the Hot Grid Tie state 2965, the inverter may proceed to the Configure for Standalone state 2930 if there is no longer any voltage detected on the lines connected to the grid. In some embodiments, when the inverter is in the Locked state 2975, the inverter may proceed to the Hot Grid Tie state 2965 or the Close Output Contactor state 2975 as stated above. However, in some embodiments, when the inverter is in the Locked state 2975, the inverter may proceed to the Configure for Standalone state 2930 if there is no longer any voltage detected on the lines connected to the grid. In some embodiments, when the inverter is in the Lost Grid Tie state 2990, the inverter may proceed to the Configure for Standalone state 2930 if no error has been detected.

As stated above, in some embodiments, the inverter may be in the Close Output Contactor state 2960 or Close Output Contactor state 2975 and may proceed to an OFF state 2910 if an error is detected. In some embodiments, one possible error is that a timer may start running when the inverter enters either state, and the timer may send the inverter an error if the timer reaches a preset amount of time and the inverter has not proceeded to a new state.

Figure 40:
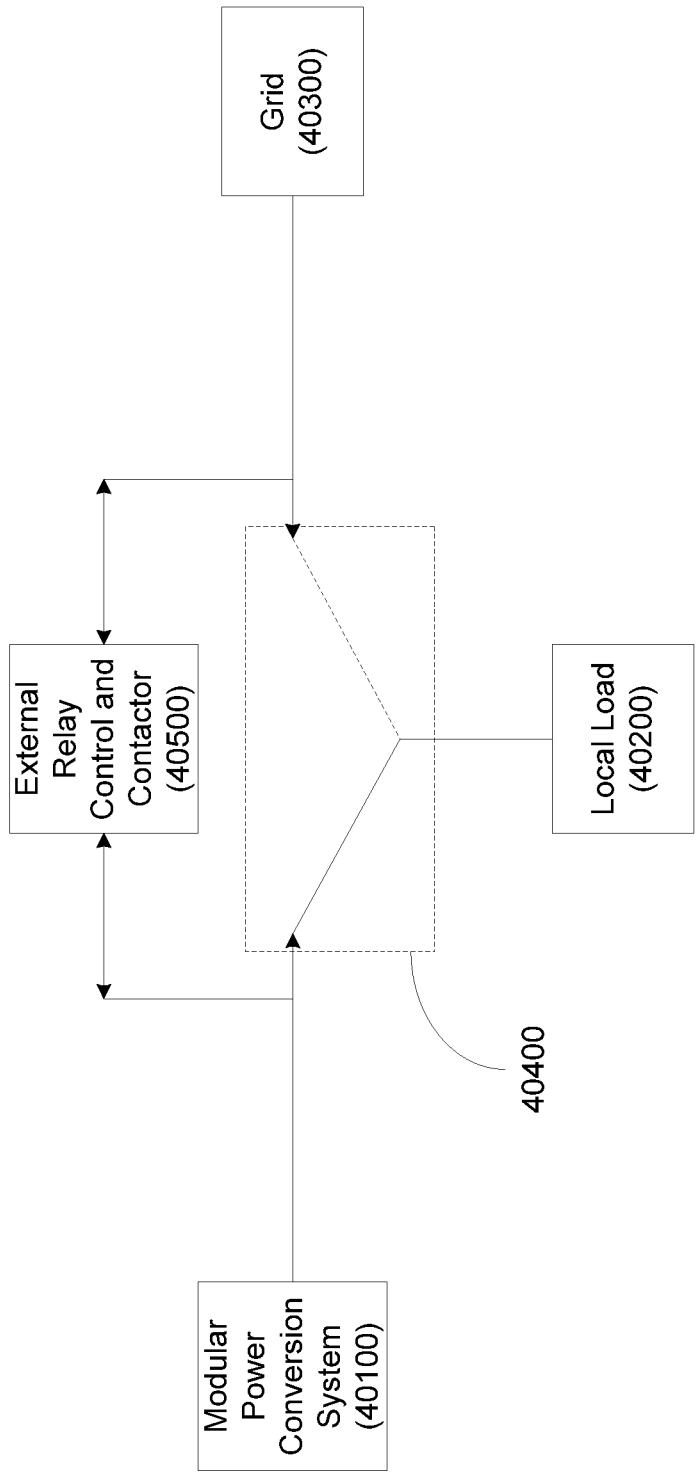
FIG. 40 is a diagrammatic representation of one embodiment of the relationship between the modular power conversion system, the grid, and a local load.

Referring now also to FIG. 40, an embodiment of the relationship between the modular power conversion system 40100, the grid 40300, and a local load 40200 is shown. In some embodiments, the embodiment shown in FIG. 40 may act in accordance with the state machine of FIG. 39, and the output contactor 627 and external contactor 626 may be shown in FIG. 40 as the output relay control and contactor 40400 and external relay control and contactor 40500 respectively. In some embodiments, the modular power conversion system 40100 may connect to a local load 40200 via an output relay control and contactor 40400. In some embodiments, the output relay control and contactor 40400 may be programmed to connect the local load 40200 to the modular power conversion system 40100 as the local load's 40200 normal power supply. In some embodiments, the output relay control and contactor 40400 may be programmed to switch the connection to the grid 40300 under various circumstances. For example, the output relay control and contactor 40400 may be programmed to switch the connection to the grid 40300 if the modular power conversion system 40100 is not supplying power to the local load 40200. As another example, in some embodiments, the output relay control and contactor 40400 may be programmed to switch the connection to the grid 40300 if the power conversion system 40100 is not supplying enough power to support the local load 40200. In some embodiments, a battery module in the modular power conversion system 40100 may be programmed to supply power to the local load 40300 to ensure that the output relay control and contactor 40400 stays connected to the modular power conversion system 40100 even if other modules in the modular power conversion system 40100 are not able to supply power to the local load 40200.

In some embodiments, the output relay control and contactor 40400 may be programmed to connect the local load 40200 to the grid 40300 as the local load's 40200 normal power supply. In some embodiments, the output relay control and contactor 40400 may be programmed to switch the connection to the modular power conversion system 40100 under various circumstances. For example, in some embodiments, the output relay control and contactor 40400 may switch the connection to the modular power conversion system 40100 if the grid 40300 is lost and the modular power conversion system 40100 is supplying enough power to support the local load 40200.

In some embodiments, the modular power conversion system 40100 may connect to the grid 40300 via an external relay control and contactor 40500 under various circumstances. For example, in some embodiments, the external relay control and contactor 40500 may be programmed to connect the modular power conversion system 40100 and the grid 40300 if the modular power conversion system 40100 is producing voltage that matches the grid's 40300 and has established phase lock with the grid 40300 and the output relay control and contactor 40400 is connecting the local load 40200 to the modular power conversion system 40100.

In some embodiments, various temperatures in the system may be measured including, but not limited to, battery temperature, motor temperature, ambient air temperature in the cabinet, and the heat sink temperature. In some embodiments, the battery temperature may alter the behavior of the battery charging algorithm (for example, in some embodiments, based on the battery manufacturer's specification). In some embodiments, the motor and/or heat sink temperature measurements may be used to measure how much power is flowing in the system. In some embodiments, the motor and/or heat sink and/or cabinet ambient air temperature measurements may be used as a basis for throttling down the engine or lowering the current limits in the system to reduce heat to safe levels. In some embodiments, the motor and/or heat sink and/or cabinet ambient air temperature measurements may be used as a basis for running the system at less than the optimal power point to allow the system to cool. In some embodiments, the motor and/or heat sink and/or cabinet ambient air temperature measurements may be used to measure the efficiency of the cooling system.

Fault Detection

In some embodiments, it may be desirable to detect faults of various sensors which may be included as a part of a power system such as any of the modular power systems described herein. In various embodiments, it may be desirable to detect faults on a sensor or sensors associated with at least one inverter included in a power system. It may also be desirable to detect faults on a sensor or sensors associated with at least one motor which is included as part of a power system. Various sensors may include current sensors, voltage sensors, or any other type of sensors which may be associated with components of a power system. The ability to detect faults in such sensors may be desirable for many reasons, including but not limited to, ensuring unanticipated and/or damaging voltages, currents, etc., are not applied to part of a power system in the event that a fault exists. Additionally, such sensors may be used in one or more control systems of a power system. In some embodiments, such a sensor may be a part of a closed loop feedback control within a power system and therefore its proper function may be requisite for the proper function of various parts of a power system.

Current Sensor Fault Detect

Figure 41:
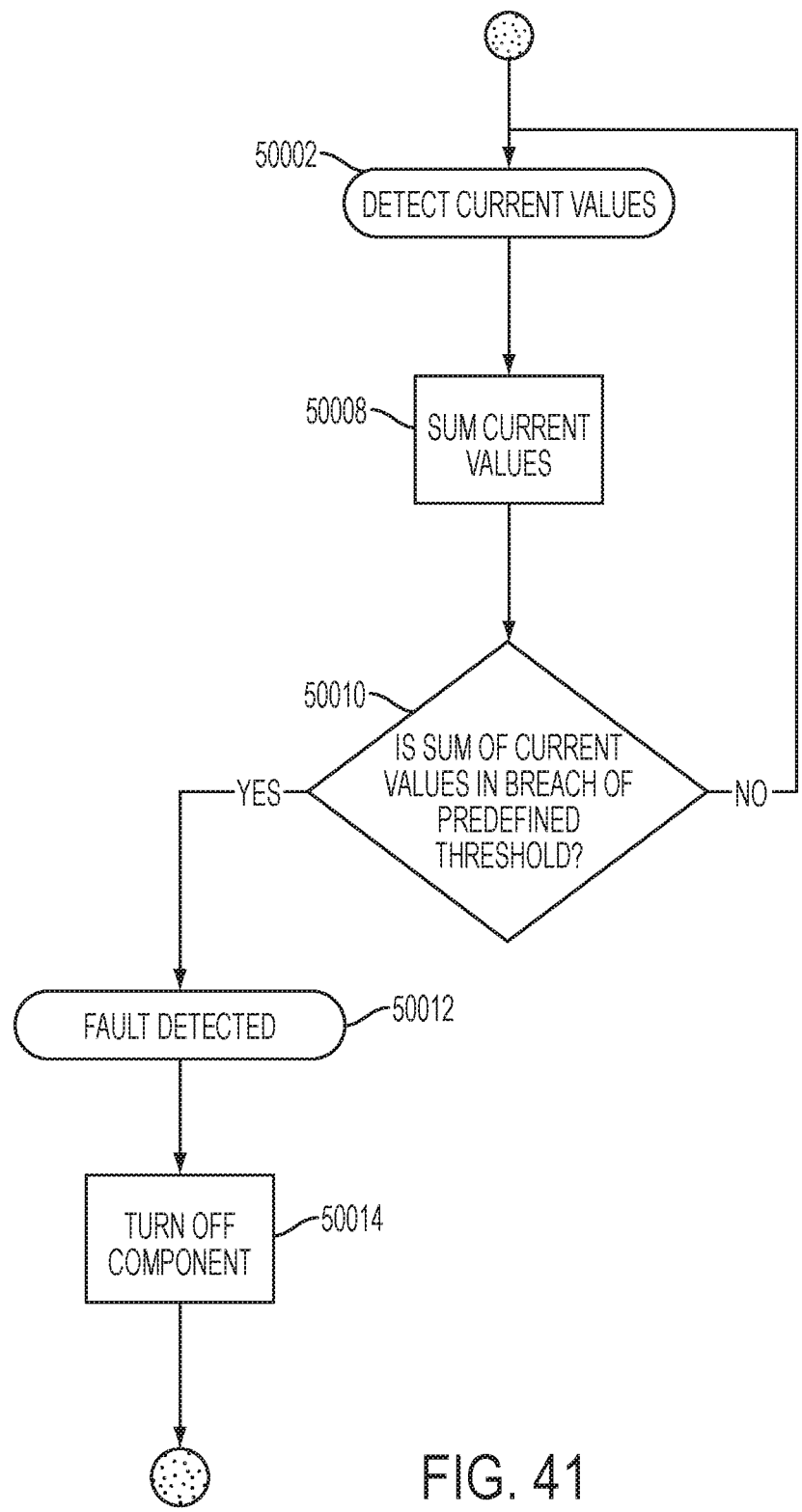
FIG. 41 is a flowchart of an embodiment of a method which may be used to detect a fault condition in a current sensor.

Referring now specifically to FIG. 41, a flowchart detailing an embodiment of a method which may be used to detect a fault condition in a current sensor is shown. As shown, the current values from a one or more current sensors may be detected. In some embodiments, the current values may be detected 50002. These values are then summed together in 50008. The summing of current values detected 50002 may be carried out by a processor included in the power system. The summed value 50008 may then be checked against a predefined threshold value to determine if the summed value violates the predefined threshold value 50010. In various embodiments, the predefined threshold value may vary and in some embodiments, the predefined threshold value may be preprogrammed and in some embodiments, the predefined threshold value may be set by a user and in some embodiments may therefore vary at any time selected. In the event that the check performed 50010 determines that the summed value from 50008 does not violate the threshold value, it may be determined that a fault condition does not exist. In the event that a fault condition is determined not to exist, these steps 50002, 50008, 50010 may be repeated at predetermined/scheduled time frames and/or continuously and/or at times selected by a user and/or unless or until a fault condition is detected.

In the event that the check 50010 determines that the summed value 50008 is in violation of the threshold, a fault may be detected 50012. This may trigger one or more steps by the system, including, but not limited to, one or more components of the power system may be shut off 50014. This may be beneficial for many reasons, including, but not limited to, preventing/mitigating/reducing damage to the power system as a result of unanticipated amounts of current being applied to one or more component of the power system. In some embodiments where the current sensors are associated with at least one inverter, the at least one inverter may be turned off. In another specific embodiment where the current sensors are associated with at least one motor, the motor controller may be turned off. In various embodiments if the system, one or more components may be monitored using this method.

Figure 42:
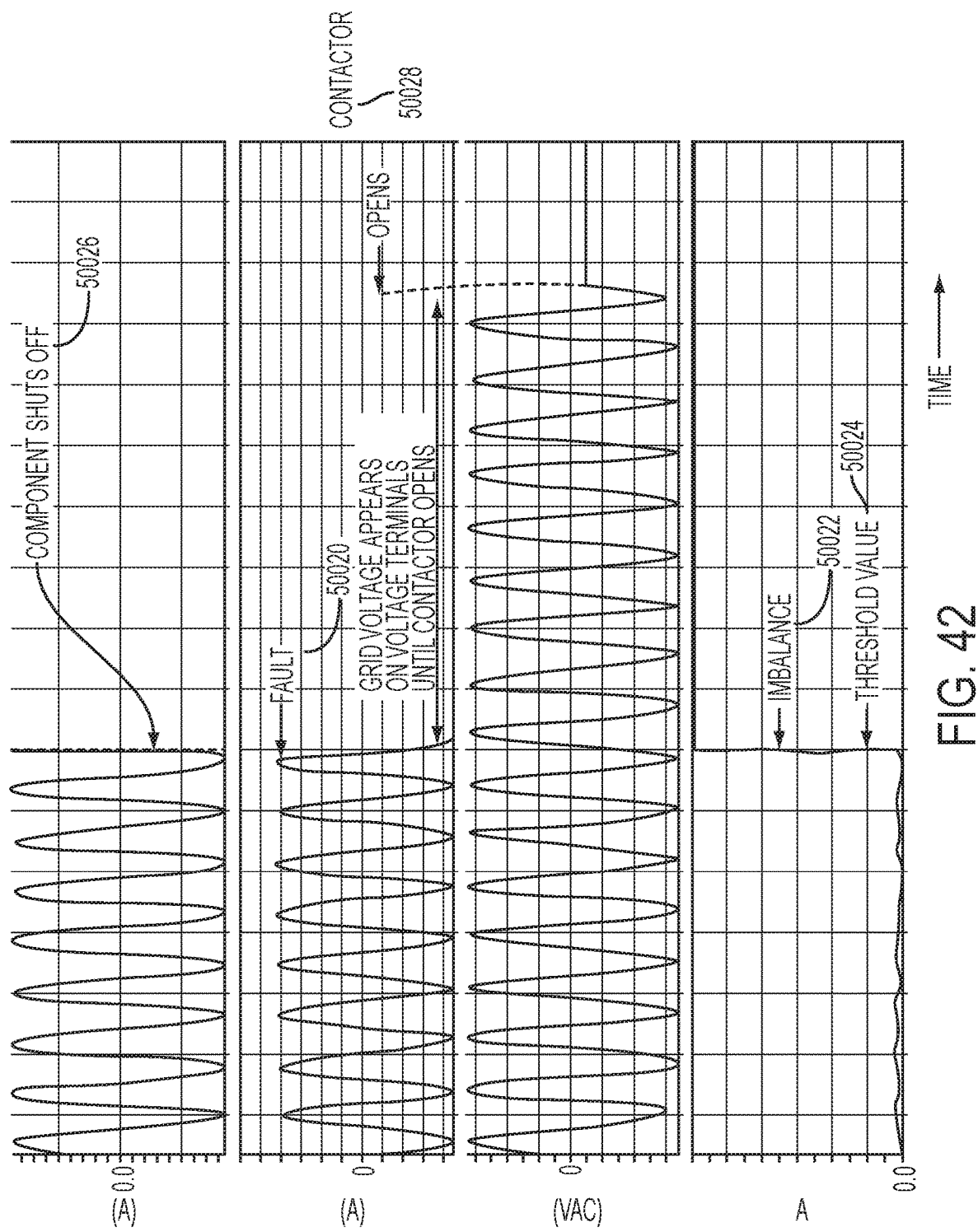
FIG. 42 is various graphs detailing the behavior and interaction of a number of components of a power system in the event of a fault in a current sensor according to one embodiment.

Referring now also to FIG. 42, a number of example graphs which detail the behavior and interaction of a number of components of a power system in the event of a fault in a current sensor associated with a part of the power system is shown. In various embodiments, the current sensor may be associated with at least one motor. In various specific embodiments the current sensor may be associated with at least one inverter. The graphs depicted in FIG. 42 may relate to the flowchart shown in FIG. 41.

As shown, a number of graphs in FIG. 42 detail the current values detected from a number of current sensors which are included in part of a power system. The lowermost (directions relative to page orientation) graph in FIG. 42 depicts the sum of the current values. In some embodiments, the lowermost graph on FIG. 42 may be generated by plotting values determined in step 50008 of FIG. 41. As shown, when the current sensors are properly functioning, the sum of the current values should be substantially/about/ approximately zero. In the example shown in FIG. 42, in the event of a fault in one of the current sensors, the sum of the current values will not be substantially/about/approximately zero.

Still referring to FIG. 42, a fault 50020 is shown occurring in one of the graphs plotting sensed current value. At the point the fault 50020 occurs, the lowermost graph depicts an observable imbalance 50022 generated as a consequence of the fault 50020. Such an imbalance 50022 may be detected by a power system and used to determine that a fault condition exists in one of the current sensors. An example threshold value 50024 is also shown in FIG. 42, however, as discussed above, the threshold value may vary. In various embodiments, a threshold value 50024 for the summed current may be set at a point which is relatively close to /substantially/approximately zero, but not equal to zero. This may be desirable/beneficial for many reasons, including, but not limited to, allowing for small fluctuations in the summed current value (which may be normal and expected) to occur without violating the threshold value 50024. In the event that a current sensor reaches a fault condition, the summed current value may fluctuate beyond the threshold value 50024 thus violating the threshold value 50024. In some embodiments, the threshold value 50024 shown in FIG. 42 may be that used in the decision made in step 50010 of FIG. 41.

In the event that a fault 50020 is detected, in various embodiments, the power system may cause one or more components to shut off. One of the one or more components may, for example, be an inverter in some embodiments. In some embodiments, one of the one or more component may, for example, be a motor controller. As shown, a component associated with the current sensors shuts off, as indicated at 50026 in FIG. 42. As mentioned above this may be done to prevent damage from being done to various components of the power system. In some embodiments or in some configurations, the grid voltage may continue to appear on voltage terminals of a component in the power system until a contactor or the like is opened. The power system may cause a contactor or the like to be opened. In FIG. 42, a contactor is opened as indicated at 50028.

Voltage Sensor Fault Detect

Figure 43:
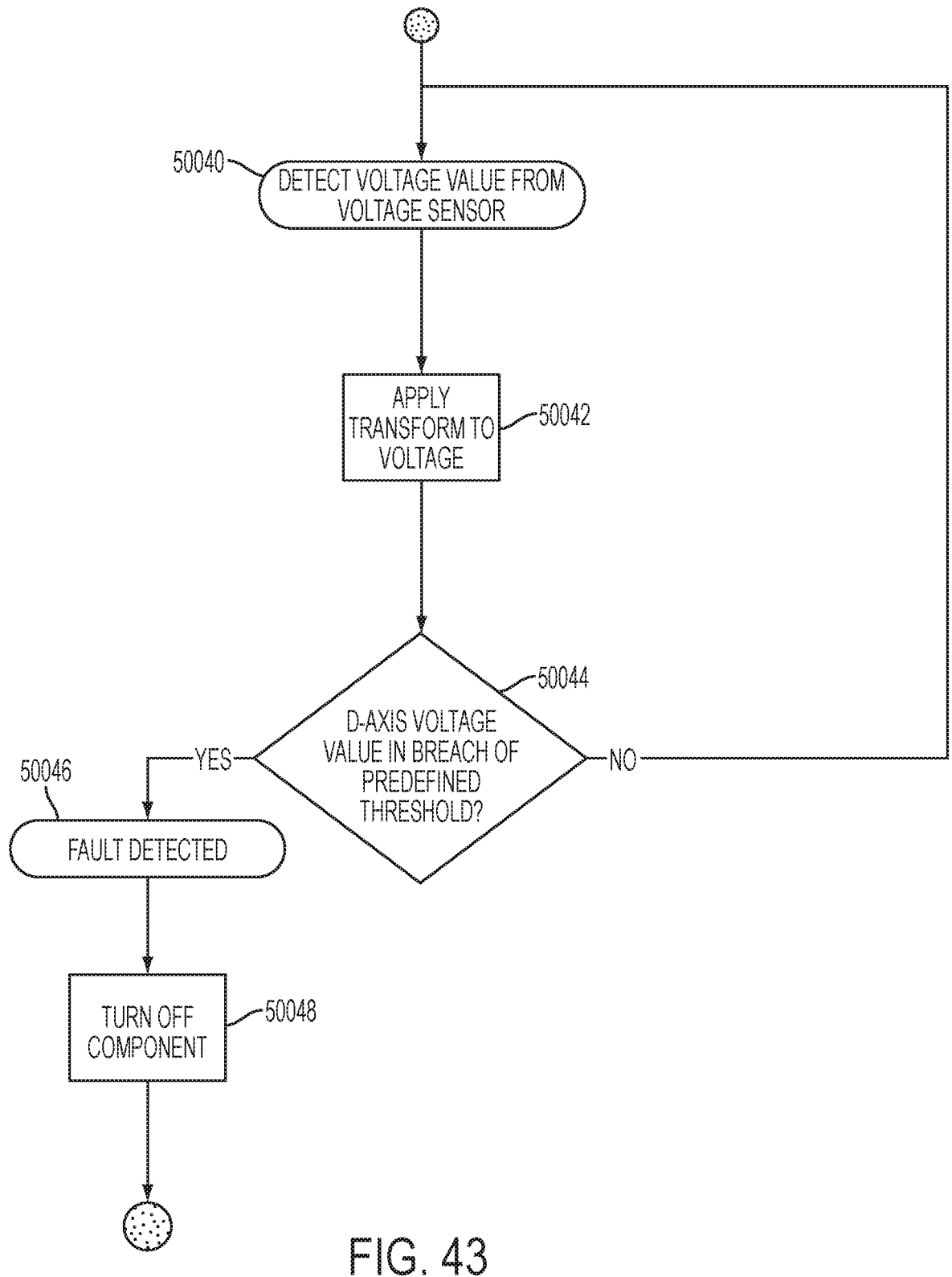
FIG. 43 is a flowchart of an embodiment of a method which may be used in some embodiments to detect a fault condition in a voltage sensor.

Referring now also to FIG. 43, a flowchart of an embodiment of a method to detect a fault condition in a voltage sensor is shown. As shown, the voltage value from a voltage sensor may be detected 50040. In some embodiments, the voltage sensor may be a part of a power system, which may include, but is not limited to, one or more embodiments of a power system described herein. In some embodiments, the voltage sensor may be a part of a component of a power system such as at least one inverter. In some embodiments, after detecting voltage value from the voltage sensor 50040, a Park and Clarke transform may be applied 50042 to the voltage detected in step 50040. Park and Clarke transforms are described in greater detail above including in FIG. 38 and the description thereof. The Park and Clarke transform may determine a D-axis voltage value which is proportional to the peak values of an AC waveform monitored by the voltage sensor. The Park and Clarke transform of detected voltage 50042 may be carried out by a processor, which, in some embodiments may be included as a component of the power system. The D-axis voltage value from step 50042 may be checked against a predefined threshold value to determine if the D-axis value violates the predefined threshold value 50044. In various embodiments, the predefined threshold value may vary and in some embodiments, the predefined threshold value may be preprogrammed and in some embodiments, the predefined threshold value may be set by a user and in some embodiments may therefore vary at any time selected. In the event that the check 50044 determines that the D-axis voltage value 50040 does not violate the threshold value, it may be determined that a fault condition does not exist. In the event that a fault condition is determined not to exist, these steps 50040, 50042, 50044 may be repeated at predetermined/scheduled time frames and/or continuously and/or at times selected by a user and/or unless or until a fault condition is detected.

In the event that the check performed 50044 determines that the D-axis voltage value 50042 is in violation of the threshold, a fault may be detected 50046. In reaction to the detection of a fault in a voltage sensor, one or more components of the power system may be shut off 50048. This may be beneficial for many reasons, including, but not limited to, preventing/mitigating/reducing damage to the power system that may occur as a result of unanticipated conditions being applied to at least one component of the power system. In some embodiments, where the voltage sensor being monitored is associated with at least one inverter, the at least one inverter may be turned off. In some embodiments where the voltage sensor being monitored is associated with at least one motor, the motor controller may be turned off.

Figure 44:
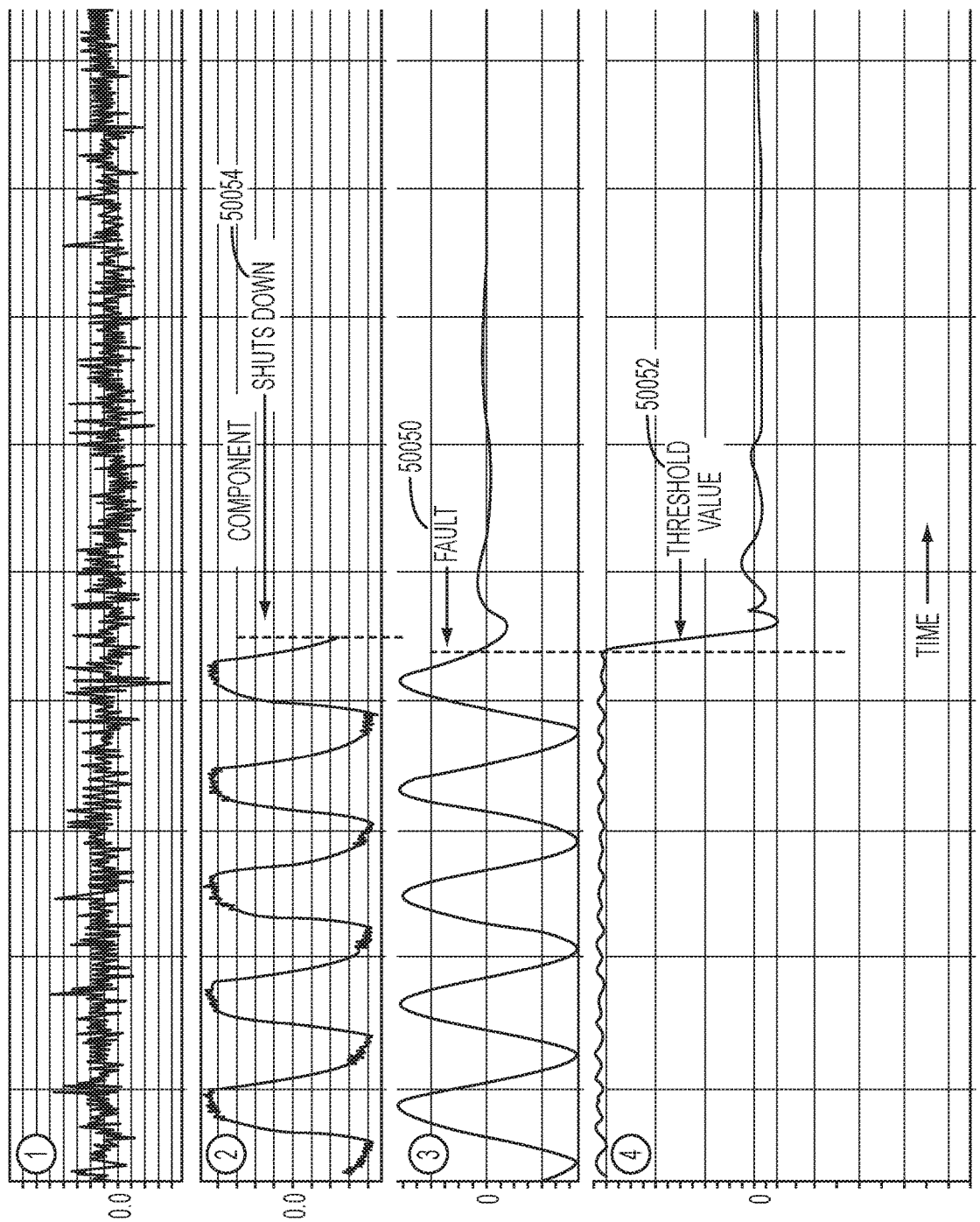
FIG. 44 is various graphs detailing the behavior and interaction of a number of components of a power system in the event of a fault in a voltage sensor according to one embodiment.

Referring now also to FIG. 44, a number of example graphs which detail the behavior and interaction of a number of components of a power system in the event of a fault in a voltage sensor associated with a part of the power system is shown. In some embodiments, the voltage sensor may be associated with at least one motor. In some embodiments the voltage sensor may be associated with at least one inverter. In various embodiments, the voltage sensor may be associated with both a motor and an inverter. The graphs depicted in FIG. 44 may relate to the flowchart shown in FIG. 43.

As shown, a number of graphs in FIG. 44 detail the current values detected from a number of current sensors which are included in part of a power system. Another of the example graphs depicts a voltage detected by a voltage sensor which is included as part of a power system. The lowermost (directions relative to page orientation) graph in FIG. 44 depicts the D-axis of the voltage value produced from applying a Park and Clarke transform to the AC waveform of the voltage read by a voltage sensor included in the power system. The lowermost graph on FIG. 44 may be generated by plotting values determined in step 50042 of FIG. 43 in some embodiments. As shown, when the voltage sensor is properly functioning, the D-axis voltage value should be relatively high. In the example shown in FIG. 44, in the event of a fault in a voltage sensor, the D-axis voltage value will fluctuate with increasing magnitude.

Still referring to FIG. 44, a fault 50050 is shown occurring in the graphs plotting sensed voltage value. At the point the fault 50050 occurs, the lowermost graph depicts an observable change in magnitude of the D-axis voltage generated as a consequence of the fault 50050. Such a change in magnitude may be detected by a power system and used to determine that a fault condition exists in a voltage sensor. An example threshold value 50052 is also shown in FIG. 44. As discussed above, the threshold value may vary in various embodiments. In various embodiments, a threshold value 50052 for the D-axis voltage value may be set at a point which is substantially below the expected D-axis voltage value. This may allow for small fluctuations in the D-axis voltage value (which may be normal and expected) to occur without violating the threshold value 50052. In the event that a voltage sensor reaches a fault condition, the D-axis voltage value waveform demonstrates a change in magnitude. This change in magnitude will cause the D-axis voltage value to cross the threshold value 50052 thus violating the threshold value 50052 and signaling a fault exists. The threshold value 50052 shown in FIG. 44 may be that used in the decision made in step 50044 of FIG. 43. The threshold value 50052 may be chosen so that the change in magnitude of the D-axis voltage waveform will cause the D-axis voltage value to continually and repeatedly cross the threshold value 50052. In some embodiments, the threshold may be set at 50% of its possible range.

In the event that a fault is detected, the power system may cause one or more components to shut off. The component may, for example, be at least one inverter in some embodiments. In some embodiments, the component may, for example, be a motor controller. As shown, a component associated with a voltage sensor shuts off as indicated at 50054 in FIG. 44. As mentioned above this may be done to prevent/mitigate/reduce damage from being done to various components of the power system. A contactor or the like may also be opened to disconnect the power system from a power grid.

Anti-Islanding

In some embodiments, it may be desirable to include an anti-islanding feature as a part of a power system such as any of the modular power systems described herein. There may be occasions in which the grid becomes disconnected (either near or far from the location of an inverter forming part of a power system), for example, in the event that a power outage or the like occurs. When an inverter forming part of a power system connected to the grid is functioning normally, it may not be possible for the power system to determine that the grid has been lost. This may occur when the total load does not exceed the amount that the power system can supply and the existing load's resonant frequency is the natural frequency of the power system. If these two conditions are met, the power system may act as an "island". That is, the power system may continue operation to generate power for the grid. Thus the power system may create a powered "island" in a "sea" of unpowered lines. This may be problematic for a number of reasons, including, but not limited to, it may pose a danger to utility workers and others who do not realize power is still being fed into the lines that connect the power system to the grid.

A power system such as any of the modular power systems described herein may detect islanding in any number of ways known to one skilled in the art. In some embodiments, a power system may detect islanding by intentionally creating a fundamentally invalid condition within the island and then detecting that condition. In some embodiments, this may be accomplished by passing reactive current onto the power grid in which the power system is connected. The reactive power put onto the grid from a power system may be, in some embodiments, sinusoidal small amplitude reactive power. The amount of reactive power injected onto the grid may be relatively small under normal operation. The amount of reactive power injected onto the grid under normal operation may preferably be small enough that it does not cause unacceptable disturbances while the power system is connected to the grid. The amount of reactive power to be injected onto the grid under normal operating conditions preferably, however, is large enough that in the event that the grid becomes disconnected, a detectable disturbance will be created if an islanding condition occurs.

A power system may monitor the frequency of the tied power grid. Additionally a power system may be locked to the frequency of the grid by means of a phase locked loop (PLL). In the event that an islanding condition occurs, the reactive power may cause a shift in the frequency of the island. This deviation in the frequency may be detected by a component of a power system and may be used by a power system to determine that the power system has become an island. When a power system thus detects that it has become an island, the power system may shut off and stop supplying power onto the grid. In various embodiments, this may involve one or more of, but not limited to, the following: opening a relay or the like, stopping power generation, turning off an inverter, and/or shutting off other components of a power system connected to the power grid.

In various embodiments, for the power system to determine that the power system has become an island, the detected deviation may be required to violate a predefined threshold value. The threshold value may be set such that the potential for false detection of an islanding condition is minimized. In various embodiments, this may involve setting the threshold value at a point which is beyond that which may be reasonably expected in transient frequency variation which may occur on the power grid when the power grid is connected and functioning normally. In this way, the threshold point may contribute to ensure that a violation of the threshold value is due to the reactive power supplied by a power system which has become an island.

Figure 45:
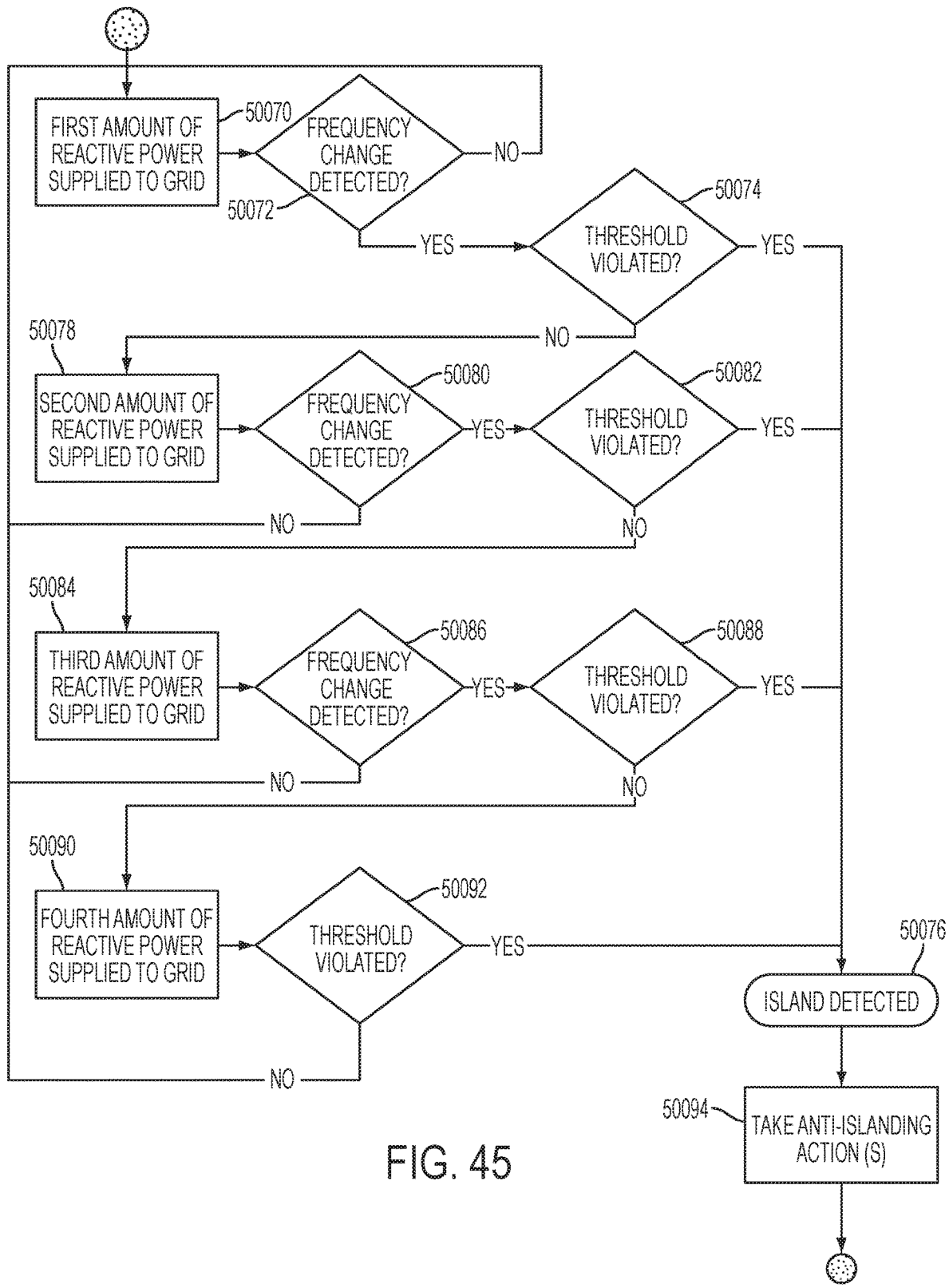
FIG. 45 is a flowchart of an embodiment of a method for detecting an island.

Referring now to FIG. 45, a flowchart showing an embodiment of a method for a detecting an island is depicted. As shown, the flowchart details an algorithm which relies on the injecting of amounts of reactive power onto a grid to determine if an island exists. Other algorithms, such as any algorithm known in the art may be used in some embodiments together with this embodiment or instead of this embodiment.

Still referring to FIG. 45, a first amount of reactive power may be supplied to the grid to which a power system is tied 50070. The amount of power chosen may, in some embodiments, be predetermined and/or predefined. In various embodiments, the predetermined and/or predefined power chosen may vary and in some embodiments, the predetermined and/or predefined power may be preprogrammed and in some embodiments, the predetermined and/or predefined power may be set by a user and in some embodiments may therefore vary at any time selected. The determination of the amount of power to be supplied may be made, in some embodiments, based on any one or more of the relevant considerations detailed above, and in other embodiments, the determination of the amount of power to be supplied may be made using different and/or additional considerations. A component in a power system may monitor the frequency of the grid tied to the power system to determine if a frequency change 50072 has occurred. If a frequency change 50072 has not occurred, the power system may continue to supply the first amount of reactive power to the power grid.

If a frequency change 50072 is detected in the frequency of the grid tied to a power system, the power system may then check to determine if a predetermined threshold value has been violated 50074. This threshold value may, in some embodiments, be a predetermined amount of frequency deviation. The determination of the amount of power to be supplied may be made, in some embodiments, based on any one or more of the relevant considerations detailed above, and in other embodiments, the determination of the amount of power to be supplied may be made using different and/or additional considerations. In the event that the threshold has been violated 50074, the algorithm may advance to step 50076. Step 50076 will be described later in the specification.

In the event that the threshold is determined not to have been violated 50074, a second amount of reactive power may be supplied to the grid by a power system 50078. The second amount of reactive power may be a predetermined amount of reactive power in some embodiments. In various embodiments, the predetermined and/or predefined amount of reactive power chosen may vary and in some embodiments, the predetermined and/or predefined amount of reactive power may be preprogrammed and in some embodiments, the predetermined and/or predefined amount of reactive power may be set by a user and in some embodiments may therefore vary at any time selected. In some embodiments, the second amount of reactive power may be greater than the first amount of reactive power. In some embodiments, additional logic (not shown) may be employed to determine the direction, positive or negative, of the supplied second amount of reactive power. In some embodiments, this logic may determine if the shift in frequency detected 50072 was positive or negative. The direction of the second amount of reactive power may be positive in the event that the shift in frequency detected 50072 was positive. The direction of the second amount of reactive power may be negative in the event that the shift in frequency detecting 50072 was negative. This may be beneficial for many reasons, including but not limited to, this may help to more quickly violate a threshold value. In some embodiments, the threshold value may also be set either positive or negative depending on the direction of the deviation in detected frequency. In some embodiments, the threshold value may instead be a threshold range.

Once the second amount of reactive power has been supplied 50078, a component of a power system may monitor the frequency of the grid tied to the power system to determine if a shift in frequency has occurred 50080. If a shift in frequency has not occurred, the power system may again start supplying the first amount of reactive power to the grid 50070 as, in various embodiments; the lack of shift in frequency indicates that an islanding condition does not exist.

If a shift in frequency is detected 50080, a component of a power system may then check to see if the predetermined threshold has been violated 50082. In the event that the predetermined threshold has been violated, the algorithm may advance to step 50076. Step 50076 will be described later in the specification. If the shift in frequency detected 50080 does not violate the predetermined threshold, the algorithm may advance to step 50084.

A third amount of reactive power may be supplied to the grid 50084 by a power system. The third amount of reactive power may be a predetermined amount of reactive power in some embodiments. In various embodiments, the third amount of reactive power may be greater than the first amount of reactive power and may be greater than the second amount of reactive power. In some embodiments, additional logic (not shown) may be employed to determine the direction, positive or negative, of power to be supplied as the third amount of reactive power. This logic may determine if the shift in frequency detected 50080 was positive or negative. The direction of the third amount of reactive power may be positive in the event that the shift in frequency detected 50080 was positive. The direction of the third amount of reactive power may be negative in the event that the shift in frequency detected 50080 was negative. This may help to more quickly violate a threshold value.

Once the third amount of reactive power has been supplied 50084, a component of a power system may monitor the frequency of the grid tied to the power system to determine if a shift in frequency has occurred 50086. If a shift in frequency has not occurred, the power system may return to step 50070 and again start supplying the first amount of reactive power to the grid as, in various embodiments; the lack of shift in frequency indicates that an islanding condition does not exist.

If a shift in frequency is detected 50086, a component of a power system may then check to see if the predetermined threshold has been violated 50088. In the event that the predetermined threshold has been violated, the algorithm may advance to step 50076. Step 50076 will be described later in the specification. If the shift in frequency detected in step 50086 does not violate the predetermined threshold, the algorithm may advance to step 50090.

A fourth amount of reactive power may be supplied to the grid 50090 by a power system. The fourth amount of reactive power may be a predetermined amount of reactive power in some embodiments. The fourth amount of reactive power may be greater than the first amount of reactive power, second amount of reactive power, and third amount of reactive power. In some embodiments, additional logic (not shown) may be employed to determine the direction, positive or negative, of power to be supplied as the fourth amount of reactive power. This logic may determine if the shift in frequency detected 50086 was positive or negative. The direction of the fourth amount of reactive power may be positive in the event that the shift in frequency detected in step 50086 was positive. The direction of the fourth amount of reactive power may be negative in the event that the shift in frequency detecting in step 50086 was negative. This may help to more quickly violate a threshold value.

Once the fourth amount of reactive power has been supplied in step 50090, a component of a power system may monitor the frequency of the grid tied to the power system to determine if a shift in frequency which violates the predetermined threshold has occurred 50092. If the shift in frequency detected 50092 does not violate the predetermined threshold, the power system may return to step 50070 and again start supplying the first amount of reactive power to the grid as, in various embodiments; the lack of shift in frequency indicates that an islanding condition does not exist.

In the event that the predetermined threshold has been violated, the algorithm may advance to step 50076. Step 50076 denotes the detection of an island condition by the power system. Once a power system has detected an island condition exists, the power system may take any number of anti-islanding actions. These actions may be taken in step 50094 and may include any one or more or any combination of the anti-islanding actions described above. Thus, the island may be detected and broken.

In various embodiments, the number of stages may differ. That is, the number of times a power system may increase the reactive power, and check for a frequency shift may differ. In some embodiment, more than four or less than four stages may be included in the algorithm. In some embodiments, for example, only two stages may be included in an anti-islanding algorithm. In some embodiments, more than four may be included. In some embodiments, the number of stages included in an anti-islanding algorithm may be a function of the sensitivity and accuracy of frequency measuring components in the power system. Typically, the more sensitive the frequency measuring components of a power system, the fewer the number of stages which may be needed in an anti-islanding algorithm. Additionally, it should be noted that in some embodiments, the waveform of the reactive power supplied to the power grid may differ depending on the stage. For example, in a specific embodiment, a square wave may be supplied to the power grid in the third and fourth stages. The frequency change may be more emphatic or less emphatic depending on the type of waveform used. It may, in some embodiments, be desirable to use waveforms which cause more subtle frequency changes at early stages in the algorithm for many reasons, including, but not limited to, because these stages may relatively commonly occur when the power grid is connected and functioning properly. Consequentially, it may be desirable to minimize the amount of disturbance which is intentionally injected onto the power grid at these points in the progression of the algorithm.

Figure 46:
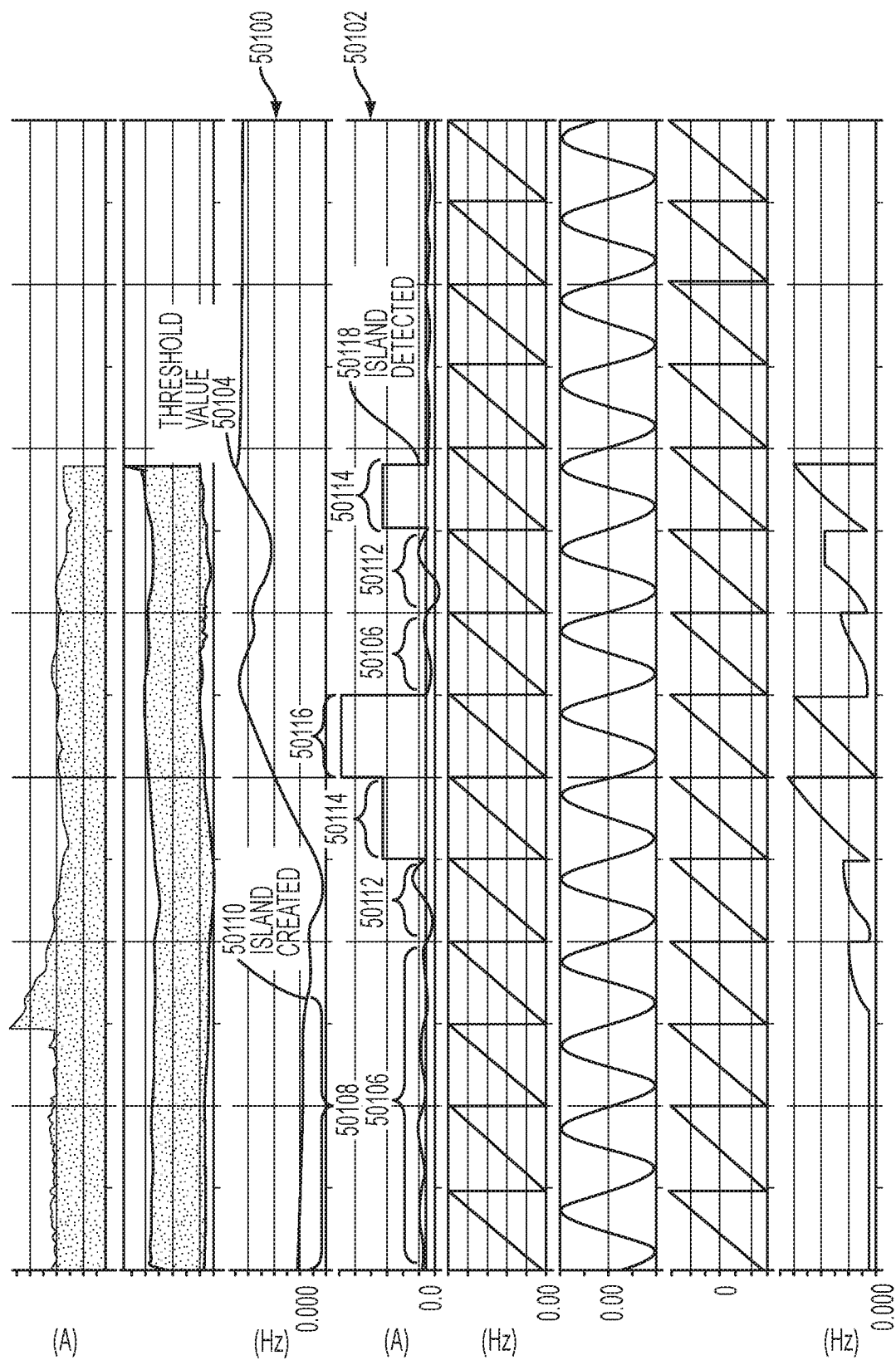
FIG. 46 is various graphs detailing the behavior and interaction of a number of components of a power system in the event of an islanding.

Referring now also to FIG. 46 a number of example graphs which detail the behavior and interaction of a number of components of a power system in the event of an islanding condition is shown. In various specific embodiments, the behavior and interactions of various components of a power system may differ. The graphs depicted in FIG. 46 may relate to the flowchart shown in FIG. 45.

As shown, example graph 50100 in FIG. 46 details the change in frequency over time as detected by a power system. Example graph 50102 depicts the reactive current supplied to the power grid over time. As shown by the example graphs 50100 and 50102, in the event that an islanding condition exists, increasing amounts of reactive current may be supplied to an island by a power system until the frequency of the island deviates beyond a threshold value 50104.

As depicted in example graph 50100, a power system may supply a first amount of reactive current to a power grid during a first stage of island detection 50106 (hereafter first stage). While a power grid is connected and functioning properly, as shown by 50108, the reactive current supplied in the first stage 50106 does not noticeably affect the frequency of the power grid. When an islanding condition is created, as indicated at 50110, the reactive current supplied to an island may begin to induce a change in frequency of the island. A power system may detect this change in frequency.

Once a change in frequency is detected in a power grid tied to a power system, the power system may supply a greater amount of reactive current onto the power grid in a second stage of island detection 50112 (hereafter second stage). If an islanding condition does exist, the additional reactive current supplied in the second stage 50112 will cause the frequency of the island to further deviate. A power system may detect this further change in frequency.

If a further change in frequency is detected after the second stage 50112 has concluded (each stage may last for a predetermined period of time), a power system may supply a greater amount of reactive current onto the power grid in a third stage of island detection 50114 (hereafter third stage). Additionally, as mentioned above and as shown in the example graph 50102 in FIG. 46, the waveform of the reactive current may be different from that supplied in the first stage 50106 and second stage 50112. As shown, in the first stage 50106 and second stage 50112 a sinusoidal waveform is supplied. In the third stage 50114 a square waveform is supplied. This may be done to generate a more pronounced shift in frequency. If an islanding condition does exist, the additional reactive current supplied in the third stage 50114 will cause the frequency of the island to further deviate. A power system may detect this further change in frequency.

If a further change in frequency is detected after the third stage 50112 has concluded (each stage may last for a predetermined period of time), a power system may supply a greater amount of reactive current in a fourth stage of island detection 50116 (hereafter fourth stage). Additionally, as mentioned above and as shown in the example graph 50102 in FIG. 46, the waveform of the reactive current may be different from that supplied in the first stage 50106 and second stage 50112. In the fourth stage 50116, a square waveform is supplied. This may be done to generate a more pronounced shift in frequency. If an islanding condition does exist, the additional reactive current supplied in the fourth stage 50116 will cause the frequency of the island to further deviate. A power system may detect this further change in frequency. This deviation may be great enough that the threshold value 50104 may be violated and the power system may detect an islanding condition exists. In the example graphs 50100 and 50102 the threshold value 50104 is not violated at the conclusion of the fourth stage 50116.

In the example shown in FIG. 46, the power system may then repeat the progression of stages if the threshold value is not reached after the fourth stage 50116 has concluded. If an islanding condition exists the repeated progression will cause the frequency of the island tied to a power system to deviate outside of the threshold value 50104. In the example embodiment, the power system repeats the progression of stages through the third stage 50114. In the third stage, the reactive current supplied onto the power grid island causes the frequency deviation to violate the allowable deviation threshold vale 50104. The violation of the threshold value 50104 may cause the power system to detect the existence of an island as denoted at 50118 of FIG. 46. In some embodiments, a power system may require that the threshold value 50104 be violated for a predetermined period of time. This may make the power system less sensitive to transient variation. In the event that a power system detects an islanding condition, the power system may then take one or more anti-islanding actions such as those described above. As shown in the example in FIG. 46, the power system shuts off in response to the detection of the islanding condition.

As mentioned above in relation to FIG. 45, different embodiments may employ different anti-islanding and islanding detection features. Some embodiments may include a differing number of stages, supply different waveforms in different stages, include stages of differing duration, supply different amount of reactive current in the various stages, etc. Additionally, in some embodiments, a power system may actively determine the amount of reactive current it will supply in each stage, the duration of each stage, waveform of each stage, number of stages to employ, etc. In other embodiments, these may be predetermined.

Power Generation Throttling

Figure 47:
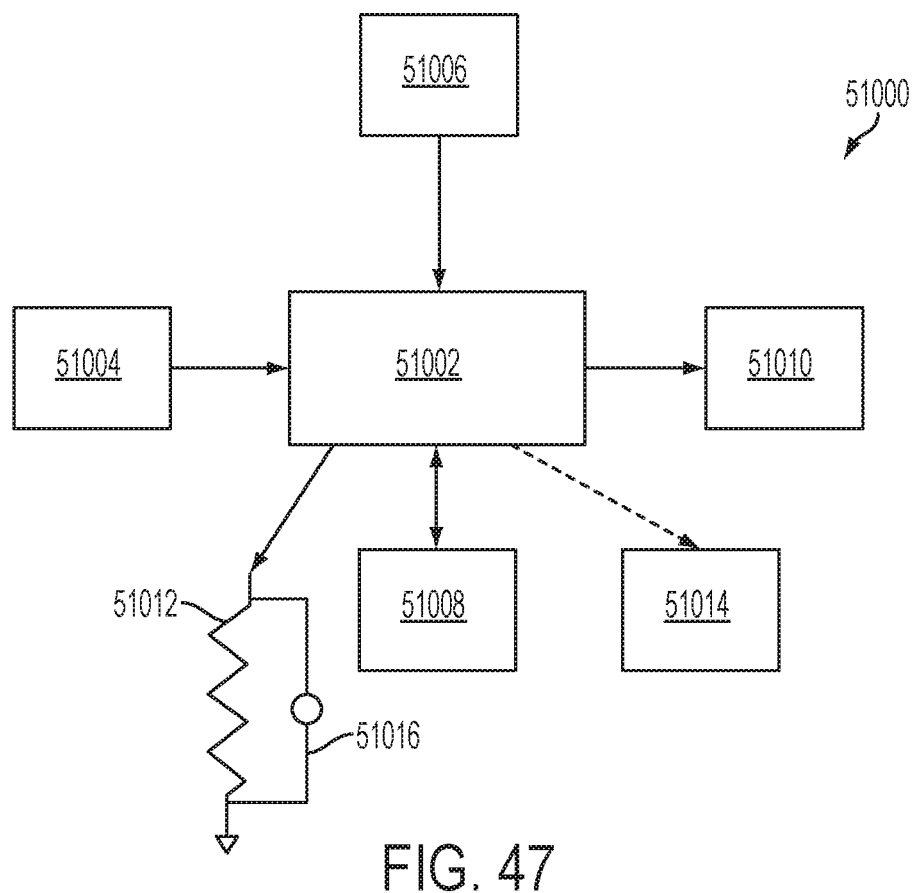
FIG. 47 depicts a representational example embodiment of a power system.

FIG. 47 depicts a representational example embodiment of a power system 51000. The power system may be a modular power conversion system such as any of those described herein. A number of electrical resources are tied to a DC Bus 51002 in the example embodiment. Though any variety of resources may be tied to the DC Bus 51002, in the specific example embodiment a power generator 51004, a renewable energy generator 51006, an energy storage device 51008, an inverter 51010, and a brake 51012 are connected to the DC Bus 51002. As shown, parasitic loads 51014 are also shown tied to the DC Bus 51002.

As shown, in some embodiments, the power generator 51004 provides power to the DC Bus 51002. The power generator 51004 may be any suitable power generator, for example any variety of engine. For illustrative purposes, the power generator 51004 may be described as an engine 51004 in relation to FIG. 47. The renewable energy generator 51006 also provides power to the DC Bus 51002. The renewable energy generator 51006 may be any suitable renewable power generator such as, but not limited to, a photo-voltaic, wind, hydro, and/or geothermal source. The energy storage device 51008 may provide power to the DC Bus 51002, or may draw power from the DC Bus 51002 (e.g. when charging). In various embodiments, the energy storage device 51008 may be any suitable energy storage device such as, but not limited to, a flywheel, chemical energy storage device, battery bank, and/or compressed air energy storage device. For illustrative purposes, the energy storage device 51008, may be described as a battery bank 51008 in relation to FIG. 47. In various embodiments, the inverter 51010 may draw power from the DC Bus 51002 to satisfy an energy demand. In the example embodiment, the power system 51000 is set up as a stand-alone system, however, in some embodiments, the inverter 51010 may also provide power to the DC Bus 51002 (e.g. from a power grid). The parasitic loads 51014 may draw power from the DC Bus 51002. These loads may be undesired, but necessary to run the power system 51000. In some embodiments, the parasitic loads 51014 may not be directly measurable as indicated by the dashed line.

In various embodiments, the brake 51012 may draw and dissipate power from the DC Bus 51002 in the event that the DC Bus 51002 is being provided an excess of power (more power than needed to satiate demands and maintain the DC Bus 51002 at predefined voltage level). The brake 51012 may be engaged when the DC Bus 51002 voltage rises above a predefined threshold and may then be disengaged when the DC Bus 51002 falls below a second predefined threshold. The brake 51012 may be a resistor connected to ground as shown in FIG. 47. The resistor may be surrounded by a heat sink such a water jacket or the like.

When the brake 51012 is engaged, in various embodiments, power generated by the power system 51000 is converted into heat and wasted. Thus, the power system 51000 may not be operating as efficiently as may be desired. This may increase cost of operation and unnecessary wear of power system components among other things. Therefore, for many reasons, including but not limited to those described herein, it may be beneficial and/or desirable to send a signal indicating an excess of energy to one or more power system 51000 components, for example, to an engine 51004. The engine 51004 controller receiving this signal may throttle power generated so that occurrences where power is produced in undesirable excess are minimized.

Therefore, in some embodiments, a component controller may throttle the component by acting on an error signal representing the net power deficit or excess being provided to the DC Bus 51002 of the power system 51000. Using such an error signal, an element of a power system 51000 may be throttled to more efficiently meet power demand. The error signal may be communicated via CANbus in some embodiments.

As mentioned above, it may desirable to prioritize power generation within a power system 51000. For example, a power system 51000 may be configured such that it will use the cheapest form(s) of power generation (e.g. solar power or another renewable) to meet power needs. Likewise, a power system 51000 may be configured such that the error signal is used to throttle the most expensive form(s) of power generation (e.g. an engine 51004). The power system 51000 may also be configured only to draw from the battery bank 51008 in the event of a power deficit.

In various embodiments, the power deficit and excess may be determined by determining and/or calculating the amount of power dissipated in the brake 51012 and adding it to zero or the power demand of the battery bank 51008, in some embodiments, choosing the lower of the latter two values. For instance, in some embodiments, if there is a power deficit, no power will be dissipated in the brake 51012. The battery bank 51008 will have a negative power demand as it will be supplying power to the DC Bus 51002. Thus a negative value representing the power deficit is returned. This negative value may then be sent to a controller (e.g. an engine 51004 controller). The controller may then increase power production. In some embodiments, the brake 51012 power and battery 51008 power may be computed using different scale factors. In some embodiments, these values may be converted to a common scale factor.

In some embodiments, the error signal representing the power deficit or excess may be used by a power system 51000 controller to throttle a component of the power system 51000. In other embodiments, it may be desirable that this error signal be sent to the controller for a specific component of the power system 51000 so that the controller may throttle that component accordingly. This may be beneficial for many reasons, including, but not limited to, localizing decision making on components of the power system 51000. An engine 51004 controller may, in some embodiments, command that an engine 51004 continue to produce an excess of power, for example, because it may run more efficiently when doing so. An engine 51004 controller may also command that an engine 51004 continue to produce an excess of power because it may be attempting to satisfy a heat demand. Thus localizing the throttle control may more efficient and thus, in some embodiments, may maximize the efficiency of the system.

In various embodiments, determining the power dissipated in the brake 51012 may be completed using one or more of the follow methods. However, in other embodiments, different methods may be used. In one embodiment depicted in FIG. 47, a differential voltage sensor 51016 is included. The differential voltage sensor 51016 may be configured to measure the voltage drop across the brake 51012. Power dissipated by the brake 51012 may be determined using any desired method. Since the resistance of the brake 51012 is known, this voltage measurement may be used to calculate current using Ohms law. Using the voltage and current, power may be determined.

In some embodiments, it may be desirable to filter the voltage measurement from the differential voltage sensor 51016. In some embodiments, the voltage measurement may be passed through a lowpass filter with a relatively long time constant. In some embodiments, this may yield an average brake 51012 voltage value.

In some embodiments, configuring a differential voltage sensor 51016 to measure the voltage drop across the brake 51012 may be desirable for many reasons, including but not limited to, this configuration may enhance a power system's 51000 ability to perform a brake test. The power system 51000 may use the voltage measurement from the differential voltage sensor 51016 to derive the amount of power being dissipated in the brake 51012. This measurement may be checked against an expected value to see that it corresponds within a predetermined range of the expected value. The expected value may be the amount of power the brake 51012 would be expected to dissipate during the brake test.

Figure 48:
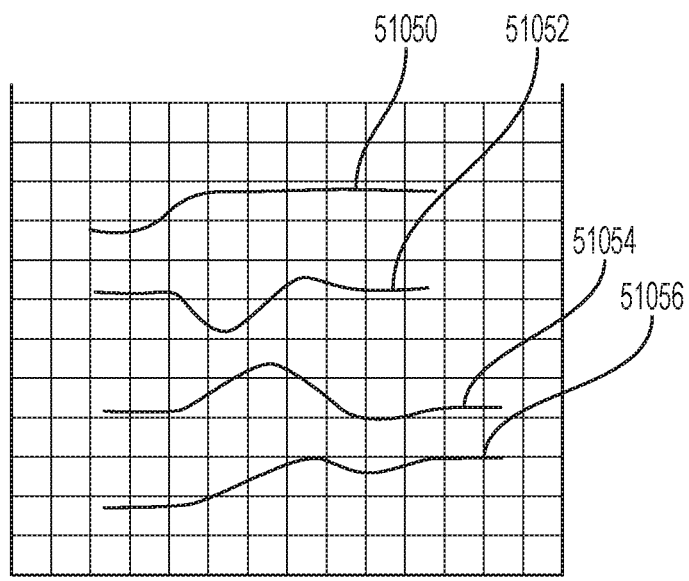
FIG. 48 depicts an example graph detailing behavior of an example power system which is capable of throttling power generated by a component of the power system.

FIG. 48 depicts an example illustrative graph which details behavior of another embodiment of a power system which may use an error signal to throttle a component of a power system. The power system may be any suitable power system such as a modular power conversion system or any other power system described herein. As mentioned above, it may be desirable to throttle one or more power generating component(s) of the power system. This may, in some configurations of a power system, be one or more of an engine such as an internal combustion generator, Stirling engine generator, external combustion engine generator, or the like.

In the embodiment shown in FIG. 48, a proportional intergral controller (PI controller) in some embodiments may drive the voltage of a DC Bus of a power system to a predetermined level. In some specific embodiments, this predetermined level may be around 390V, however, in various embodiments the predetermined level may vary. The DC Bus voltage may be compared to a reference voltage. In some embodiments, the reference voltage may be relatively low. In such embodiments, the reference voltage may only be compared to a predetermined portion of the DC Bus voltage (e.g. 5% of the DC Bus voltage), however, the predetermined percentage voltage may vary in various embodiments. The difference between the DC Bus voltage (or portion thereof) and the reference voltage may be used to generate an error signal. This error signal may be conveyed to a throttling controller which may then act on the signal, e.g. to throttle a component of the power system if desired, however, in various embodiments, the throttling controller may not throttle the component. This error signal may, in some embodiments, be conveyed over CANbus. The error signal may be limited to a range of values in some embodiments.

As shown, the graph includes four lines 51050, 51052, 51054, 51056. Line 51050 plots demand (e.g. from an inverter, battery, other loads, etc.) over time. Line 51052 plots DC Bus voltage over time. Line 51054 plots the generated error signal over time. Line 51056 plots the power generated by the throttled component of the power system over time.

As indicated by line 50150, the example graph depicts behavior of a power system when overall power demand increases. When demand rises (see line 51050) the Bus voltage is drawn down (see line 51052). The error signal (see line 51054) reflects this decrease in Bus voltage. In response to the error signal, the throttled component is throttled such that its power generation increases (see line 51056).

This increase in power generation eventually causes the Bus voltage (see line 51052) to rise to the predetermined level. As shown, the example in FIG. 48 shows an embodiment which is slightly overdamped. Other embodiments may be differently damped. While the Bus voltage is above the predetermined level, the error signal (see line 51054) reverses such that it indicates this excess voltage on the Bus. In turn, this causes the throttled component (see line 51056) to be throttled such that its power generation is reduced (see line 51056).

Eventually, the Bus voltage (see line 51052) will be maintained near the predetermined level. Consequently, the error signal (see line 51054) will level out and the throttled component (see line 51056) will remain throttled such that it produces power at a level sufficient to meet the increased demand and maintain the Bus voltage at the predetermined level.

Though the example graph shows the throttle component being throttled as the error signal changes, as mentioned above, in some scenarios, a throttled component may not change the amount of power it generates in response to an error signal indicating a change in demand. This may, for example, occur if the throttled component may operate more efficiently when generating an excessive amount of power. That is, it may be cheaper to generate excess energy and convert it into heat than it would be to decrease power generation. In one of a number of other scenarios, the throttled component may need to generate excessive power to satisfy a heat demand.

Various alternatives and modifications can be devised by those skilled in the art without departing from the disclosure. Accordingly, the present disclosure is intended to embrace all such alternatives, modifications and variances. Additionally, while several embodiments of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. And, those skilled in the art will envision other modifications within the scope and spirit of the claims appended hereto. Other elements, steps, methods and techniques that are insubstantially different from those described above and/or in the appended claims are also intended to be within the scope of the disclosure.

The embodiments shown in drawings are presented only to demonstrate certain examples of the disclosure. And, the drawings described are only illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present disclosure, the only relevant components of the device are A and B.

Furthermore, the terms "first", "second", "third" and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the embodiments of the disclosure described herein are capable of operation in other sequences and/or arrangements than are described or illustrated herein.

What is claimed is:

1. A power system comprising:
a controller, the controller configured to perform a method of determining when a connection of the power system to a grid has been disconnected, the method comprising:
the power system supplying a first amount of reactive power to the grid to which the power system is connected; and
the power system determining if there is a frequency change within the grid comprising:
determining a predetermined threshold;
if the frequency change does not exceed the predetermined threshold, the power system supplying a second amount of reactive power to the grid; and
if the frequency exceeds the predetermined threshold, the power system supplying a first amount of reactive power to the grid.

2. The system of claim 1, wherein the second amount of reactive power is greater than the first amount of reactive power.

3. The system of claim 1, wherein if the frequency change does not exceed a predetermined threshold, supplying a second amount of reactive power to the grid further comprising:
the power system supplying a third amount of reactive power to the grid.

4. The system of claim 3, further comprising monitoring the frequency of the grid connected to the power system.

5. The system of claim 4, further comprising determining if there is a frequency change within the grid.

6. The system of claim 5, further comprising if a frequency change is detected, the power system determining whether the frequency change exceeds a predetermined threshold.

7. The system of claim 3, wherein the third amount of reactive power is greater than the second amount of reactive power.

8. The system of claim 6, further comprising wherein determining whether the frequency change exceeds a predetermined threshold further comprising:
if the frequency change does not exceed a predetermined threshold, the power system supplying a fourth amount of reactive power to the power system.

9. The system of claim 8, further comprising monitoring the frequency of the grid connected to the power system.

10. The system of claim 9, further comprising determining if there is a frequency change within the grid.

11. The system of claim 10, further comprising if a frequency change is detected, the power system determining whether the frequency change exceeds a predetermined threshold.

12. The system of claim 11, further comprising if the frequency change exceeds the predetermined threshold, determining an island condition.

13. The system of claim 11, further comprising if the frequency change does not exceed a predetermined threshold, the power system supplying a first amount of reactive power to the grid to which the power system is connected.

14. The system of claim 8, wherein the fourth amount of reactive power is greater than the third amount of reactive power.

15. A power system comprising:
a controller configured for performing a method of determining when a connection of a power system to a grid has been disconnected, the method comprising:
locking the power system to a frequency of the grid using a phase locked loop;
detecting a deviation from the frequency in the power system; and
shutting off the power system,
wherein detecting a deviation from the frequency further comprising:
determining a predetermined deviation threshold; and
determining whether the deviation exceeds the predetermined deviation threshold.

16. The system of claim 15, wherein shutting off the power system comprising opening a relay.

17. The system of claim 15, wherein shutting off the power system comprising turning off an inverter.

18. The system of claim 15, wherein shutting off the power system comprising shutting off at least one component connected to the grid.

19. A power system comprising:
a controller configured for performing a method for determining when a connection of a power system to a grid has been disconnected, the method comprising:
detecting a voltage value from a voltage sensor;
applying a transform to the voltage;
if the D-axis voltage value exceeds a predefined threshold;
detecting a fault; and
shutting off the power system.

20. The system of claim 19, wherein shutting off the power system comprising turning off an inverter.

* * * * *